(12) United States Patent
McGregor et al.

(10) Patent No.: US 8,519,350 B2
(45) Date of Patent: Aug. 27, 2013

(54) GAS-FILLED NEUTRON DETECTORS HAVING IMPROVED DETECTION EFFICIENCY

(75) Inventors: Douglas S. McGregor, Riley, KS (US); Steven L. Bellinger, Manhattan, KS (US); Walter J. McNeil, Santee, CA (US); Martin F. Ohmes, Knoxville, TN (US); Kyle A. Nelson, Manhattan, KS (US)

(73) Assignee: Douglas S. McGregor, Riley, KS (US)

( * ) Notice: Subject to any disclaimer, the term of this patent is extended or adjusted under 35 U.S.C. 154(b) by 20 days.

(21) Appl. No.: 13/404,751

(22) Filed: Feb. 24, 2012

(65) Prior Publication Data
US 2012/0217406 A1 Aug. 30, 2012

Related U.S. Application Data

(63) Continuation-in-part of application No. PCT/US2010/046736, filed on Aug. 26, 2010.

(60) Provisional application No. 61/275,278, filed on Aug. 27, 2009.

(51) Int. Cl.
*G01T 3/00* (2006.01)

(52) U.S. Cl.
USPC .................................................. 250/390.01

(58) Field of Classification Search
USPC ...... 250/269.1–269.8, 361 R, 390.01–390.12
See application file for complete search history.

(56) References Cited

U.S. PATENT DOCUMENTS

| | | | |
|---|---|---|---|
| 2,483,139 A * | 9/1949 | Herzog | 250/269.2 |
| 2,986,636 A | 5/1961 | Carlson et al. | |
| 4,272,680 A | 6/1981 | Cotic | |
| 4,447,727 A | 5/1984 | Friesenhahn | |
| 4,481,421 A | 11/1984 | Young et al. | |
| 5,973,328 A | 10/1999 | Hiller et al. | |
| 6,175,120 B1 | 1/2001 | McGregor et al. | |
| 6,426,504 B1 | 7/2002 | Menlove et al. | |
| 6,479,826 B1 | 11/2002 | Klann et al. | |

(Continued)

FOREIGN PATENT DOCUMENTS

| JP | 2002181948 A | 6/2002 |
|---|---|---|
| WO | 2007109535 A2 | 9/2007 |

OTHER PUBLICATIONS

Preliminary Report on Patentability; International Application No. PCT/US2010/046736; date of mailing Mar. 8, 2012.

(Continued)

*Primary Examiner* — Kiho Kim
(74) *Attorney, Agent, or Firm* — Brooks Kushman P.C.

(57) ABSTRACT

Surfaces or surface portions incorporated into gas-filled neutron detectors are coated with and/or composed of at least partially, neutron reactive material. The surfaces may be flat or curved fins or plates, foils, porous or filamentary material, or semi-solid material or aerogel. The incorporation of the extended surfaces coated with or composed of neutron reactive material increases the neutron detection efficiency of the gas-filled detectors over conventional coated designs. These surfaces or surface portions increase the amount of neutron reactive material present in the detector over conventional coated designs and, as a result, increase the neutron detection efficiency. The surfaces can be made of conductive, semiconductive or insulative materials. The surfaces are arranged such that they do not detrimentally detract from the main function of a gas-filled detector with particular attention to gas-filled proportional detectors.

66 Claims, 37 Drawing Sheets

(56) References Cited

U.S. PATENT DOCUMENTS

| | | |
|---|---|---|
| 6,781,132 B2 | 8/2004 | McGregor |
| 6,921,903 B2 | 7/2005 | McGregor |
| 7,164,138 B2 | 1/2007 | McGregor et al. |
| 7,233,007 B2 | 6/2007 | Downing et al. |
| 7,910,893 B2 | 3/2011 | Glesius et al. |
| 7,952,078 B2 | 5/2011 | McCormick et al. |
| 7,964,852 B2 | 6/2011 | McCormick |
| 8,084,747 B2 | 12/2011 | Weissman et al. |
| 2003/0034456 A1 | 2/2003 | McGregor |
| 2003/0152186 A1 | 8/2003 | Jurczyk et al. |
| 2005/0258372 A1 | 11/2005 | McGregor et al. |
| 2006/0023828 A1 | 2/2006 | McGregor et al. |
| 2006/0043308 A1 | 3/2006 | Mcgregor et al. |
| 2006/0056573 A1 | 3/2006 | McGregor et al. |
| 2006/0138340 A1 | 6/2006 | Ianakiev et al. |
| 2006/0291606 A1 | 12/2006 | McGregor et al. |
| 2007/0018110 A1 | 1/2007 | McGregor et al. |
| 2008/0315109 A1 | 12/2008 | Stephan et al. |
| 2009/0302231 A1 | 12/2009 | McGregor et al. |
| 2010/0258736 A1 | 10/2010 | McCormick et al. |
| 2010/0258737 A1 | 10/2010 | McCormick et al. |

OTHER PUBLICATIONS

International Search Report and Written Opinion; International Application No. PCT/US2010/046736; date of mailing Oct. 20, 2010.

G.F. Knoll; "Radiation Detector and Measurement" 3rd Ed., Chapter 6 pp. 159-199 and chapter 14 pp. 505-535 (Wiley, New York, 2000).

R.D. Lowde; "The Design of Neutron Counters Using Multiple Detecting Layers", The Review of Scientific Instruments, 21 (1950) #10 pp. 835-842.

P.M. Dighe, D.N. Prasad, K.R. Prasad, S.K. Kataria, S.N. Athavale, A.L. Pappachan, A.K. Grover; "Boron-Lined Proportional Counters with Improved Neutron Sensitivity," Nuclear Instruments and Methods in Physics Research, A 496 (2003) pp. 154-161.

P.M. Dighe; "New Cathode Design Boron Lined Proportional Counters for Neutron Area Monitoring Applications", Nuclear Instruments and Methods in Physics Research, A 575 (2007) pp. 461 465.

M. Alex, J.P. Singh, D.N. Prasad, and P.K. Mukhopadhyay; "Development of a Gamma Compensated Boron Lined Ionisation Chamber for Reactor Safety and Control Applications", Nuclear Instruments and Methods in Physics Research, A 580 (2007) pp. 1395-1399.

P.M. Dighe and P.K. Mukhopadhyay; "Design and Development of a Wide Range Ion Chamber for Reactor Instrumentation", Nuclear Instruments and Methods in Physics Research, A 614 (2010) pp. 449-452.

D.S. McGregor, M.D. Hammig, H.K. Gersch, Y-H. Yang, and R.T. Klann; "Design Considerations for Thin Film Coated Semiconductor Thermal Neutron Detectors, Part I: Basics Regarding Alpha Particle Emitting Neutron Reactive Films", Nuclear Instruments and Methods in Physics Research, A500 (2003) pp. 272-308.

\* cited by examiner

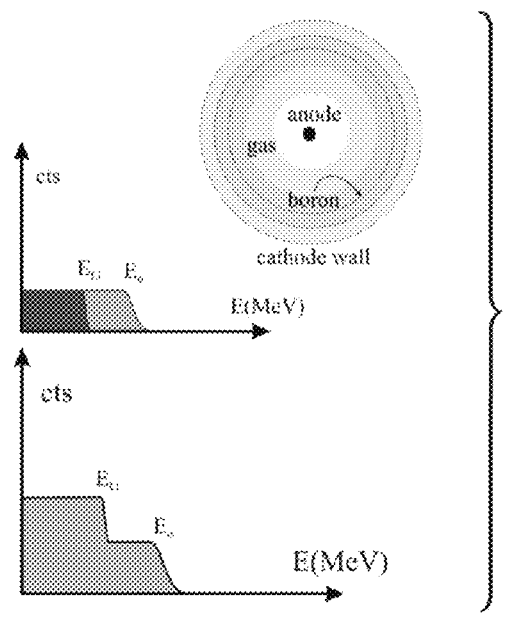
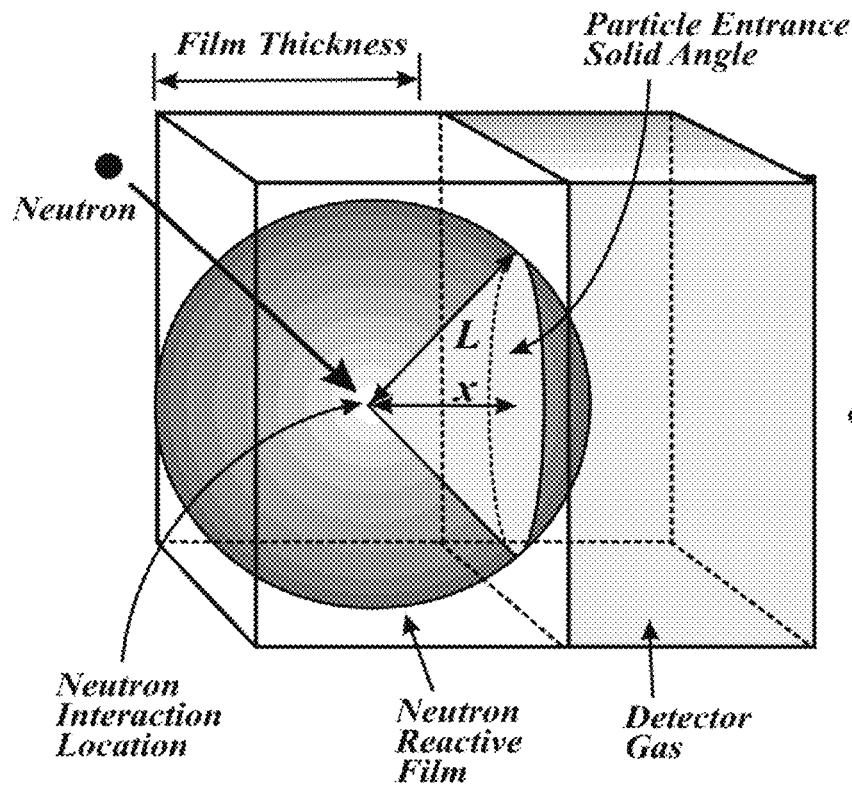

GAS-FILLED NEUTRON DETECTORS HAVING IMPROVED DETECTION EFFICIENCY

CROSS-REFERENCE TO RELATED APPLICATION

This application is a continuation-in-part of U.S. national phase of PCT Appln. No. PCT/US 2010/046736, filed Aug. 26, 2010, which claims the benefit of U.S. provisional patent application No. 61/275,278, filed Aug. 27, 2009, the disclosures of which are hereby incorporated by reference in their entirety.

TECHNICAL FIELD

This invention generally relates to gas-filled radiation detectors and, in particular, to gas-filled radiation detectors designed to detect neutrons of various energy ranges in the form of a large vessel with inserts at least partially composed of neutron reactive or absorbing material.

BACKGROUND AND BACKGROUND ART

Gas-filled detectors are arranged in three various forms, those forms being ion chambers, proportional counters, and Geiger-Mueller counters. Of these basic forms, the proportional counter design is often used as the fundamental instrument for a gas-filled neutron detector. Proportional counters rely upon avalanche multiplication in the gas to produce large electronic signals, each signal being proportional to the energy deposited in the detector chamber. Quite differently, ion chambers do not produce avalanche multiplication and Geiger-Mueller counters produce excessive avalanching such that the electronic signal is no longer proportional to the energy deposited in the chamber.

Gas-filled proportional counters used for neutron detectors can be further subdivided into two types, those being detectors filled with a neutron reactive gas and those detectors that are coated with a neutron reactive material. Neutron interactions in either the neutron reactive gas or the neutron reactive coating eject energetic charged particles that create ionization in the detector gas. A voltage applied to the gas chamber causes the ions and electrons to move, and this ionization is subsequently measured as a current thereby indicating a neutron interaction occurred.

The most popular type of gas-filled neutron detector is the type filled with a neutron reactive gas. However, in recent times, these neutron reactive gases have been deemed hazardous, as is the case for $BF_3$, or have become rare and difficult to acquire, as is the case for $^3He$. The gas-filled neutron detector design with neutron reactive materials coating the walls does not suffer from these issues, yet these coated detectors have an intrinsic problem in that they are limited to relatively low neutron detection efficiency. The low detection efficiency is a direct result of the reaction products having a limited range in the coating, hence any coating thicker than the reaction product particle ranges simply absorbs all of the particle energy, which is therefore not transferred to the detecting gas.

The converter films attached to gas-filled proportional counters most often used for neutron detection utilize either the $^6Li(n,t)^4He$ reaction or the $^{10}B(n,\alpha)^7Li$ reactions. Due to low chemical reactivity, the most common materials used are pure $^{10}B$ and $^6LiF$. Neutron reactive films based on the $^{157}Gd$ $(n,\gamma)^{158}Gd$ reaction show a higher neutron absorption efficiency than $^{10}B(n,\alpha)^7Li$ and $^6Li(n,\alpha)^3H$-based films, however the combined emission of low energy gamma rays and conversion electrons from $^{157}Gd(n,\gamma)^{158}Gd$ reactions make neutron-induced events difficult to discriminate from background gamma-ray events. As a result, Gd-based films are less attractive for devices where background gamma ray contamination is a problem. Alternatively, the particle energies emitted from the $^6Li(n,t)^4He$ and the $^{10}B(n,\alpha)^7Li$ reactions are relatively large and produce signals easily discernable from background gamma ray noise. Thus far, thermal neutron detection efficiencies have been limited to only 4% for $^6LiF$ and $^{10}B$ single-coated devices. However, devices that utilize pure $^6Li$ as the converter can have efficiencies as high as 13% for a single coated device. Unfortunately, pure Li decomposes rapidly in most circumstances, making a pure Li coated device impractical at present. As a result the most commonly used neutron converter films are B and LiF, both of which are poor electrical conductors. There are some cases in which fissionable material, such as $^{235}U$, $^{238}U$ and $^{232}Th$ are used in gas-filled detectors, yet these same coatings are generally used for gas-filled ion chambers.

The $^{10}B(n,\alpha)^7Li$ reaction leads to the following reaction products:

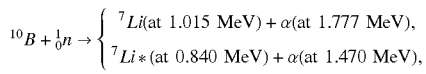

Reaction Q-Value
2.792 MeV (to ground state)
2.310 MeV (1st excited state)

which are released in opposite directions when thermal neutrons (0.0259 eV) are absorbed by $^{10}B$. After absorption, 94% of the reactions leave the $^7Li$ ion in its first excited state, which rapidly de-excites to the ground state ($\sim 10^{-13}$ seconds) by releasing a 480 keV gamma ray. The remaining 6% of the reactions result in the $^7Li$ ion dropping directly to its ground state. The microscopic thermal neutron absorption cross-section is 3840 barns. Additionally, the microscopic thermal neutron absorption cross-section decreases with increasing neutron energy, with a dependence proportional to the inverse of the neutron velocity (1/v) over much of the energy range.

The $^6Li(n,t)^4He$ reaction leads to the following products:

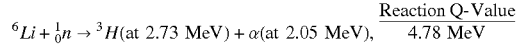

which again are oppositely directed if the neutron energy is sufficiently small. The microscopic thermal neutron (0.0259 eV) absorption cross-section is 940 barns. The thermal neutron absorption cross-section also demonstrates a 1/v dependence, except at a salient resonance above 100 keV, in which the absorption cross-section surpasses that of $^{10}B$ for energies between approximately 150 keV to 300 keV. Additional resonances characteristic to either isotope cause the absorption cross-section to surpass one or the other as the neutron energy increases. Due to its higher absorption cross-section, the $^{10}B$ $(n,\alpha)^7Li$ reaction leads to a generally higher reaction probability than the $^6Li(n,t)^4He$ reaction for neutron energies below 100 keV. However, the higher energy reaction products emitted from the $^6Li(n,t)^4He$ reaction lead to greater ease of detection than the particles emitted from the $^{10}B(n,\alpha)^7Li$ reaction.

The term "effective range" (denoted L) is the distance through which a particle may travel within the neutron reactive film before its energy decreases below the set minimum detectable threshold, or rather, before its energy decreases below the electronic lower level discriminator (LLD) setting. The term does not take into account additional energy losses from contact "dead regions". The neutron reaction products released do not have equal masses, and therefore do not have equal energies or effective ranges. Neutrons may interact anywhere within the reactive film, and the reaction products lose energy as they move through the neutron reactive film. Reaction product self-absorption reduces the energy transferred to the detector gas, and ultimately limits the maximum film thickness that can be deposited over the detector. The measured voltage signal is directly proportional to the number of ion pairs excited within the detector gas. Reaction products that deposit most or all of their energy in the detector will produce much larger voltage signals than those reaction products that lose most of their energy before reaching the detector.

The energy absorbed in the detector is simply the original particle energy minus the combined energy lost in the reactive absorber film and the detector contact during transit. At any reaction location within the reactive film, a reduced energy will be retained by either particle that should enter the detector, being the maximum possible if the trajectory is orthogonal to the device contact. Hence, if the interaction occurs in the $^{10}$B film at a distance of 0.5 μm away from the detector gas, the maximum energy retained by the $^7$Li ion when it enters the detector gas will be 430 keV, and the maximum energy retained by the alpha particle will be 1150 keV. For the same interaction distance of 0.5 μm from the detector, the energy retained by the particle when it reaches the detector gas decreases as the angle increases from orthogonal (>0°). Given a predetermined minimum detection threshold (or LLD setting), the effective range (L) for either particle can be determined For instance, an LLD setting of 300 keV yields $L_{Li}$ as 0.810 microns and $L_\alpha$ as 2.648 microns. Similar conditions exist for $^6$LiF and $^6$Li films.

A commonly used geometry involves the use of a cylindrical gas-filled detector over which a neutron reactive film has been deposited inside the cylinder. Assuming that the neutron beam is perpendicular to the cylinder wall and reactive film, the sensitivity contribution for a reaction product species can be found by integrating the product of the neutron interaction probability and the fractional solid angle, defined by the reaction product effective ranges subtending the device interface, which yields:

$$S_p(D_F) = 0.5 F_p \left\{ \left(1 + \frac{1}{\Sigma_F L}\right)(1 - e^{-\Sigma_F D_F}) - \frac{D_F}{L} \right\} \text{ for } D \leq L, \quad (1A)$$

and $$S_p(D_F) = 0.5 \ F_p e^{-\Sigma_F(D_F - L)} \left\{ \left(1 + \frac{1}{\Sigma_F L}\right)(1 - e^{-\Sigma_F L}) - 1 \right\} \text{ for } D_F > L, \quad (1B)$$

where $\Sigma_F$ is the macroscopic neutron absorption cross-section, $D_F$ is the film thickness, and $F_p$ is the branching ratio of the reaction product emissions. The total sensitivity accordingly can be found by adding all of the reaction product sensitivities $$S(D_F)|_{Total} = \sum_{p=1}^{N} S_p(D_F), \quad (2)$$

where N is the number of different reaction product emissions. In the case of $^{10}$B-based films, N equals 4. Notice from equation 1B that the value of $S_p$ reduces as $D_F$ becomes larger than the value of L. As a result of this, there will be an optimum neutron reactive film thickness for front-irradiated detectors. Because the minimum particle detection threshold determines the effective range (L), the optimum film thickness is also a function of the LLD setting. With the LLD set at 300 keV, the maximum achievable thermal neutron detection efficiency is 3.95%. The thermal neutron detection efficiency can be increased to 4.8% by lowering the LLD setting, but only at the expense of accepting more system noise and gamma-ray background interference. Similar cases exist for $^6$LiF and pure $^6$Li films. Using an LLD setting of 300 keV, obverse detector irradiation yields maximum thermal neutron detection efficiencies of 4.3% for $^6$LiF-coated devices and 11.6% for pure $^6$Li-coated devices. Hence, neutrons entering and exiting the gas detector are limited to a total efficiency of approximately 8.3%.

Design of Conventional $^{10}$B and $^6$Li Coated Gas-Filled Proportional Detectors In 1908, Ernest Rutherford and Hans Geiger constructed a device composed of a metallic cylinder with a thin wire arranged axially inside. The gas medium in the device was simply air. With the application of a voltage, alpha particles projected into the device produced sizable currents as measured with an electrometer. Rutherford and Geiger had devised the first radiation counter. They also noticed that the behavior of the detector changed with increasing voltage, mainly that alpha particles could be detected at much lower applied voltages than beta particles, a technique and application that later became known as proportional counting. Experiments conducted with the gas-filled detectors clearly showed distinctive regions of operation, as shown in FIG. 1.

The principle behind a gas-filled detector is quite simple. Radiation interactions in the gas or ejected particles from radiation interactions in the chamber walls cause the detector gas to become ionized, and a charge cloud composed of electrons and positive ions appears. A voltage placed across electrodes in the gas chamber causes the electrons and ions to drift apart, where electrons drift towards the anode and the positive ions drift towards the cathode. As the charged particles, or charge carriers, move through the chamber, they induce current to flow in a circuit externally connected to the chamber. This current, or change in current, can then be measured as an indication that a radiation interaction occurred in the chamber.

General Operation

Gas detectors can be operated in pulse mode or current mode. Pulse mode is generally used in low to moderate radiation fields. In such a case, a single radiation quantum, such as an alpha particle, beta particle or gamma ray, interacts in the chamber volume, giving rise to an ionized cloud. The charge carriers drift apart, and as they move, they induce current to flow to the device terminals; a charging circuit, usually consisting of a preamplifier and feedback loop, integrates the current and stores the charge, thereby producing a voltage potential. This voltage is measured as a single event, indicating that a single radiation quantum has been detected. The preamplifier circuit is subsequently discharged and reset, allowing the device to measure the next radiation interaction event. Hence, each voltage pulse from the detector indicates an individual radiation interaction event. Although extremely useful, there are drawbacks to this method. Should another radiation interaction occur while the detector is integrating or discharging the current from a previous interaction event, the device may not, and usually does not, record the new interaction, a condition referred to as pulse pile up. The time duration in which a new pulse can not be recorded is the detector recovery time, sometimes referred to as dead time. A pulse mode detector operated in low radiation fields has little problem with dead time count losses; however, a detector operated in high radiation fields may have significant dead time losses, thereby yielding an incorrect measurement of the radiation activity in the vicinity.

For high radiation fields, gas detectors are operated in current mode, in which the radiation induced current is measured on a current meter. Under such conditions, many interactions can occur in the device in short periods of time, and the current observed increases with total radiation exposure rate. Hence, current mode can be used to measure high radiation fields, with the magnitude of the current being a measure of the radiation induced ionization rate in the detector, thereby giving a measure of the radiation field in which the device is being operated. The disadvantage of current mode is that it does not identify individual radiation interactions.

FIG. 2 illustrates a gas-filled detector similar to that first explored by Geiger and Rutherford. The detector is exposed to directly ionizing radiation, which would include α-particles and β-particles. Either of these particles can cause ionization in the gas-filled device, thereby, producing electron-ion pairs. Hence, there are both an absorber and an observable, so that to produce a radiation detector only a method is needed to measure the amount of ionization. Suppose the device is connected to a simple electrometer so as to measure the current produced by the motion of the electron-ion pairs. Without an applied voltage, the electron-ion pairs diffuse randomly in all directions and eventually recombine. As a result, the net current from the electrometer is zero. Now apply a positive voltage to the thin wire of the device, or anode, so that the free electrons (negative charge) drift towards the anode and the free ions (positive charge) drift towards the detector wall. At low voltages, some measurable current is seen, yet considerable recombination still occurs, which is the recombination region identified as Region I in FIG. 1. As the voltage is increased, electron-ion pair separation becomes more efficient until practically no recombination occurs. Hence, the current measured is a measure of the total number of electron-ion pairs formed, which is Region II of FIG. 1, and is referred to as the ionization chamber region.

As the voltage is increased further, the electrons gain enough kinetic energy to create more electron-ion pairs through impact ionization. This provides a mechanism for signal gain, often referred to as gas multiplication. As a result, the observed current increases as the voltage increases, but is still proportional to the energy of the original radiation particle. This multiplication occurs in Region IIIa, the proportional region. Increasing the applied voltage further causes disproportional current increases to form, marked in FIG. 1 as Region Mb, beyond which, in Region IV, all currents, regardless of origin, radiation species or energies, are the same magnitude. Region IV is the Geiger-Mueller region. Finally, excessive voltage drives the detector into Region V where the voltage causes sporadic arcing and other spontaneous electron emissions to occur, hence causing continuous discharging in the detector. Gas detectors should not be operated in the continuous discharge region. In the following subsections, detector operation in Regions II, III, and IV is described in more detail.

Operation of Ion Chambers

The simplest gas-filled detector is the ion chamber. There are many configurations of ion chambers, and they are operated in Region II of the gas curve shown in FIG. 1. The detection method is simple. Ionizing radiation, such as alpha or beta particles, or gamma or x rays, enter into a region filled with a gas such as Ar or air. The chamber has electrodes across which a voltage is applied. When radiation interactions occur in the gas, they cause the gas to become ionized, which produces electron-ion pairs relative in number to the radiation energy absorbed. The voltage applied across the electrodes causes the negative electrons to separate from the positive ions and drift across the chamber volume. Electrons drift towards the anode and positive ions drift towards the cathode, and their movement induces current to flow in the external circuit. Typically, this induced current is sensed by either directly measuring the current or by storing the charge in a capacitor and measuring the resulting voltage.

The first case is referred to as current mode operation and the second case is pulse mode operation. Current mode operation is used in high radiation fields, and the magnitude of the current measured gives a measure of the intensity of the radiation field. Pulse mode is used for lower radiation fields, and allows for each individual radiation interaction in the chamber to be counted. Ion chambers come in many forms, and can be used for reactor power measurements, where the radiation field is very high, or as small personnel dosimeters, for use where radiation levels are typically low. Although simple in concept, two main problems occur in the ion chamber for pulse mode operation, those being (1) the signal measured is small, due to the fact that the current measured is only from the primary (or initial) electron-ion pairs excited by the radiation quantum and (2) the signal formation time can be long due to the slow motion of the heavy positive ions. Often, an RC circuit is connected to an ion chamber to reduce the time constant of the system and discharge the capacitor before all of the ions are collected, thereby reducing the time response.

Operation of Neutron-Sensitive Ion Chambers

If an ion chamber is coated with a strongly-absorbing neutron-reactive material or filled with a neutron reactive gas, such that ionizing particles are released from the neutron reactions, it can be used as a neutron detector. Commonly used isotopes for neutron detectors are $^3$He, $^{10}$B, $^6$Li, and $^{235}$U. Neutron sensitive ion chambers are usually filled with $^{10}$BF$_3$ or $^3$He gas, or the inside walls of the chamber are coated with $^{10}$B, $^6$LiF, or $^{235}$U. These gas-filled neutron detectors can be operated as ion chambers or proportional counters.

Ion chambers that use $^{235}$U are often referred to as fission chambers, since it is the fission fragments from the $^{235}$U that ionize the chamber gas. Fission chambers are often used where there is a mixed radiation field containing a large component of gamma rays. Fission fragments can deposit as much as 50 times the energy as gamma rays in a fission chamber. Hence, when operated in pulse mode, the voltage pulses formed by fission fragments are much larger than gamma-ray pulses, thereby, making it possible to discriminate between the two radiations. Due to problems with pulse pile up, ion chambers and fission chambers are generally not operated in pulse mode when in high radiation fields, although some special pulse mode designs incorporating $^{235}$U are used for in-core nuclear reactor monitoring.

Proportional Counters

Observe in FIG. 1 that Region III is separated into subregions, namely, Region IIIa (proportional) and Region IIIb (limited proportionality). Proportional counters are operated in region IIIa of the gas curve, in which an electronic pulse produced by ions moving through the detector is proportional to the original energy absorbed in the detector by a quantum of radiation, be they charged particles, neutrons, gamma rays or x rays. Although the gas-flow proportional counter was invented in 1943 by John Simpson, the actual effect of pulse height proportionality was known from those initial experiments conducted by Rutherford and Geiger with their gas-filled chambers. Ar is the most commonly used gas in a proportional counter, although there are many other gases that can be used, which include $^3$He, Xe, and $^{10}$BF$_3$.

Let us understand just exactly how the proportional counter operates. As with the ion chamber, a quantum of radiation can interact in the device's volume, either with the gas or with the chamber walls. If, for instance, a gamma ray interacts with the chamber wall, an energetic electron can be ejected into the gas volume, which then produces a cloud of electron-ion pairs. If the gamma ray interacts directly with the gas, then the primary energetic electron again produces a cloud of electron-ion pairs. In either case, a cloud of electron-ion pairs is formed in which the total number of ion pairs produced is proportional to the radiation energy deposited in the detector. Hence, by measuring the number of ion pairs formed, the energy deposited in the gas volume by the interacting radiation quantum can be determined This measurement can be performed by applying a voltage across the detector and measuring the current produced as the electrons and ions drift through the chamber volume. Yet, as explained with the ion chamber, such a current can be minuscule and hard to measure.

At high enough voltages, electrons can gain enough kinetic energy to cause more ionization and excitation in the gas, an effect called impact ionization. These newly liberated electrons gain enough energy from the electric field to cause even more ionization. The process continues until the electrons are collected at the anode. The entire process of generating the impact ionization cloud is called a Townsend avalanche, or sometimes gas multiplication, as illustrated in FIG. 3. There is a critical electric field $E_A$ at which gas multiplication begins and below which the electrons do not gain sufficient energy to cause impact ionization. This threshold electric field defines the difference between Region II and Region III in the gas curve.

Parallel plate detector configurations may work for ion chambers, but are seldom used for proportional counters. A preferred geometry is a coaxial configuration, as depicted in FIGS. 2 and 4. To understand why, compare the difference in electric fields between coaxial and parallel plate geometries, as shown below.

Consider the parallel plate detector configuration shown in FIG. 4. If the voltage is $V_o$ at $x=x_1$ and zero (grounded) at $x=x_2$, then it can be shown that the electric field is $$E(x) = \frac{V_O}{x_2 - x_1} = \frac{V_O}{W}, \qquad (3)$$

where W is the width between the parallel contacts. Notice that the electric field for the planar configuration is constant, hence a relatively large voltage is required to reach the critical avalanching field $E_A$.

Now consider the coaxial case also shown in FIG. 4. It can be shown that, for a voltage $V_o$ applied to the inner anode with the outer surface at ground potential, the electric field at radial distance r is $$E(r) = \frac{V_O}{r\ln(a/b)}, \qquad (4)$$

where a is the radius of the inner anode and b is the radius of the cathode shell wall. Unlike the planar case, the electric field is not constant for the coaxial case, and the highest electric field occurs at r=a.

Suppose the distance between b and a in the cylindrical case is the same as the distance between $x_2$ and $x_1$ in the planar, i.e., $b-a=x_2-x_1=W$. Now assume that highest value of the electric field in both cases just reaches the critical electric field $E_A$ such that $$E_A = \frac{V_O^{cylindrical}}{a\ln(b/a)} = \frac{V_O^{planar}}{W}, \qquad (5)$$

which, upon rearrangement, yields $$\frac{V_O^{planar}}{V_O^{cylindrical}} = \frac{W}{a\ln(a/b)}. \qquad (6)$$

If a<<b, then W=b−a≈b, so that the above result becomes $$\frac{V_O^{planar}}{V_O^{cylindrical}} \approx \frac{b/a}{\ln(b/a)} > 1 \qquad (7)$$

Because a<<b, for similar chamber dimensions, it is seen that the voltage needed to reach $E_A$ for the planar device is always greater than that needed for the cylindrical device.

Atomic electrons elevated in energy through impact ionization can also generate additional free electrons. The excited atoms de-excite by the emission of ultraviolet (UV) light which, in turn, can remove loosely bound electrons from other atoms through the process known as photoionization. Such electrons from photoionization can cause problems. To understand this, let δ be the probability that a secondary electron produces a tertiary electron as a result of UV photo-ionization. If f is the gas multiplication from the initial avalanche, the overall multiplication from successive avalanches caused by the UV produced photoionization electrons is $$M = f + \delta f^2 + \delta^2 f^3 + \ldots \delta^{n-1} f^n = \sum_{i=1}^{n} \delta^{i-1} f^i, \qquad (8)$$

where i represents the consecutive avalanche waves (first, second, third, and so on) up to the final avalanche n. The quantity δf is strongly dependent upon the applied operating voltage. If δf<1 the series in Eq. 8 reduces to $$M = \frac{f}{1-\delta f}. \qquad (9)$$

If, however, δf>1, the avalanching process becomes uncontrollable and the detector develops a self-sustaining discharge. This may occur when too high a voltage is applied (as in Region V of FIG. 1). Continuous waves of avalanches can occur if UV light released by the excited electrons ionize too many Ar atoms, and if the Ar atoms, when arriving at the cathode wall, strike with enough kinetic energy to cause the ejection of more electrons, as depicted in FIG. 5a. To prevent continuous waves of avalanching from occurring in the chamber after a radiation interaction, a quenching gas is added to the gas mixture, typically a polyorganic molecule. A common proportional counter gas is P-10, which is a mixture of 90% Ar and 10% methane (the quenching gas). When an ionizing particle enters the detector, it ionizes both the Ar and the quenching gas. However, as the Ar gas ions drift through the chamber, they transfer their charge to the quench gas molecules, which then continue to drift and carry the positive charge to the cathode wall. When a quench gas is struck by a UV photon or strikes the cathode wall, it dissociates by releasing a hydrogen atom rather than ejecting an electron, as shown in FIG. 5b. As a result, the quench gas prevents continuous waves of avalanches.

Multiwire Proportional Counter

Multiwire proportional counters, developed in 1968 by Charpak, are similar to single wire devices, except that they use a criss-cross array of wires. Typically there are two planar arrays of parallel cathode wires with the arrays positioned orthogonal to each other. One might consider one set of wires parallel to the x direction and the other set parallel to the y direction. In between the two cathode wire array planes is a parallel planar array of anode wires, which are typically arranged at a 45° angle to the cathode wires (see FIG. 6). As with the simple proportional counter, ionizing radiation produces primary electron-ion pairs in the detector gas. Electrons travel towards the nearest anode wires in the array, which then produce a Townsend avalanche of electron-ion pairs. The cloud of positive ions separate and travel towards the nearest cathode wires in the planes on both sides of the anodes. Hence, the position of the event is determined by which cathode wires deliver a signal on the x-y plane. Overall, the multiwire proportional counter can provide both energy information and position information of the ionizing event. Charpak was awarded the 1992 Nobel Prize in Physics for his invention of the multi-wire proportional chamber.

Neutron-Sensitive Proportional Counters

As with the ion chamber, proportional counters that are either coated with a strongly absorbing neutron reactive material or are filled with a neutron reactive gas can be used as neutron detectors. The most commonly used materials for proportional counter neutron detectors are the gases $^3$He and $^{10}$BF$_3$, and the solid $^{10}$B. Although neutron sensitive, neither $^{10}$BF$_3$ nor $^3$He are ideal proportional gases, but they perform adequately well. Because the device operates in proportional mode, a low resolution spectrum associated with the reaction product energies of the $^{10}$B(n,α)$^7$Li reactions or the $^3$He(n,p)$^3$H reactions can be identified, depending on the gas used in the counter. This prior art type of gas-filled neutron detector is depicted in FIGS. 8 and 9.

Shown in FIG. 8 is a prior art gas flow detector in which a neutron reactive gas 6 is constantly purged through the detector chamber composed of cathode walls 1 and lid 2. Voltage is applied to the electrodes 5, typically operated as the anodes. A neutron 8 enters the detector through a thin membrane 7 into the reactive gas 6 and is absorbed. The reaction results in the instantaneous emission of reaction products 9 which cause ionization 11 in the gas 6. The electrons are drawn towards the anodes 5, which cause a Townsend avalanche and voltage output pulse.

Shown in FIG. 9 is a prior art gas-filled detector in which a neutron reactive gas 6 is sealed in detector chamber composed of a cylindrical cathode 1. Voltage is applied to the electrode 5, typically operated as the anode. A neutron 8 enters the detector through the cathode wall 1 into the reactive gas 6 and is absorbed. The reaction results in the instantaneous emission of reaction products 9 which cause ionization 11 in the gas 6. The electrons are drawn towards the anode 5, which cause a Townsend avalanche and voltage output pulse.

The neutron detection efficiency can be increased by increasing the gas pressure of the counter, hence providing more neutron absorber. Typical pressures range from 1 atm to 10 atm. Electron and ion velocities decrease inversely proportional to gas pressure: consequently, increasing the gas pressure in the tube causes the counter dead time to increase. Gas-filled tubes come in a variety of sizes, ranging from small chambers only a few cm long and one cm in diameter to large chambers several feet long and several inches in diameter.

Unfortunately $^3$He is relatively rare gas that has become expensive in recent times, thereby driving up the cost of these gas-filled detectors. Further, $^{10}$BF$_3$ is a poisonous gas and does have certain health risks associated with their production, use and disposal.

A better proportional gas such as P-10, a gas that is non-reactive with neutrons, may be used in the chamber if, instead of filling the chamber with a neutron reactive gas, the walls are coated with $^{10}$B. Unfortunately, the spectral features from such a device are harder to interpret due to interference from background gamma rays, and the total neutron detection efficiency is limited by the thinness of the optimum $^{10}$B absorber coating, typically only 2 to 3 microns thick.

Shown in FIG. 10 is a common design for a coated proportional counter used for neutron detection, in which a neutron reactive coating 12 is on the cathode wall 1. The detector is filled with a gas 13 generally not reactive with neutrons. Neutrons are absorbed in the reactive coating 12 which results in the emission of ionizing reaction products 9. Due to the geometry, and the fact that the reaction products are emitted in opposite directions, only one of the reaction products 9 can enter the detector gas. The result is a decreased amount of energy deposited in the detector than the total Q value of the reaction, resulting in less ionization 11. Further, due to self absorption of energy as the reaction product travels through the neutron absorbing film to the detector gas, more energy can be lost, a significant problem with this type of detector. Further, the total overall efficiency that can be achieved with the design is less than 10% detection of thermal neutrons.

Referring now to FIGS. 11 and 12, there is shown a prior art detector where metal washers 30 have been inserted down the axis of the cylindrical gas-filled detector. The washers 30 are separated by spacers 31 and the washers 30 are coated on both sides with a neutron reactive material 12. Although the design increases the overall efficiency of the detector, it has a limit to the efficiency that can be realized. Further, the detector of FIGS. 11 and 12 is designed to point, end to end, at the neutron source. Because of the geometry of the detector of FIGS. 11 and 12, neutrons will not be detected effectively if the detector is irradiated from the side, which is the preferred method of operating gas-filled neutron detectors. A practical device will be limited to less than 35% detection efficiency of thermal neutrons if the device is irradiated end on, reducing to almost 0% if irradiated from the side. As with the detector of FIG. 10, only one reactive product can enter the gas chamber because the other reaction product enters the metal washer 30.

Referring again to FIG. 8, there is illustrated a prior art gas-filled neutron detector, depicting a cross-section of a typical multi-anode gas-filled neutron detector. The detector is composed of a container 1 with a lid 2 that contains the neutron-reactive detector gas in the cavity 6. The detector gas is generally a material that reacts strongly with neutrons. Example neutron-reactive gases used in these detectors include $^3$He and $^{10}$BF$_3$. A thin barrier 7 completes the detector enclosure. Aluminized Mylar is typically used as a thin barrier. The detector container 1 serves as an electrode. An additional electrode or series of electrodes 5 are provided, usually thin wires 5, in order to apply a voltage across the gas in the detector cavity 6. Neutrons 8 interact in the neutron reactive gas and subsequently cause the ejection of ionizing radiation 9. The ionizing radiation enters the gas and excites electron-ion pairs 11. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the outer perimeter and the current produced by their motion is measured and recorded as a neutron interaction event. The neutron-reactive gas is constantly replenished thought ports 3 and 4. The detector efficiency of FIG. 8 can be high, often above 80%.

Referring again to FIG. 9, there is illustrated a prior art gas-filled neutron detector, depicting a cross-section of a typical coaxial single anode gas-filled neutron detector. The detector is composed of a container 1 that contains the neutron-reactive detector gas in the cavity 6. The detector gas is generally a material that reacts strongly with neutrons. Example neutron-reactive gases used in these detectors include $^3$He and $^{10}$BF$_3$. The detector container 1 serves as an electrode. An additional electrode 5 is provided, usually a thin wire 5, in order to apply a voltage across the gas in the detector cavity 6. Neutrons 8 interact in the neutron reactive gas and subsequently cause the ejection of ionizing radiation 9. The ionizing radiation enters the gas and excites electron-ion pairs 11. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event. The detector efficiency of FIG. 9 can be high, often above 80%. The gas in this style of detector is not replenished and can be exhausted over a period of time.

Referring again to FIG. 10, there is illustrated a prior art coated gas-filled neutron detector, depicting a cross-section of a typical coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Neutrons 8 interact in the neutron reactive coating 12 and subsequently cause the ejection of ionizing radiation 9. The ionizing radiation enters the gas and excites electron-ion pairs 11. Note that the configuration does not allow for both reaction products 9 to enter the detector cavity 1, but instead only one reaction product 9 can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event. The detector efficiency of FIG. 10 is usually low, limited to less than 10%.

Referring again to FIG. 11, there is illustrated a prior art coated gas-filled neutron detector, depicting a coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Torus shaped metal washers 30 are coated with neutron reactive material 12. Neutrons 8 interact in the neutron reactive coating 12 and subsequently cause the ejection of ionizing radiation 9. The ionizing radiation enters the gas and excites electron-ion pairs 11. Note that the configuration does not allow for both reaction products 9 to enter the detector cavity 1, but instead only one reaction product 9 can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event.

Referring again to FIG. 12, there is illustrated a prior art coated gas-filled neutron detector, depicting a coaxial single anode gas-filled neutron detector. The detector is composed of a container 1 that contains the non-reactive detector gas in the cavity 13. The detector gas is generally a material that does not react strongly with neutrons. Example neutron-reactive gases used in these detectors include Ar and P-10, a mixture of 10% methane and 90% Ar. The detector container 1 serves as an electrode. An additional electrode 5 is provided, usually a thin wire 5, in order to apply a voltage across the non-reactive gas in the detector cavity 13. Torus shaped metal washers 30 are coated with neutron reactive material 12. The metal washers 30 are separated by insulting spacers 31. Neutrons 8 interact in the neutron reactive coating 12 and subsequently cause the ejection of ionizing radiation 9. The ionizing radiation enters the gas and excites electron-ion pairs 11. Note that the configuration does not allow for both reaction products 9 to enter the detector cavity 1, but instead only one reaction product 9 can enter the cavity 1. These electron-ion pairs are separated by the applied detector voltage. Typically, a positive voltage is applied to the small wire electrode 5, named the anode. Electrons drift to the anode, and upon reaching the anode, create a Townsend avalanche, thus producing a much larger number of electron-ion pairs. The new positive ions drift toward the outer perimeter and the current produced by their motion is measured and recorded as a neutron interaction event.

Geiger-Mueller Counters

Although Hans Geiger originally created the gas-filled detector in 1908 (with Ernest Rutherford), the device used today is based on an improved version that his first PhD student, Walther Mueller, constructed in 1928. Hence, the proper name for the device is the "Geiger-Mueller" counter. The original "Geiger" counter was sensitive to alpha particles, but not so much to other forms of ionizing radiation. Mueller's improvements included the implementation of vacuum tube technology, which allowed for the device to be formed into a compact and portable tube sensitive to alpha, beta and gamma radiation. In 1947, Sidney Liebson further improved the device by substituting a halogen as the quenching gas, which allowed the detector to operate at lower applied voltages while lasting a significantly longer time. Geiger counters are typically arranged in a coaxial configuration, in which a thin anode wire is projected inside a tube that serves as the cathode. A high voltage is applied to the central anode wire, while the cathode is held at ground, as shown in FIG. 2.

Geiger-Mueller counters are operated in Region IV of the gas counter curve. The device depends upon gas multiplication as a signal amplification mechanism, much like the proportional counter, however a single important difference is that, at any specific applied voltage, all output pulses from a Geiger-Mueller counter are of the same magnitude regardless of the ionizing radiation energy or type. Hence, Geiger-Mueller counters do not intrinsically possess the ability to discern between alpha, beta, or gamma radiation, nor can they distinguish between different energies of these radiations.

When an ionizing particle enters a Geiger-Mueller counter, the counting gas becomes ionized creating a small cloud of electron-ion pairs (depicted in FIG. 7(a)). Because a high voltage is applied to the anode, the device operates in region IV of the gas curve. The electrons drift rapidly to the anode while the ions slowly drift towards the cathode, as shown in FIG. 7(b). When the electrons enter into the high electric field near the anode above the critical field $E_A$ needed to produce avalanche ionization, they gain enough kinetic energy to produce more electron-ion pairs through impact ionization, and a large and dense cloud of electron-ion pairs is formed. In addition, impact ionizations excite electrons in some gas atoms which emit UV photons when they de-excite and produce more ionization through photoionization. This large accumulation of positive ions near the anode affects the electric field and reduces its strength. These processes are depicted in FIGS. 7(c) and (d). There is a point at which the large accumulation of space charge around the anode increases so much that the electric field is reduced below the critical field strength $E_A$ needed to sustain avalanching; hence, impact ionization ceases, as shown in FIG. 7(e). The positive ions drift to the cathode, which produces the output pulse for the detector. As they move towards the cathode, the electric field near the anode recovers to full strength once again, and the detector is now set to detect the next radiation interaction event, as depicted by FIG. 7(f).

A few matters should be noted: (a) the electric field in the detector increases with an increase in applied voltage; (b) the Geiger-Mueller discharge ceases when the electric field is reduced below $E_A$ at the anode and, therefore, the positive ion accumulation density must increase with applied operating voltage to stop the avalanche; (c) to prevent more electrons from being ejected when the ions strike the cathode, a quenching gas must be used just as with the proportional counter; and (d) the entire Geiger discharge process is slower than that of a proportional counter, mainly because of the time required to produce the dense cloud of positive ions. Hence, the size of the output pulse is determined by how much space charge must accumulate to reduce the electric field below $E_A$ and not the energy deposited within the detector. As a result, the pulse height for various energies of α-particles, β-particles, and γ-rays are all the same, within statistical variation, and the output pulse height is predetermined by the applied operating voltage. Dead times for Geiger-Mueller counters can be on the order of 10 times longer than those of proportional counters of similar size. Lastly, because Geiger-Mueller counters are typically closed tubes, the quenching gas inside can be exhausted over time if traditional organic molecules such as the methane component of P-10 gas are used. Instead, Geiger-Mueller counters use halogens for a quenching gas, in which the diatomic molecules dissociate when they strike the cathode. Halogens, unlike methane, can heal themselves by recombining into diatomic molecules, thereby extending the life of the gas in the detector.

Considering equations 1 and 2, gas-filled detectors relying upon neutron reactive coatings are limited to low efficiencies due to reaction product self-absorption. Neutrons impinging upon a cylindrical gas-filled detector with a coating on the inner tube surface must first cross the coating before entering into the detector gas, and those not absorbed must again cross the coating while exiting the device. As a result, the maximum efficiency that the device can have will be limited to less than 10% thermal neutron detection efficiency. Detectors with washers coated with neutron reactive material aligned down the axis of a detector can increase the neutron detection efficiency, but are ineffective when irradiated from the side and are designed to point end on at the neutron source.

REFERENCES

1. G. F. Knoll, Radiation Detector and Measurement, $3^{rd}$ Ed., (Wiley, New York, 2000).
2. R. D. Lowde, "The Design of Neutron Counters Using Multiple Detecting Layers", The Review of Scientific Instruments, 21 (1950) #10 pp. 835-842.
3. P. M. Dighe, D. N. Prasad, K. R. Prasad, S. K. Kataria, S. N. Athavale, A. L. Pappachan, A. K. Grover, "Boron-Lined Proportional Counters with Improved Neutron Sensitivity," Nuclear Instruments and Methods in Physics Research, A 496 (2003) pp. 154-161.
4. P. M. Dighe, "New Cathode Design Boron Lined Proportional Counters for Neutron Area Monitoring Applications", Nuclear Instruments and Methods in Physics Research, A 575 (2007) pp. 461-465.
5. M. Alex, J. P. Singh, D. N. Prasad, and P. K. Mukhopadhyay, "Development of a Gamma Compensated Boron Lined Ionisation Chamber for Reactor Safety and Control Applications", Nuclear Instruments and Methods in Physics Research, A 580 (2007) pp. 1395-1399.
6. P. M. Dighe and P. K. Mukhopadhyay, "Design and Development of a Wide Range Ion Chamber for Reactor Instrumentation", Nuclear Instruments and Methods in Physics Research, A 614 (2010) pp. 449-452.
7. D. S. McGregor, M. D. Hammig, H. K. Gersch, Y-H. Yang, and R. T. Klann, "Design Considerations for Thin Film Coated Semiconductor Thermal Neutron Detectors, Part I: Basics Regarding Alpha Particle Emitting Neutron Reactive Films", Nuclear Instruments and Methods in Physics Research, A500 (2003) pp. 272-308.
8. J. H. Hiller, S. A. Wallace, S. Dai, entitled "Neutron Detector Using Sol-Gel Absorber", U.S. Pat. No. 5,973,328 dated Oct. 26, 1999.
9. D. J. Cotic, entitled "Modular Array Radiation Detector", U.S. Pat. No. 4,272,680 dated Jun. 9, 1981.

10. C. A. Young, B. D. Geelhood, entitled "Lithium-6 Coated Wire Mesh Neutron Detector", U.S. Pat. No. 4,481,421 dated Nov. 6, 1984.

The following U.S. patent documents are related to the present invention: U.S. Pat. Nos. 6,175,120; 6,479,826; 6,781,132; 6,921,903; 2006/0023828; 2006/0043308; 2006/0056573; 2006/0291606; 7,164,138; 2007/0018110; and 2009/0302231.

SUMMARY OF EXAMPLE EMBODIMENT

The above-mentioned and other problems are solved by applying the principles and teachings associated with the hereinafter described different embodiments of compartmentalized gas-filled neutron detectors. Gas-filled detectors are designed such that one or more objects or structures having large surface areas are incorporated into the gas-filled detectors, where these surfaces are coated with neutron reactive material, or the surfaces or surface portions are composed, at least partially, of neutron reactive material. The surfaces or surface portions may be flat or curved fins or plates, porous or filamentary material, or semi-solid material or aerogel. The incorporation of the extended surfaces coated with or composed of neutron reactive material increases the neutron detection efficiency of the gas-filled detectors over conventional coated designs.

These surfaces or surface portions increase the amount of neutron reactive material present in the detectors over conventional coated designs and as a result increase the neutron detection efficiency. The one or more objects or structures can be made of conducting, semiconducting or insulating materials. The surfaces or surface portions are arranged such that they do not detrimentally detract from the main function of a gas-filled detector with particular attention to gas-filled proportional detectors. The use of porous media, such as foam, sponge, filamentary material, or aerogel, allows for neutron reactive structures to be inserted into the detector that allow for all reaction products resulting from at least one absorbed neutron to be released into the detector chamber and into the detector gas, a feature not possible with prior art coated neutron detectors.

An object of at least one embodiment of the present invention is to provide neutron detectors that have detection efficiencies many times greater than present coated gas-filled neutron detectors while remaining relatively inexpensive to construct.

Another object of at least one embodiment of the present invention is to provide a neutron detector than does not need to use $^{10}BF_3$ or $^3He$ gases and operates on common proportional gases such as Ar and P-10.

Still another object of at least one embodiment of the present invention is to provide a method to construct gas-filled neutron detectors with solid source neutron absorbers instead of neutron reactive gases, where the solid source neutron absorbers allow for all reaction products resulting from at least one absorbed neutron to enter the non-reactive detector gas.

Yet still another object of at least one embodiment of the present invention is to provide compartmentalized gas-filled detectors than can be used to reduce false counts from background radiations other than neutrons.

In carrying out of the above objects and other objects of the present invention, an apparatus for efficiently detecting neutrons is provided. The apparatus includes a detector cavity in which a detector gas is contained. The apparatus further includes at least one object disposed within the cavity. At least surface portions of the at least one object include neutron reactive material. The surface portions are sized and arranged in the cavity to reduce or prevent neutron streaming through the cavity. The material absorbs neutrons and the at least one object releases all ionizing radiation reaction products resulting from at least one absorbed neutron into the gas. The apparatus still further includes a plurality of electrodes including at least one anode and at least one cathode for generating an electric field within the cavity upon the application of a voltage to the electrodes.

The apparatus may further include a surface which at least partially defines the cavity and a coating of neutron reactive material on the surface.

The at least one object may include fins having substrate portions. The surface portions may have coatings of neutron reactive material on the substrate portions.

The neutron reactive material may include at least one of elemental, enriched and compound forms of lithium, boron, gadolinium, cadmium, uranium, plutonium and thorium.

The at least one object may have a substrate portion. The surface portions may be coatings of the material on the substrate portion and the coatings may release a charged particle, light or photon that interacts with the detector gas.

The substrate portions of the fins may be composed of one or more conductive materials.

The substrate portions of the fins may be composed of at least one of insulating, semi-insulating and semiconducting materials to ensure that the fins do not disrupt the electric field within the cavity.

The substrate portions of the fins may be composed of neutron reactive porous material that allows one or more reaction products to be released into the gas.

The fins may be arranged geometrically within the cavity to reduce or prevent neutron streaming through the cavity.

The surface portions may be composed of neutron reactive porous material that allows substantially one or more reaction products to be released into the gas.

The neutron reactive porous material may include at least one of elemental, enriched or compound forms of lithium, boron, gadolinium, cadmium, uranium, plutonium and thorium.

The at least one object may have a substrate portion. The surface portions may be composed of a coating of neutron reactive porous material on the substrate portion and the coating may release a charged particle, light or photon that interacts with the detector gas.

The surface portions may be arranged geometrically within the cavity to reduce or prevent neutron streaming through the cavity.

The porous material may be composed of at least one of a foam, sponge, aerogel, fibrous and filamentary material.

The porous material may be a combination of a foam, sponge, aerogel, fibrous or filamentary material.

The apparatus may still further include a plurality of subcompartments disposed within the cavity and which may restrict the ranges of the reaction products.

The neutrons may be thermal neutrons.

Still further in carrying out the above objects and other objects of the present invention, an apparatus for efficiently detecting neutrons is provided. The apparatus includes a plurality of walls at least partially defining a detector cavity which encloses a detector gas. The walls of the cavity are operable as an outer electrode. The apparatus further includes a thin conductive wire disposed within the cavity and operable as an inner electrode. The apparatus still further includes a conductive grid surrounding the thin wire and operable as an intermediate electrode. The apparatus further includes at least one object disposed within the cavity. At least surface portions of the at least one object include neutron reactive material. The surface portions are sized and arranged in the cavity to reduce or prevent neutron streaming through the cavity. The material absorbs neutrons and the at least one object releases all ionizing radiation reaction products resulting from at least one absorbed neutron into the gas.

The apparatus may further include a surface which at least partially defines the cavity and a coating of neutron reactive material on the surface.

The at least one object may include fins having substrate portions. The surface portions may be coatings of neutron reactive materials on the substrate portions.

The substrate portions of the fins may be composed of neutron reactive porous material that allows one or more reaction products to be released into the gas.

The neutron reactive material may include at least one of elemental, enriched or compound forms of lithium, boron, gadolinium, cadmium, uranium, plutonium and thorium.

The at least one object may have a substrate portion. The surface portions may be coatings of the material on the substrate portion and the coatings may release all charged particles and light or photons resulting from at least one absorbed neutron and interact with the detector gas.

The substrate portions of the fins may be composed of one or more conductive materials.

The substrate portions of the fins may be composed of at least one of insulating, semi-insulating and semiconducting materials to ensure that the fins do not disrupt the electric field within the cavity.

The fins may be arranged geometrically within the cavity to reduce or prevent neutron streaming through the cavity.

The surface portions may be composed of neutron reactive porous material that allows one or more reaction products to be released into the gas.

The neutron reactive porous material may include at least one of elemental, enriched or compound forms of lithium, boron, gadolinium, cadmium, uranium, plutonium and thorium.

The at least one object may have a substrate portion. The surface portions may be composed of a coating of neutron reactive porous material on the substrate portion and the coating may release a charged particle, light or photon that interacts with the detector gas.

The surface portions may be arranged geometrically within the cavity to reduce or prevent neutron streaming through the cavity.

The porous material may be composed of at least one of a foam, sponge, aerogel, fibrous and filamentary material.

The porous material may be a combination of a foam, sponge, aerogel, fibrous or filamentary material.

The apparatus may still further include a plurality of subcompartments disposed within the cavity and which restrict the ranges of the reaction products.

The neutrons may be thermal neutrons.

Yet, still further in carrying out the above objects and other objects of the present invention, an apparatus for efficiently detecting neutrons is provided. The apparatus includes a first surface which partially defines a detector cavity which encloses a detector gas. The first surface is operable as a first electrode. The apparatus further includes a second surface which partially defines the cavity. The second surface is operable as a second electrode. The apparatus still further includes a structure including a plurality of compartments filled with the gas and disposed within the cavity. At least inner surface portions of the structure include neutron reactive material. The surface portions are sized and arranged in the cavity to reduce or prevent neutron streaming through the cavity. The material absorbs neutrons and the structure releases all ionizing radiation reaction products having ranges resulting from at least one absorbed neutron into the gas. The compartments restrict the ranges of the reaction products and limit total energy deposited in the apparatus such that response signals from background radiation are reduced and substantially eliminated.

The electrodes may be arranged and connected so that the apparatus operates as a single detector.

The structure may include substrate portions. The surface portions may be coatings of the neutron reactive material on the substrate portions.

The substrate portions of the fins may be composed of neutron reactive porous material that allows one or more reaction products to be released into the gas.

The neutron reactive material may include at least one of elemental, enriched or compound forms of lithium, boron, gadolinium, cadmium, uranium, plutonium and thorium.

The structure may include substrate portions. The surface portions may be coatings of the neutron reactive material on the substrate portions and the coatings may release charged particles, light or photons that interact with the detector gas.

The substrate portions may be composed of one or more conductive materials.

The substrate portions may be composed of at least one of insulating and semi-insulting materials to ensure that the structure does not disrupt the electric field within the cavity.

The surface portions of the structure may be arranged geometrically within the cavity to reduce or prevent neutron streaming through the cavity.

The surface portions of the structure may be composed of neutron reactive porous material.

The neutron reactive porous material may include at least one of elemental, enriched or compound forms of lithium, boron, gadolinium, cadmium, uranium, plutonium and thorium.

The structure may include substrate portions. The surface portions may be coatings of neutron reactive porous material and the coatings may release charged particles, light or photons that interact with the detector gas.

The surface portions may be arranged geometrically within the cavity to reduce or prevent neutron streaming through the cavity.

The porous material may be at least one of a foam, sponge, aerogel, fibrous and filamentary material.

The porous material may be a combination of a foam, sponge, aerogel, fibrous or filamentary material.

The neutrons may be thermal neutrons.

The electrodes may be arranged and separated so that the apparatus operates as a detector array having a plurality of individual detectors.

Inner surface portions of neighboring compartments may include different neutron reactive material.

The structure may include substrate portions. The surface portions may be coatings of the at least one neutron reactive material on the substrate portions.

The neutron reactive material may include at least one of elemental, enriched or compound forms of lithium, boron, gadolinium, cadmium, uranium, plutonium and thorium.

The structure may include substrate portions. The surface portions may be coatings of the neutron reactive material on the substrate portions and the coatings may release charged particles, light or photons that interact with the detector gas.

The substrate portions may be composed of one or more conductive materials.

The substrate portions may be composed of at least one of insulating and semi-insulting material to ensure that the structure does not disrupt the electric field within the detector cavity.

The surface portions of the structure may be arranged geometrically within the cavity to reduce or prevent neutron streaming through the cavity.

The substrate portions of the fins may be composed of neutron reactive porous material that allows one or more reaction products to be released into the gas.

The surface portions of the structure may be composed of neutron reactive porous material.

The neutron reactive porous material may include at least one of elemental, enriched or compound forms of lithium, boron, gadolinium, cadmium, uranium, plutonium and thorium.

The structure may include substrate portions. The surface portions may be coatings of neutron reactive porous material and the coatings may release charged particles, light or photons that interact with the detector gas.

The surface portions may be arranged geometrically within the cavity to reduce or prevent neutron streaming through the cavity.

The porous material may be at least one of a foam, sponge, aerogel, fibrous and filamentary material.

The porous material may be a combination of a foam, sponge, aerogel, fibrous or filamentary material.

The neutrons may be thermal neutrons.

Inner surface portions of neighboring compartments may include different neutron reactive porous material.

The teachings in the present application are designed primarily for gas-filled proportional counters. However, the teachings can also be used in gas-filled ion chambers and Geiger-Mueller counters. Described and taught herein is a method and apparatus to increase the detection efficiency of coated gas-filled neutron detectors by the insertion of neutron reactive inserts and/or multiple extended surfaces coated with neutron reactive material.

The above objects and other objects, features and advantages of at least one embodiment of the present invention are readily apparent from the following detailed description of the best mode for carrying out the invention when taken in connection with the accompanying drawings.

BRIEF DESCRIPTION OF THE DRAWINGS

FIG. 7a illustrates how a primary event creates ion pairs; FIG. 7b shows how electrons rapidly drift to the anode and cause a Townsend avalanche which, in turn, creates a tremendous number of ion pairs; FIG. 7c shows how UV light from excited atoms in the avalanche excite more ion pairs; FIG. 7d shows waves of avalanches occurring from the ion pairs excited by released UV light; positive space charge begins to build up around the anode; FIG. 7e shows how positive space charge builds up around the anode to the point that the electric field is reduced below the critical value for avalanching; the avalanching ceases; and FIG. 7f illustrates how the space charge drifts away from the anode toward the cathode (i.e. wall); the electric field recovers such that another Geiger discharge can occur;

FIG. 39 (upper right) is a perspective schematic view of the other side or half of the detector; FIG. 39 (lower) is a perspective schematic view of the two halves positioned together to form a gas-filled detector constructed in accordance with at least one embodiment of the present invention and having multiple compartments designed as channels; electrical contacts within the individual compartments are coated with neutron reactive material; the compartments are sized to be smaller than the reaction products ranges;

FIG. 42 (upper right) is a perspective schematic view of the other side or half of the detector; FIG. 42 (lower) is a side view in cross-section of a detector constructed in accordance with at least one embodiment of the present invention and formed when the halves are positioned together; the resulting gas-filled detector has multiple compartments designed as channels; electrical contacts within the individual compartments are coated with neutron reactive material; the compartments are sized to be smaller than the reaction products ranges;

FIG. 43 (upper right) is a perspective schematic view of the other side or half; FIG. 43 (lower) is a side view in cross-section of a detector constructed in accordance with at least one embodiment of the present invention when the halves are positioned together; the resulting gas-filled detector has multiple compartments designed as channels; electrical contacts within the individual compartments are coated with neutron reactive material; the compartments are sized to be smaller than the reaction products ranges;

FIG. 48 shows a schematic view and corresponding graphs including a "stair-step" spectrum from the wall effect;

FIG. 49 is a schematic view which illustrates the angular effect;

DETAILED DESCRIPTION OF THE PREFERRED EMBODIMENTS

In general, parts having the same or similar structure or functions have the same reference number from drawing figure to drawing figure.

Figure 13:
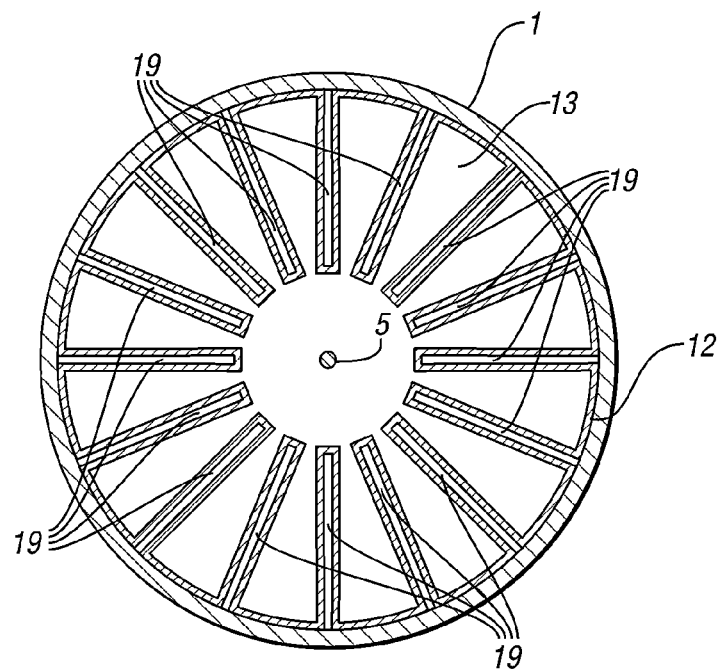
FIG. 13 is an end sectional view of a gas-filled detector constructed in accordance with at least one embodiment of the present invention, showing an internal view of the detector that has fins radiating inward from a tube wall; the fins are coated with a neutron reactive material.

Referring now to FIG. 13, there is shown a cross-section of a preferred embodiment of the invention, showing an outer electrode 1 that also serves as the gas container and cathode, and inner electrode 5 that serves as the anode, and fins 19 radiating inwards towards the central electrode, thereby compartmentalizing the detector. The fins 19 are coated with a neutron reactive material 12. By introducing the coated fins 19 into the chamber, the overall amount of neutron reactive material is increased, while the thickness of the coating on each fin is less than ionizing reaction product ranges. Overall, the ionizing reaction products can still reach the detector gas and the detector neutron detection efficiency is greatly increased. Examples of the neutron reactive coating 12 include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. It is to be understood that all lists of neutron reactive coatings herein include natural boron and natural lithium.

Figure 14:
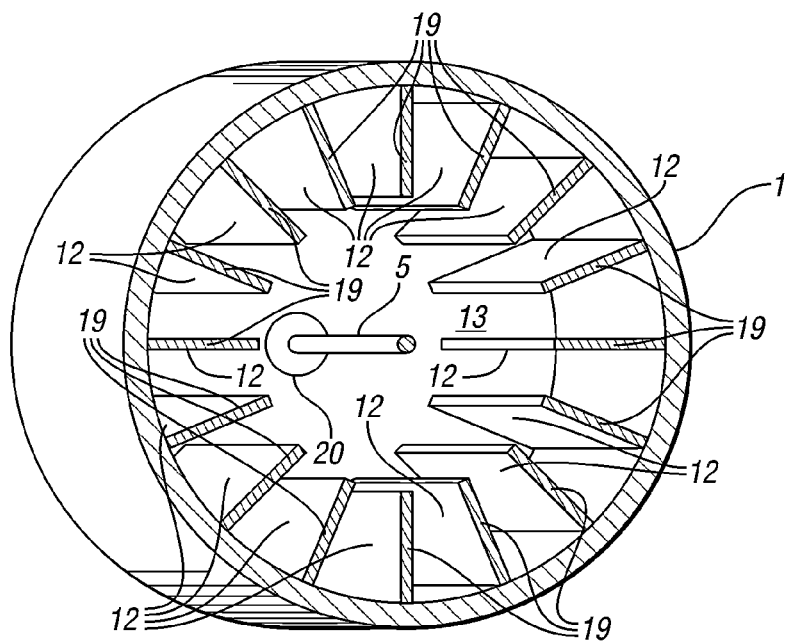
FIG. 14 is a perspective schematic view in cross-section of the detector of FIG. 13.

Referring now to FIG. 14, there is shown a partial sectional view of a preferred embodiment of the invention, showing an outer electrode 1 that also serves as the gas container and cathode, and inner electrode 5 that serves as the anode, and fins 19 radiating inwards towards the central electrode, thereby compartmentalizing the detector. The electrode 5 has an insulator 20 separating it from the container 1. The fins 19 are coated with a neutron reactive material 12. The fins may be composed, at least partially, of neutron reactive material. By introducing the coated fins 19 into the chamber, the overall amount of neutron reactive material is increased, while the thickness of the coating on each fin is less than ionizing reaction product ranges. Overall, the ionizing reaction products can still reach the detector gas and the detector neutron detection efficiency is greatly increased. Examples of the neutron reactive coating 12 include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive materials 12 that the fins may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 15:
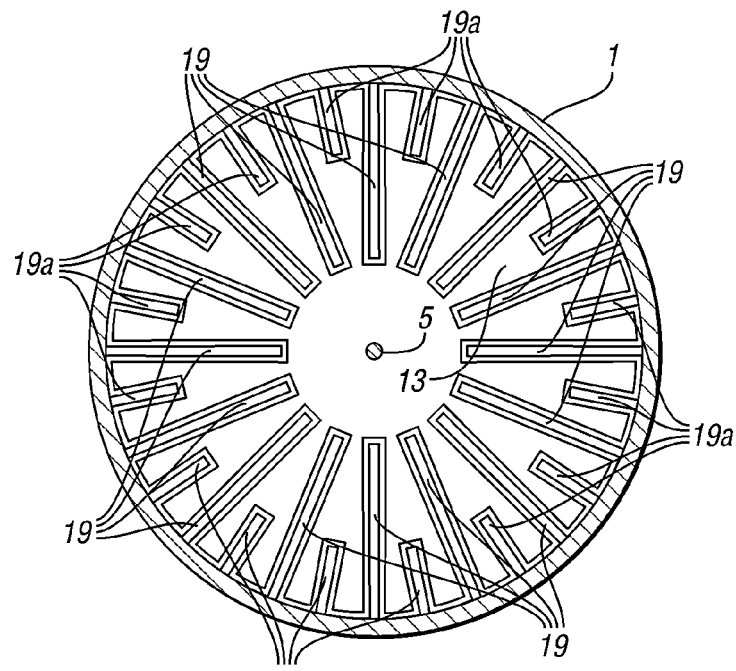
FIG. 15 is an end sectional view similar to the view of FIG. 13 except the fins have different lengths to increase the number of fins packed in the detector.

Referring now to FIG. 15, there is shown a cross-section of a preferred embodiment of the invention, showing an outer electrode 1 that also serves as the gas container and cathode, and inner electrode 5 that serves as the anode, and fins 19 radiating inwards towards the central electrode, thereby compartmentalizing the detector. The fins 19 are coated with a neutron reactive material 12. The long fins 19 have short fins 19a between them to increase the total amount of neutron reactive material in the detector. By introducing the coated fins 19, 19a into the chamber, the overall amount of neutron reactive material is increased, while the thickness of the coating on each fin is less than ionizing reaction product ranges. Overall, the ionizing reaction products can still reach the detector gas and the detector neutron detection efficiency is greatly increased. Examples of the neutron reactive coating 12 include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 16:
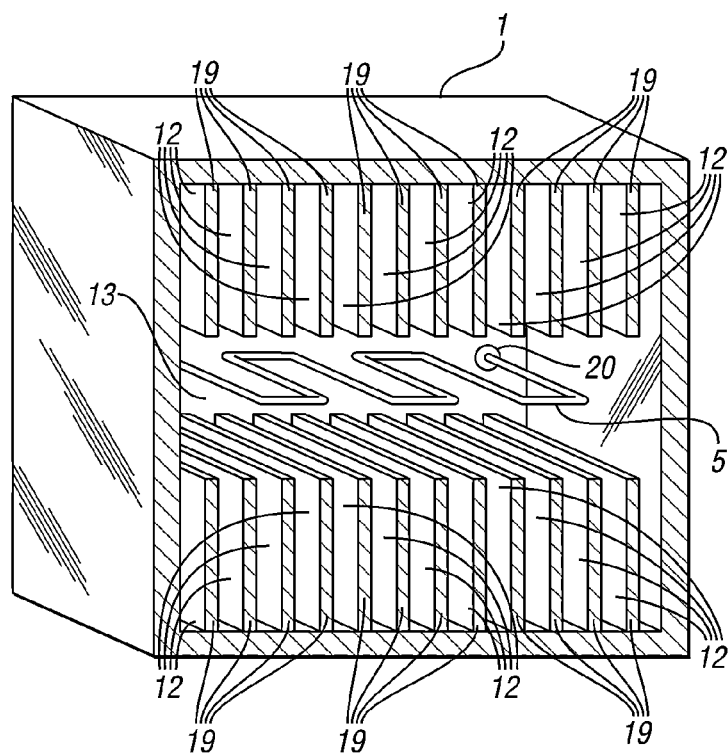
FIG. 16 is a perspective schematic view in cross-section of a planar gas-filled detector constructed in accordance with at least one embodiment of the present invention and showing fins radiating inward from the walls; the fins are coated with a neutron reactive material; a serpentine anode electrode winds through the detector.

Referring now to FIG. 16, there is shown a preferred embodiment of the compartmentalized gas-filled neutron detector, in which the container is mostly square or rectangular in shape. The metal casing 1 serves as the gas container and the cathode electrode. A serpentine anode 5 is located in the center of the device, and enters the cavity through an insulating feedthrough 20. Fins 19 are placed protruding from the casing and pointing towards the anode. The fins may be coated with neutron reactive material 12, or the fins may be composed, at least partially, of neutron reactive material. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive materials that the fins may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 17:
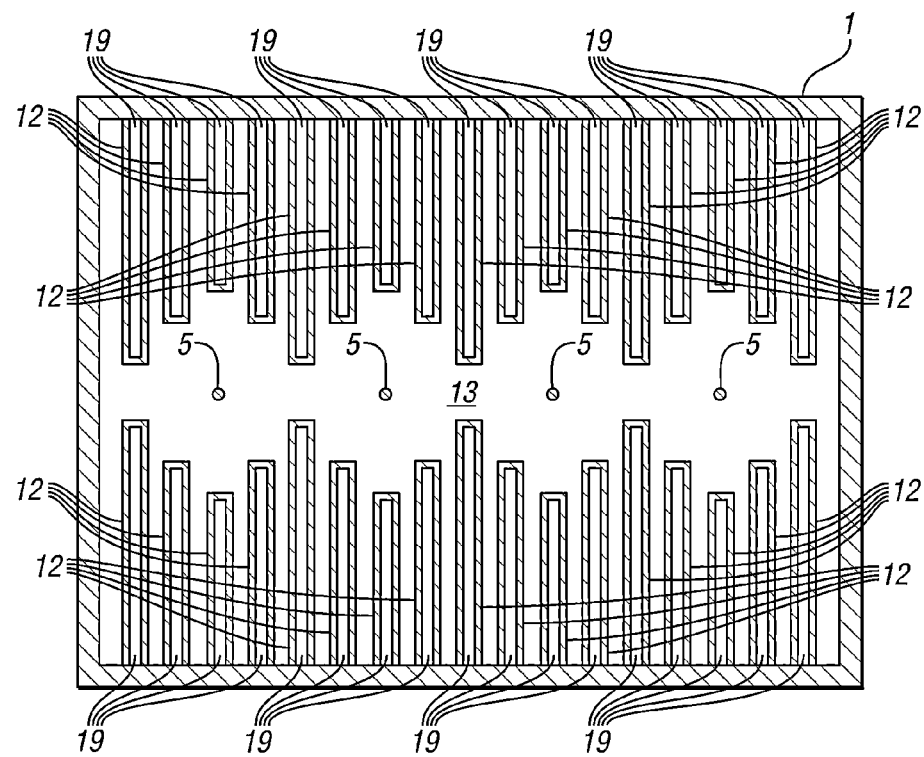
FIG. 17 is a sectional view of a planar gas-filled detector constructed in accordance with at least one embodiment of the present invention showing an internal view of the detector having fins of different lengths radiating inward from the walls; the fins are coated with a neutron reactive material; multiple anode electrodes are used in this embodiment.

Referring now to FIG. 17, there is shown a cross-section of a preferred embodiment of the compartmentalized gas-filled neutron detector, in which the container 1 consists, at least in part, of parallel electrodes. The electrodes 1 may serve to contain the gas, or may be inside a container filled with gas. Between the electrodes is a plurality of electrode wires 5, all acting as anodes. The arrangement allows for large devices to be constructed. Fins 19 are placed protruding from the container electrodes 1 and pointing towards the anodes 5. The fins 19 may be coated with neutron reactive material, or the fins may be composed, at least partially, of neutron reactive material. The fins 19 may be of different lengths to form various geometric cavity regions 21 around the anodes 5. Examples of the neutron reactive coating 12 include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive materials 12 that the fins may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 1:
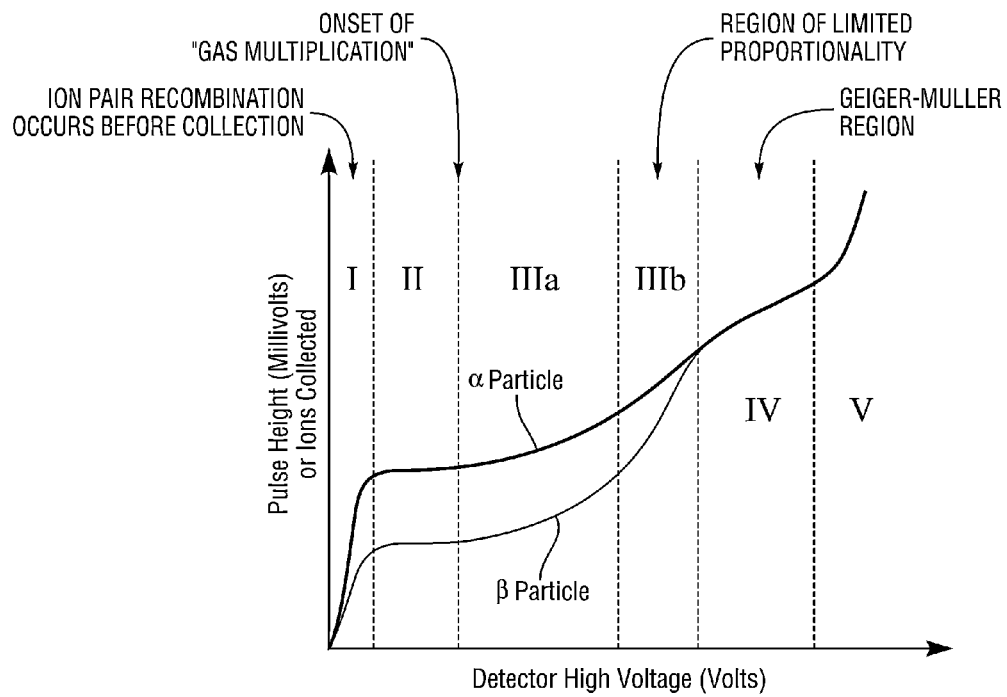
FIG. 1 is a graph of observed output pulse height versus the applied high voltage to alpha and beta particles for a gas-filled detector, showing the main regions: (I) recombination, (II) ion chamber, (III) proportional, (IV) Geiger-Mueller, and (V) continuous discharge; this plot is often referred to as the gas curve.
Figure 2:
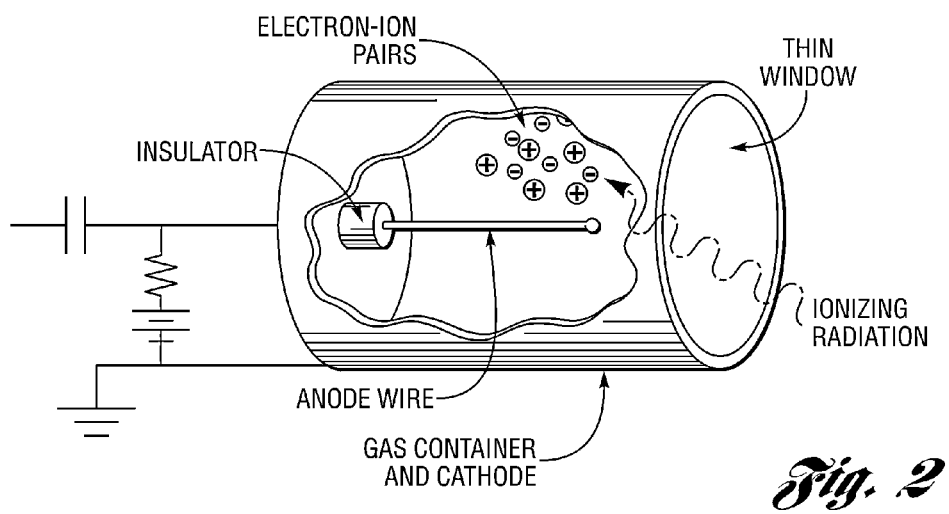
FIG. 2 is a schematic, partially broken away, view of a coaxial gas detector, which is commonly used for Geiger-Mueller tubes, and sometimes used for proportional counters; high voltage is applied to the central wire anode, while the outer cylinder container or wall, the cathode, is held at ground.
Figure 3:
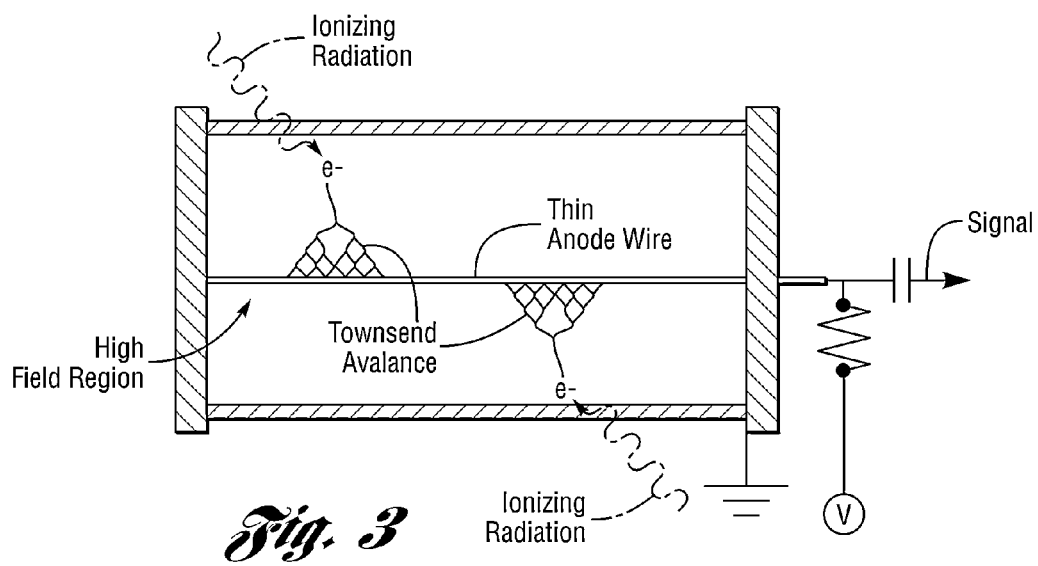
FIG. 3 is a sectional schematic view of a gas-filled detector with a high electric field region near the thin anode wire of the detector; signal gain is realized through impact or Townsend avalanching, often referred to as gas multiplication.
Figures 4A, 4B:
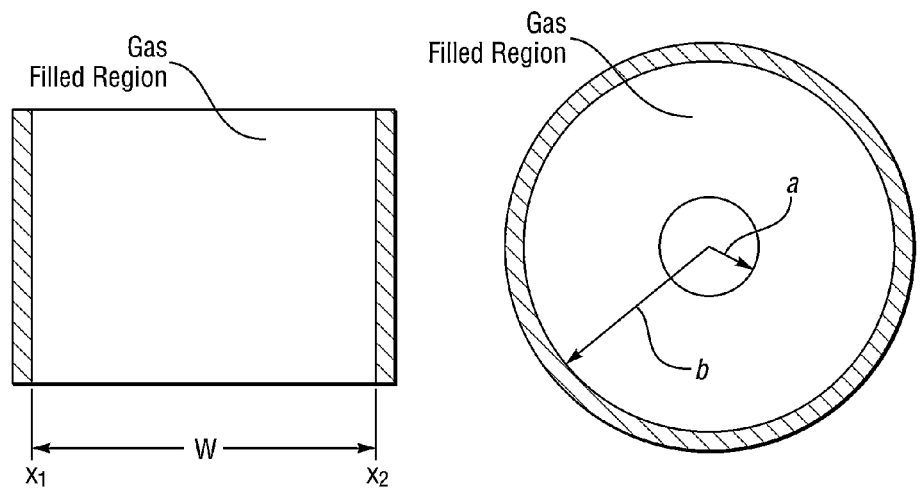
FIGS. 4a and 4b are end sectional schematic views of gas-filled detectors having planar and coaxial geometries, respectively; such geometries are often used for gas-filled radiation detectors.
Figure 5A:
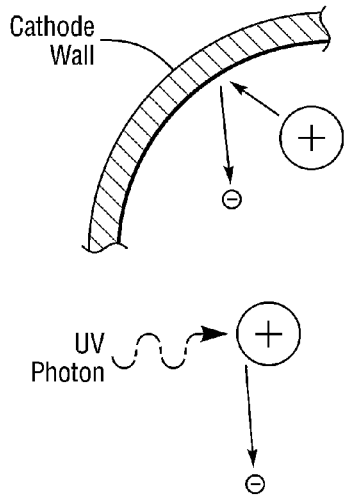
FIGS. 5a and 5b are views, partially broken away, which illustrate how a quench gas is used to prevent continuous avalanches in a proportional counter; when an argon ion strikes the cathode wall or absorbs excited UV photons, an electron may be ejected that can start another avalanche, as depicted in FIG. 5a; the quench gas, usually an organic molecule, breaks apart when it strikes the cathode wall or when it absorbs a UV photon, hence does not release an electron that can start a new avalanche, as depicted in FIG. 5b.
Figure 5B:
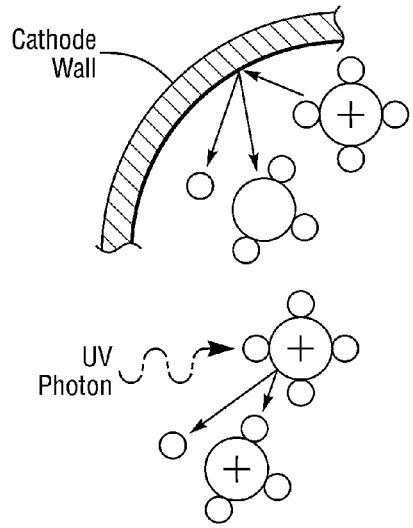
Figure 6:
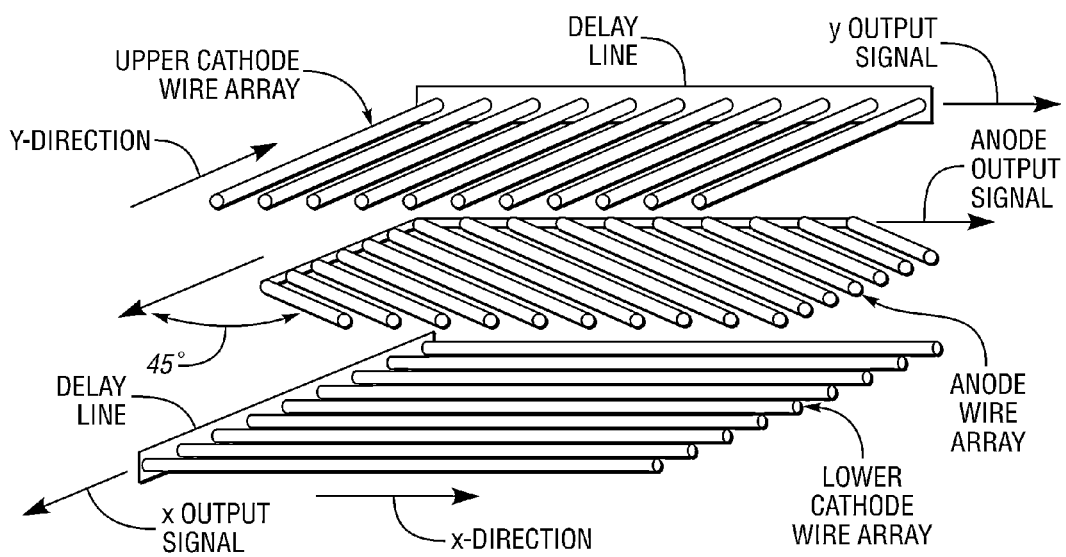
FIG. 6 is a perspective schematic view of a multiwire, gas-filled proportional counter composed of parallel layers of wire arrays; the system has three parallel wire arrays; the upper and lower arrays are cathode wires arranged orthogonally; the middle anode array is arranged at a 45° angle to the cathode arrays.
Figure 7A:
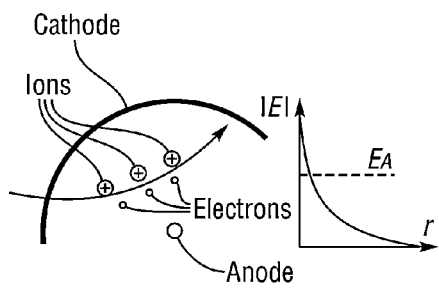
FIGS. 7a-7f are views, partially broken away and in cross-section, with associated graphs which illustrate a Geiger-Mueller tube depicting the progression of a Geiger discharge; the avalanching continues until the space charge accumulated around the anode wire decreases the electric field below the avalanche threshold causing the progression to cease.
Figure 7B:
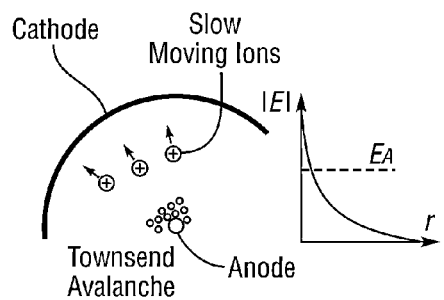
Figure 7C:
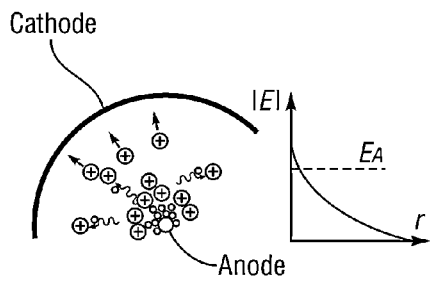
Figure 7D:
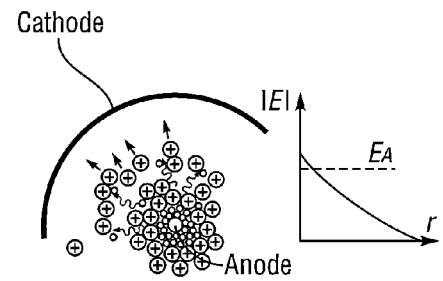
Figure 7E:
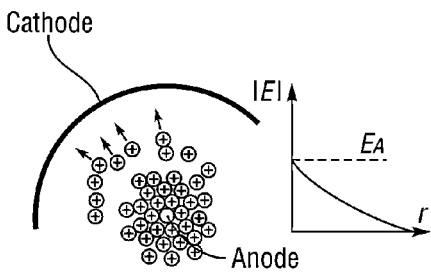
Figure 7F:
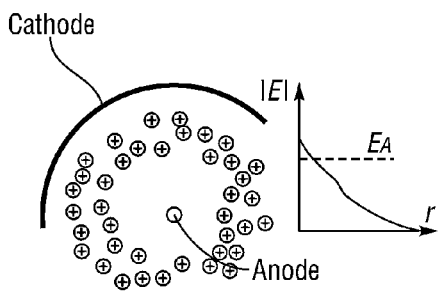
Figure 8:
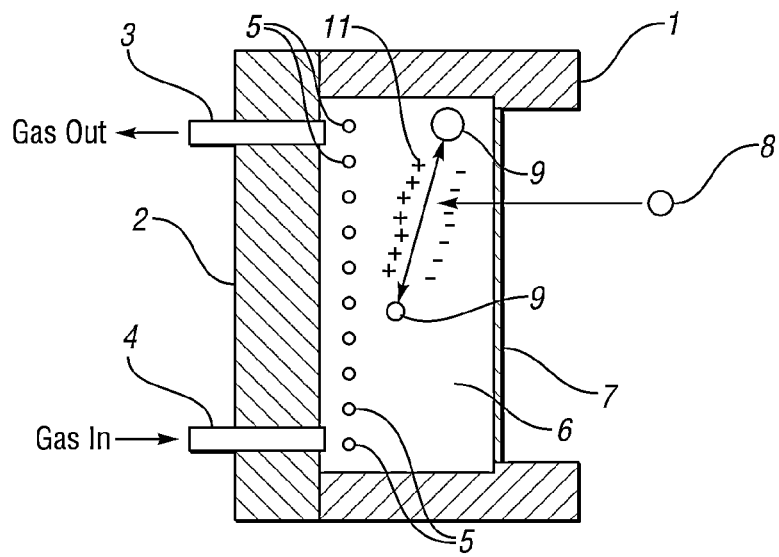
FIG. 8 is a sectional view of a common prior art gas-filled neutron detector.
Figure 9:
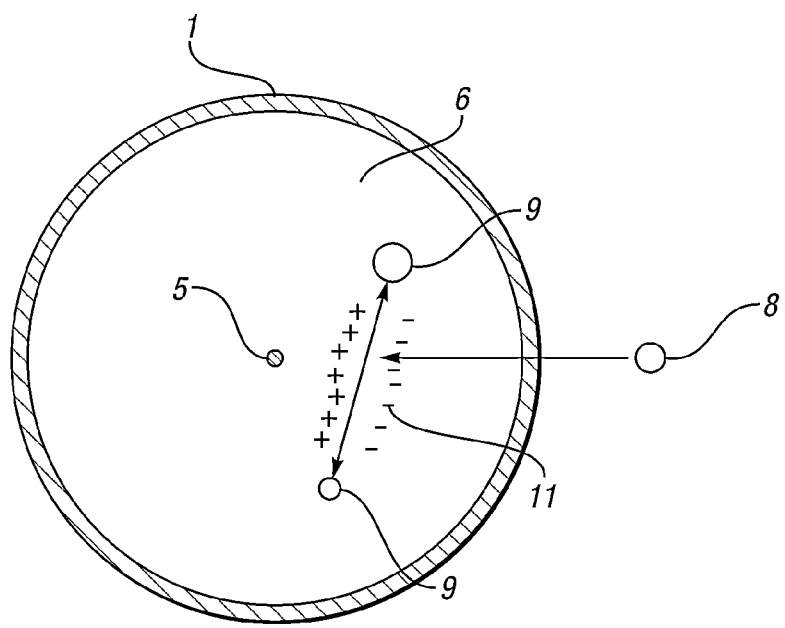
FIG. 9 is a sectional view of a common prior art gas-filled neutron detector.
Figure 10:
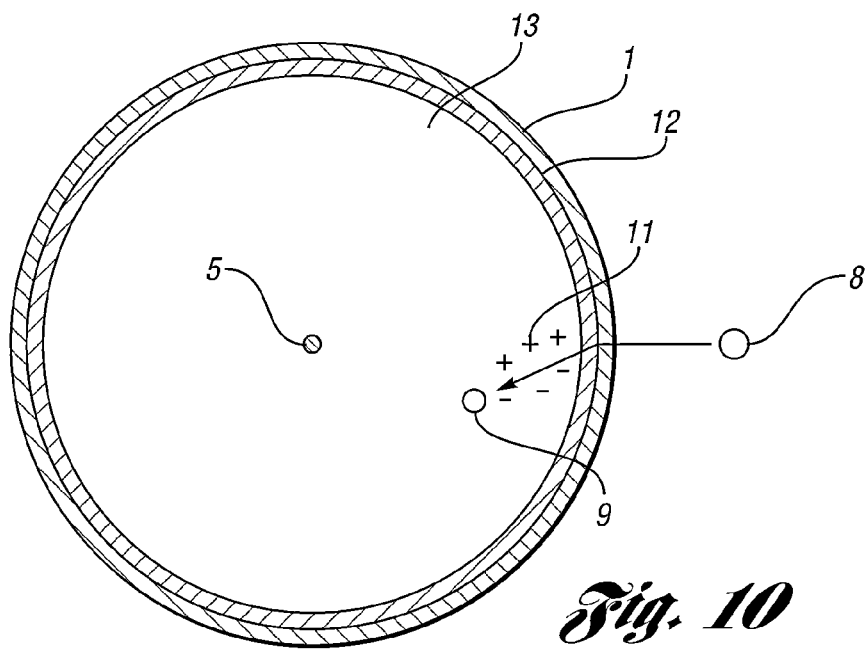
FIG. 10 is a sectional view of a common prior art gas-filled coated neutron detector.
Figure 11:
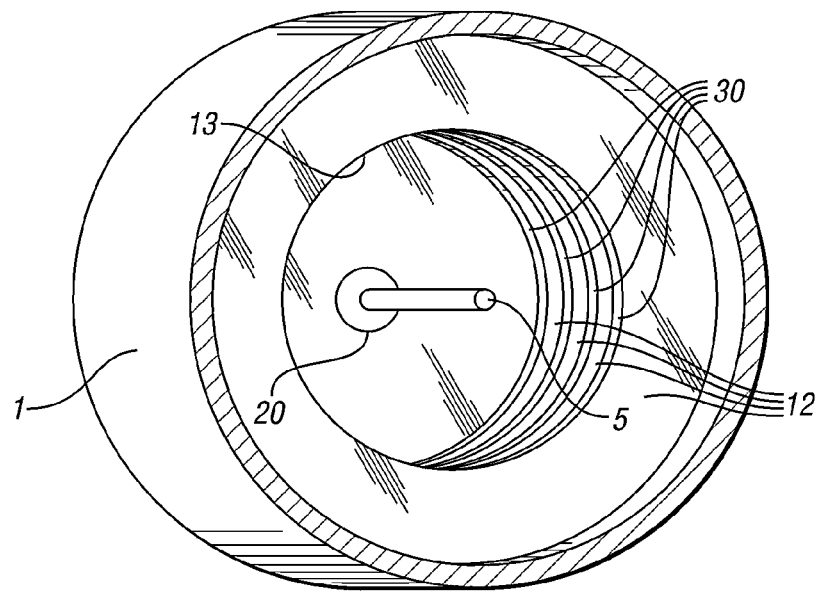
FIG. 11 is a perspective schematic view in cross-section of a prior art gas-filled neutron detector filled with washers which aligned down a cylindrical axis of the detector and are coated with neutron reactive material.
Figure 12:
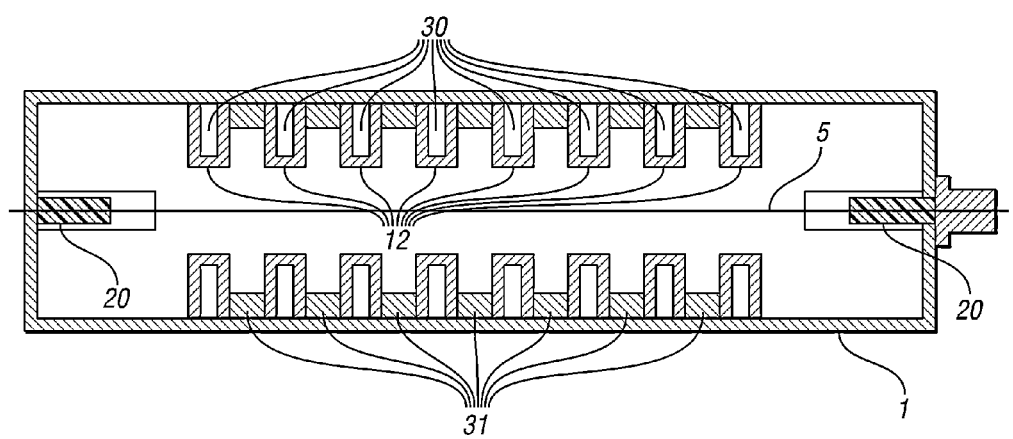
FIG. 12 is a side sectional view of the gas-filled neutron detector of FIG. 11.
Figure 18:
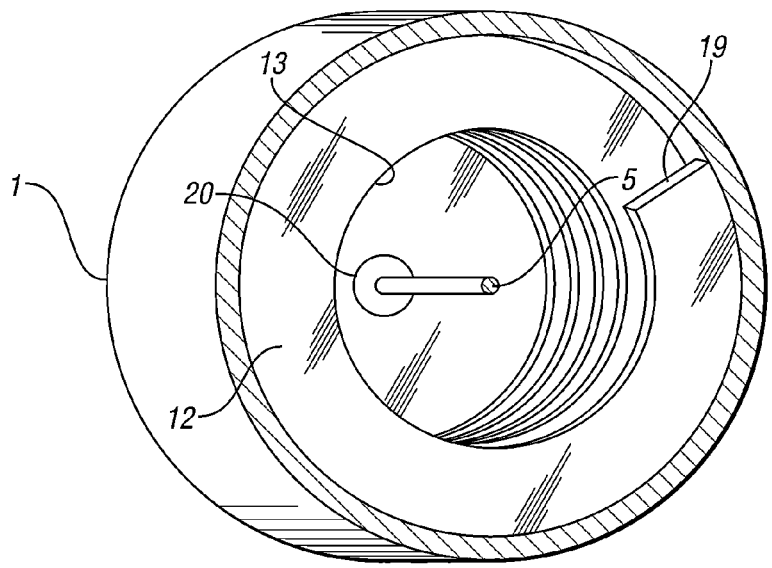
FIG. 18 is a perspective schematic view in cross-section of a gas-filled detector constructed in accordance with at least one embodiment of the present invention and having a single helical fin radiating inward from the tube wall; the helical fin is coated with a neutron reactive material.

Referring now to FIG. 18, there is shown a preferred embodiment of the compartmentalized gas-filled neutron detector, in which the container 1 consists of a cylinder which serves as an electrode, preferably the cathode. Inside the cylindrical cathode is a helical fin 12 coated with a neutron reactive material 19 that spirals around the inner electrode 5. The helical configuration prevents streaming through the devices as is a problem with the prior art of FIGS. 11 and 12. The fins 19 may be coated with neutron reactive material, or the fins may be composed, at least partially, of neutron reactive material. Examples of the neutron reactive coating 12 include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive materials 12 that the fins may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 19:
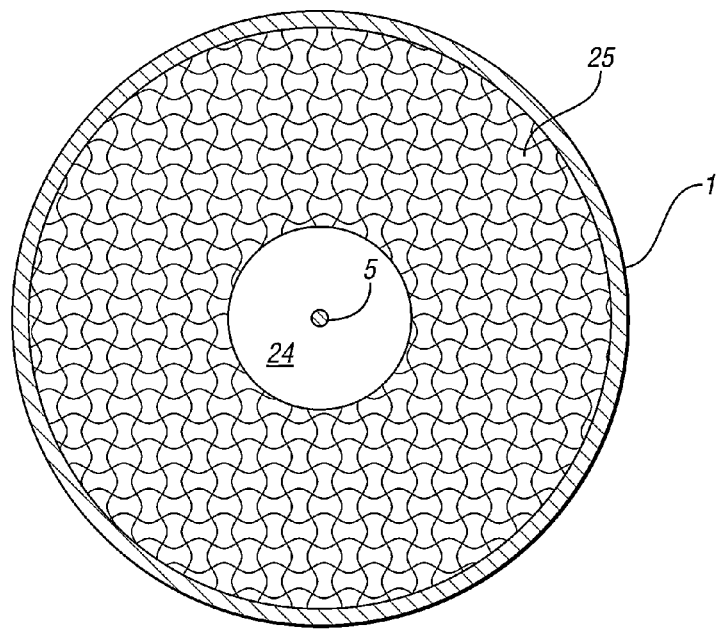
FIG. 19 is an end cross-sectional view of a gas-filled detector constructed in accordance with at least one embodiment of the present invention and having a fibrous or porous material inside a gas-filled container of the detector; the fibrous or porous material is either coated with neutron reactive material or is composed, at least partially, of neutron reactive material; the porous material may be a foam, sponge or aerogel.

Referring now to FIG. 19, there is shown another variation of the compartmentalized gas-filled neutron detector, in which a fibrous or porous media 25 is inserted into the gas-filled chamber. The outer electrode 1 serves as the cathode and the gas container. Electrons excited from reactive products resultant from neutron interactions in the neutron reactive porous media 25 move towards the anode 5 is within the avalanche region 24 and cause a Townsend avalanche. The fibrous or porous media 25 is composed of neutron reactive material, and/or is coated with neutron reactive material. The fibrous or porous material 25 is either coated with neutron reactive material or is composed, at least partially, of neutron reactive material. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 20:
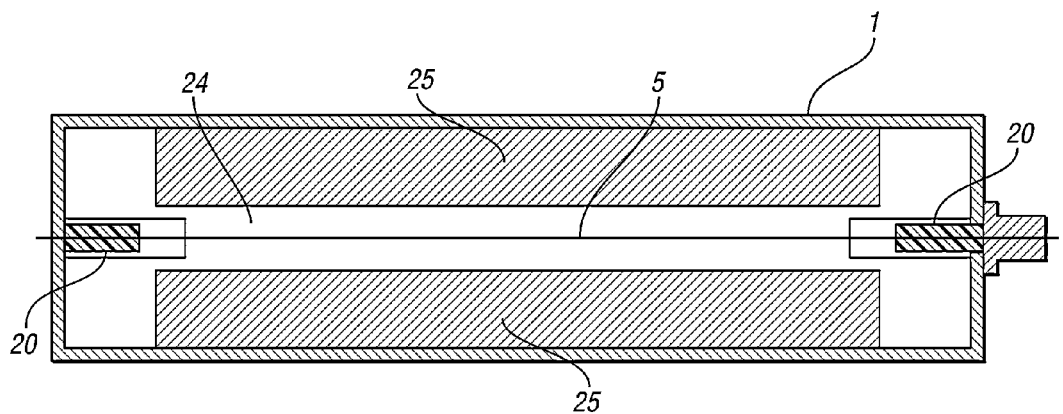
FIG. 20 is a side sectional view of the detector of FIG. 19.

Referring now to FIG. 20, there is shown another variation of the compartmentalized gas-filled neutron detector, in which a fibrous or porous media 25 is inserted into the gas-filled chamber. The outer electrode serves as the cathode 1 and the gas container. The fibrous or porous media 25 is composed of neutron reactive material, and/or is coated with neutron reactive material.

The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 21:
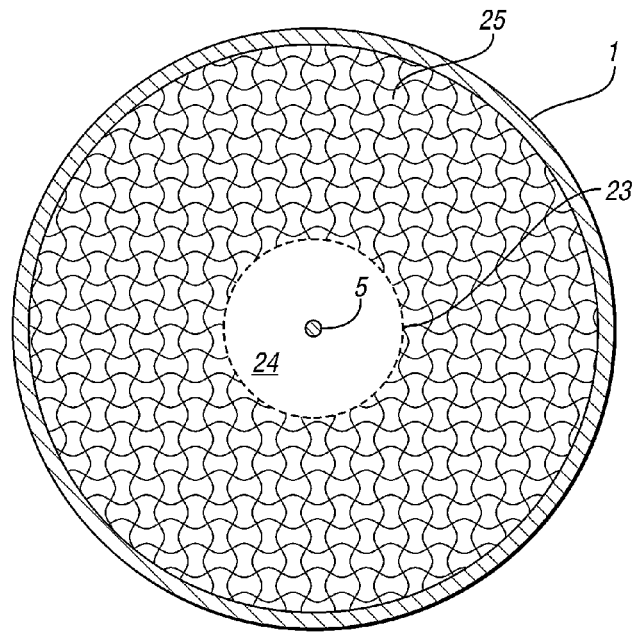
FIG. 21 is an end cross-sectional view of a gas-filled detector constructed in accordance with at least one embodiment of the present invention and showing a fibrous or porous material inside the gas-filled container; the fibrous or porous material is either coated with neutron reactive material or is composed, at least partially, of neutron reactive material; the porous material may be a foam, sponge or aerogel; an internal electrode or screen around the anode assists with electron charge collection.

Referring now to FIG. 21, there is shown another variation of the compartmentalized gas-filled neutron detector, in which a fibrous or porous media 25 is inserted into the gas-filled chamber. The outer electrode 1 serves as the cathode and the gas container. The fibrous or porous media is separated from the anode 5 by a screen 23. The region 24 between the screen 23 and the anode 5 serves as the high electric field region that promotes Townsend avalanching. The screen 23 may be a conductor, semiconductor or insulator. The device may have a voltage applied to the screen 23 to promote electron drift to the avalanche region 24. The fibrous or porous media 25 is composed of neutron reactive material, and/or is coated with neutron reactive material. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 22:
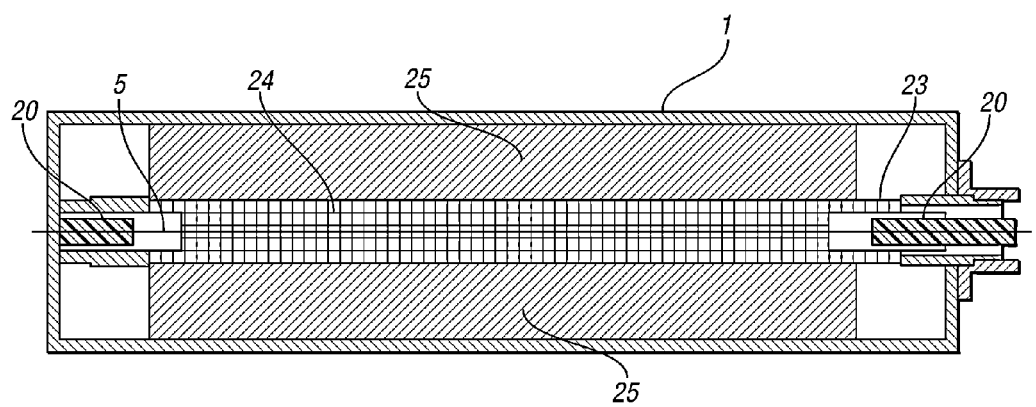
FIG. 22 is a side sectional view of the detector of FIG. 21.

Referring now to FIG. 22, there is shown another variation of the compartmentalized gas-filled neutron detector, in which a fibrous or porous media 25 is inserted into the gas-filled chamber. The outer electrode 1 serves as the cathode and the gas container. The fibrous or porous media 25 is separated from the anode 5 by a screen 23. The region 24 between the screen 23 and the anode 5 serves as the high electric field region that promotes Townsend avalanching. The screen 23 may be a conductor, semiconductor or insulator. The device may have a voltage applied to the screen 23 to promote electron drift to the avalanche region 24. The fibrous or porous media 25 is composed of neutron reactive material, and/or is coated with neutron reactive material. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 23:
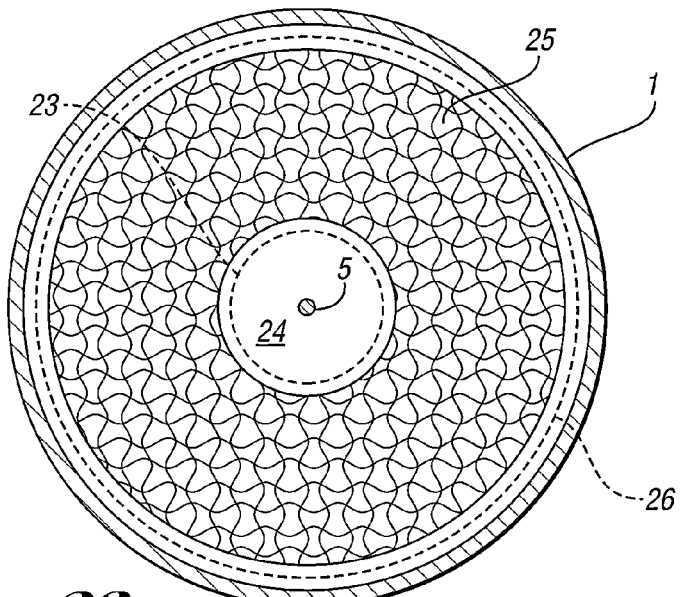
FIG. 23 is an end cross-sectional view of a gas-filled detector constructed in accordance with at least one embodiment of the present invention and having a fibrous or porous material inside a gas-filled container; the fibrous or porous material is either coated with neutron reactive material or is composed, at least partially, of neutron reactive material; the porous material may be a foam, sponge or aerogel; an internal electrode or screen around the anode assists with electron charge collection; an additional electrode or screen around the porous material separates the porous material from the detector wall.

Referring now to FIG. 23, there is shown another variation of the compartmentalized gas-filled neutron detector, in which a fibrous or porous media 25 is inserted into the gas-filled chamber. The outer electrode 1 serves as the cathode and the gas container. The fibrous or porous media 25 is separated from the anode 5 by a screen 23. The fibrous or porous media 25 is separated from the cathode 1 by a screen 26, thereby reducing the "wall effect". The region 24 between the screen 23 and the anode 5 serves as the high electric field region that promotes Townsend avalanching. The screen 23 may be a conductor, semiconductor or insulator. The device may have a voltage applied to the screen 23 to promote electron drift to the avalanche region 24. The device may have a voltage applied to the screen 26 to promote electron drift to the avalanche region 24. The fibrous or porous media 25 is composed of neutron reactive material, and/or is coated with neutron reactive material. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 24:
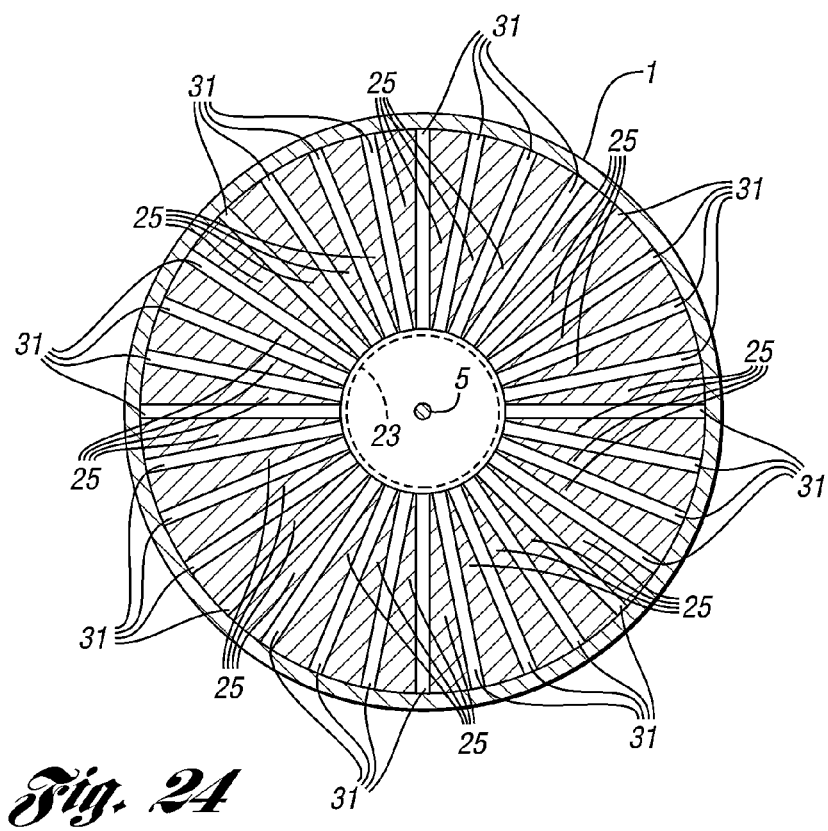
FIG. 24 is an end cross-sectional view of a gas-filled detector constructed in accordance with at least one embodiment of the present invention and having a fibrous or porous material inside a gas-filled container; the fibrous or porous material is either coated with neutron reactive material or is composed, at least partially, of neutron reactive material; the porous material is arranged in sections; the porous material may be a foam, sponge or aerogel; the porous media is arranged as wedges pointing inwards towards the anode.

Referring now to FIG. 24, there is shown another variation of the compartmentalized gas-filled neutron detector, in which a fibrous or porous media 25 is inserted into the gas-filled chamber. The outer electrode 1 serves as the cathode and the gas container. The fibrous or porous media 25 is sectioned into wedge shapes to produce drift channels 31 to facilitate unimpeded motion of electrons to the avalanche region 24. The fibrous or porous media 25 is separated from the anode 5 by a screen 23. The region 24 between the screen 23 and the anode 5 serves as the high electric field region that promotes Townsend avalanching. The screen 23 may be a conductor, semiconductor or insulator. The device may have a voltage applied to the screen 23 to promote electron drift to the avalanche region 24. The fibrous or porous media 25 is composed of neutron reactive material, and/or is coated with neutron reactive material. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 25:
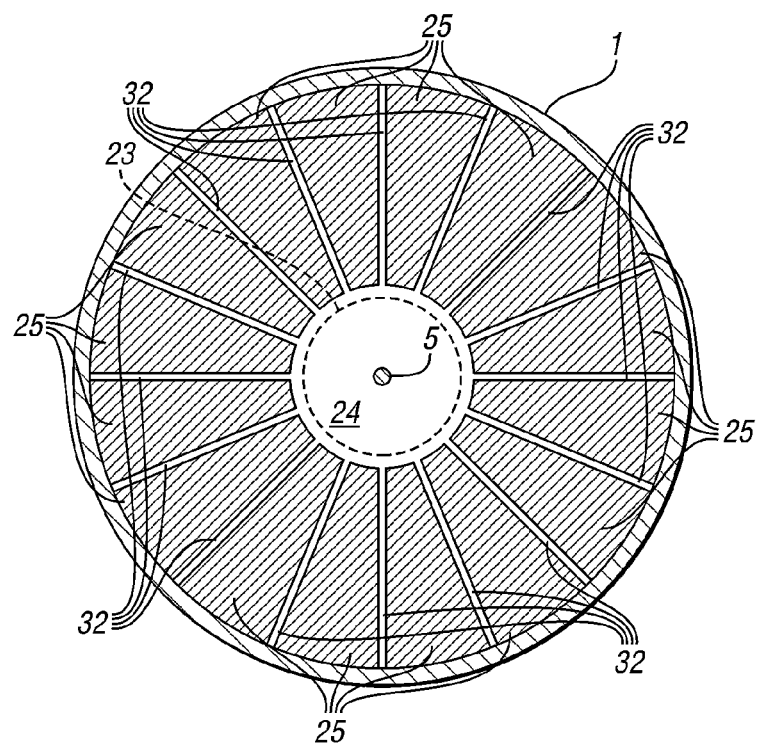
FIG. 25 is an end cross-sectional view of a gas-filled detector constructed in accordance with at least one embodiment of the present invention and having a fibrous or porous material inside a gas-filled container; the fibrous or porous material is either coated with neutron reactive material or is composed, at least partially, of neutron reactive material; the porous material has channels fabricated through it generally pointed towards the anode; the porous material may be a foam, sponge or aerogel; the porous media has multiple holes formed and pointing inwards towards the anode.

Referring now to FIG. 25, there is shown another variation of the compartmentalized gas-filled neutron detector, in which a fibrous or porous media 25 is inserted into the gas-filled chamber. The outer electrode 1 serves as the cathode and the gas container. The fibrous or porous media 25 has holes or channels 32 etched, drilled or formed into it to facilitate unimpeded motion of electrons to the avalanche region 24. The fibrous or porous media 25 is separated from the anode 5 by a screen 23. The region 24 between the screen 23 and the anode 5 serves as the high electric field region that promotes Townsend avalanching. The screen 23 may be a conductor, semiconductor or insulator. The device may have a voltage applied to the screen 23 to promote electron drift to the avalanche region 24. The fibrous or porous media 25 is composed of neutron reactive material, and/or is coated with neutron reactive material. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 26:
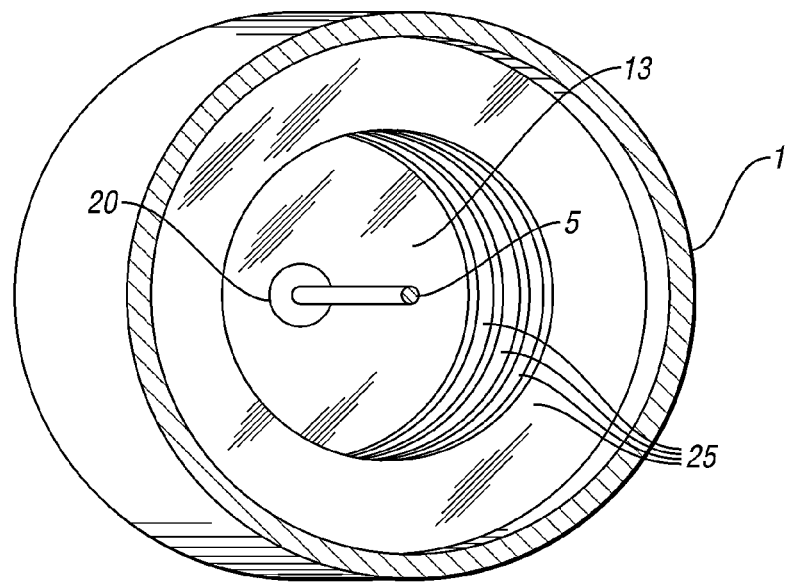
FIG. 26 is a perspective schematic view in cross-section of a gas-filled detector constructed in accordance with at least one embodiment of the present invention and having lateral torus-shaped porous or fibrous media radiating inward from the tube wall; the fibrous or porous material is either coated with neutron reactive material or is composed, at least partially, of neutron reactive material; the porous material may be a foam, sponge or aerogel; the porous media has multiple holes formed and pointing inwards towards the anode.

Referring now to FIG. 26, there is shown another variation of the compartmentalized gas-filled neutron detector, in which a fibrous or porous media 25 is inserted into the gas-filled chamber. The outer electrode 1 serves as the cathode and the gas container. The fibrous or porous media 25 may be separated from the anode 5 by a screen (not shown). The region between the screen and the anode 5 serves as the high electric field region that promotes Townsend avalanching. The screen may be a conductor, semiconductor or insulator. The device may have a voltage applied to the screen to promote electron drift to the avalanche region. The fibrous or porous media 25 is composed of neutron reactive material, and/or is coated with neutron reactive material. The fibrous or porous media 25 is arranged in a serious of torus shaped inserts. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 27:
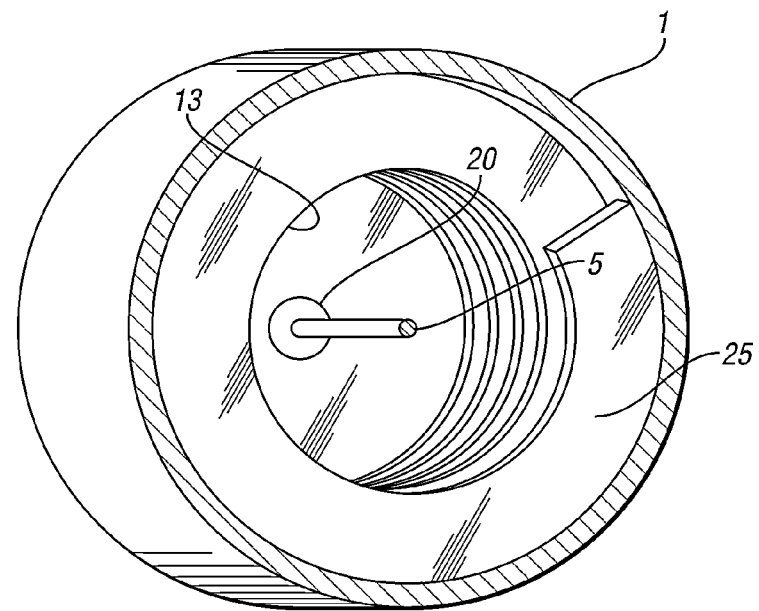
FIG. 27 is a perspective schematic view in cross-section of a gas-filled detector constructed in accordance with at least one embodiment of the present invention and having a single helix of porous or fibrous media radiating inward from the tube wall; the fibrous or porous material is either coated with neutron reactive material or is composed, at least partially, of neutron reactive material; the porous material may be a foam, sponge or aerogel; the porous media has multiple holes formed and pointing inwards towards the anode.

Referring now to FIG. 27, there is shown another variation of the compartmentalized gas-filled neutron detector, in which a fibrous or porous media 25 is inserted into the gas-filled chamber. The outer electrode 1 serves as the cathode and the gas container. The fibrous or porous media 25 may be separated from the anode 5 by a screen (not shown). The region between the screen and the anode 5 serves as the high electric field region that promotes Townsend avalanching. The screen may be a conductor, semiconductor or insulator. The device may have a voltage applied to the screen to promote electron drift to the avalanche region. The fibrous or porous media 25 is composed of neutron reactive material, and/or is coated with neutron reactive material. The fibrous or porous media 25 is arranged as a helical inserts. The helical fibrous or porous media insert 25 reduces the probability of neutrons streaming through the detectors without intersecting the absorber. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 28:
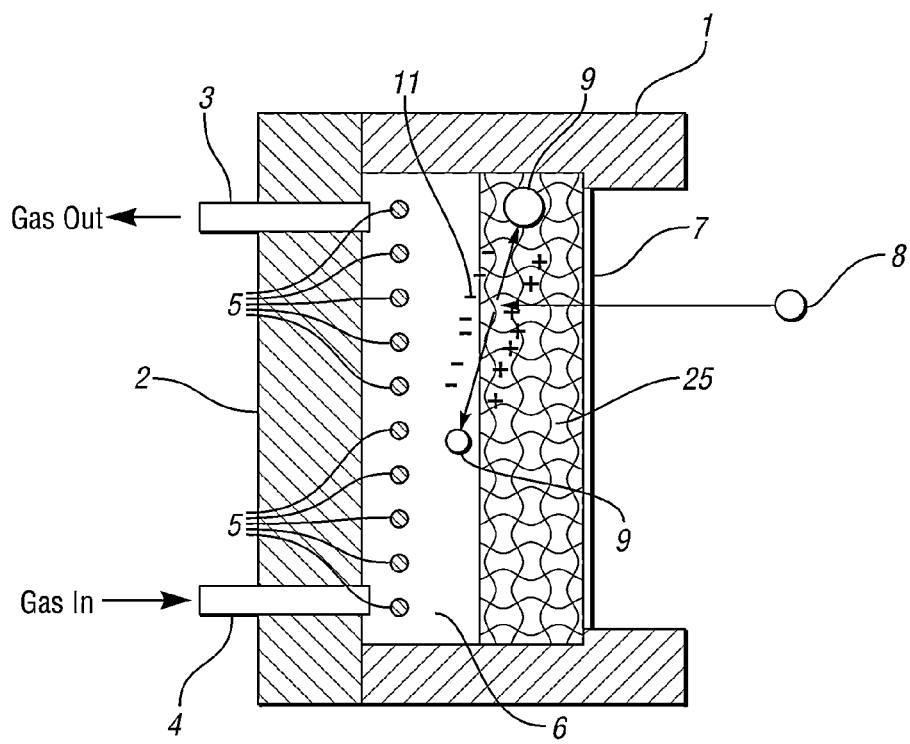
FIG. 28 is a side sectional schematic view of a gas-filled detector constructed in accordance with at least one embodiment of the present invention and comprising a gas-filled, gas-flow, multi-wire, anode detector that has a fibrous or porous material inside a gas-filled container; the fibrous or porous material is either coated with neutron reactive material or is composed, at least partially, of neutron reactive material; the porous material may be a foam, sponge or aerogel; the porous media has multiple holes formed and pointing inwards towards the anode.

Referring now to FIG. 28, there is shown another variation of the compartmentalized gas-filled neutron detector, in which a fibrous or porous media 25 is inserted into the gas-filled chamber. The detector is composed of a container 1 with a lid 2 that contains the detector gas in the cavity 6. A thin barrier 7 completes the detector enclosure. Aluminized Mylar is typically used as a thin barrier 7. The detector container 1 serves as an electrode. An additional electrode or series of electrodes 5 are provided, usually thin wires 5, in order to apply a voltage across the gas in the detector cavity 6. Neutrons 8 interact in the neutron reactive fibrous or porous media 25 and subsequently cause the ejection of ionizing radiation 9. The ionizing radiation enters the gas and excites electron-ion pairs 11. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward outer perimeter and the current produced by their motion is measured and recorded as a neutron interaction event. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 29:
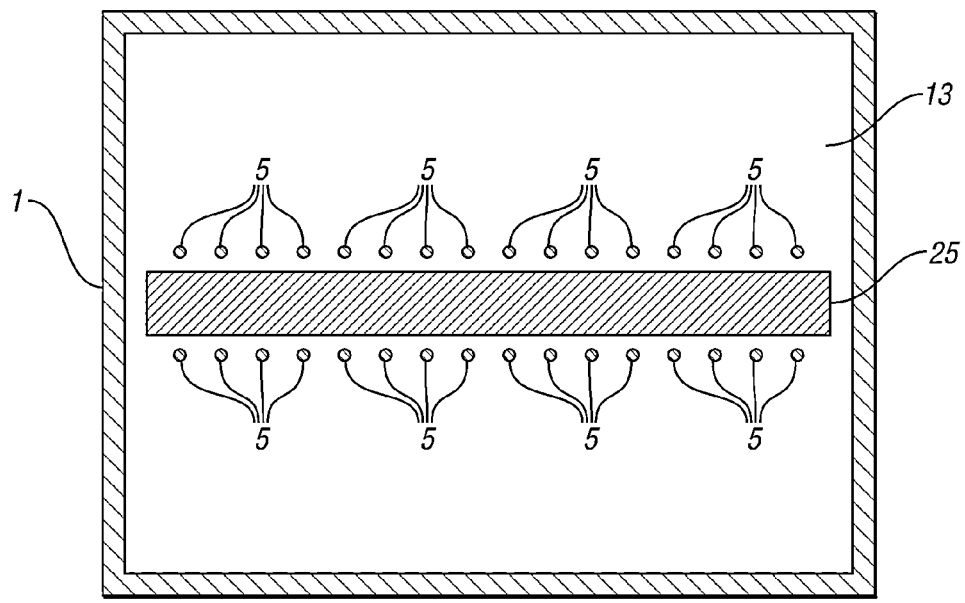
FIG. 29 is an end view in cross-section of a gas-filled, multi-wire, anode detector constructed in accordance with at least one embodiment of the present invention; the detector has a single sheet of fibrous or porous material disposed inside a gas-filled container; the fibrous or porous material is either coated with neutron reactive material or is composed, at least partially, of neutron reactive material; the fibrous or porous material is arranged between two sets of electrode wires or anodes; the porous material may be a foam, sponge or aerogel; the porous media has multiple holes formed and pointing towards the anodes.

Referring now to FIG. 29, there is shown another variation of the compartmentalized gas-filled neutron detector, in which a fibrous or porous media 25 is inserted into the gas-filled chamber. However, it is be understood that ultra-thin foil or other thin foils may be used whenever fibrous or porous media is mentioned herein with respect to FIG. 29 and the other drawing figures. The fibrous or porous media 25 is inserted between the anodes thereby reducing the wall effect. The detector container 1 serves as an electrode. An additional electrode or series of electrodes 5 are provided, usually thin wires 5, in order to apply a voltage across the gas in the detector cavity. Neutrons interact in the neutron reactive fibrous or porous media and subsequently cause the ejection of ionizing radiation. The ionizing radiation enters the gas and excites electron-ion pairs. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the cathodes and outer perimeter and the current produced by their motion is measured and recorded as a neutron interaction event. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 30:
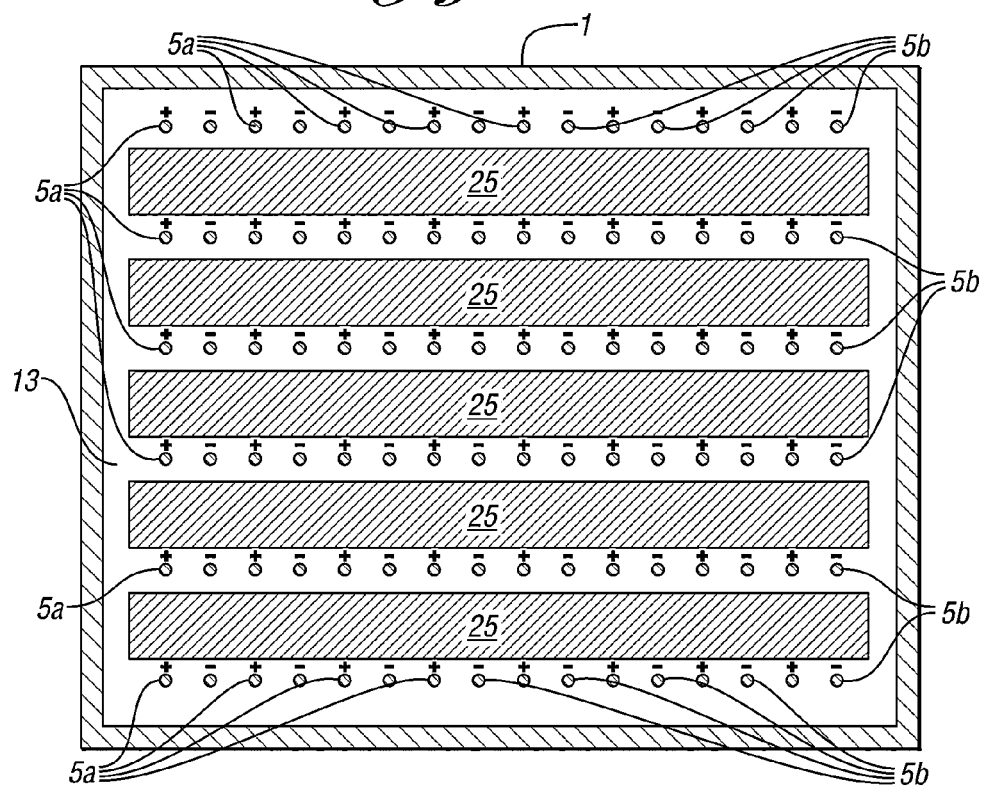
FIG. 30 is an end view in cross-section of a gas-filled, multi-wire, anode detector constructed in accordance with at least one embodiment of the present invention; the detector has multiple fibrous or porous material sheets disposed inside a gas-filled container; the fibrous or porous material is either coated with neutron reactive material or is composed, at least partially, of neutron reactive material; the fibrous or porous material is arranged between the electrode wires; the porous material may be a foam, sponge or aerogel; the porous media has multiple holes formed and pointing towards the anodes and cathodes.

Referring now to FIG. 30, there is shown another variation of the compartmentalized gas-filled neutron detector, in which a fibrous or porous media 25 is inserted into the gas-filled chamber. The fibrous or porous media 25 is inserted between the electrodes 5a and 5b, thereby reducing the wall effect. The electrode wires 5a and 5b can serve as anodes and cathodes. The electrodes can be biased alternately such that electric fields are formed between the anode and cathode wires as shown such that electron-ion pairs are collected locally. The detector container 1 serves as an electrode. The detectors may have multiple inserts of fibrous or porous media sheets 25 inserted between multiple sets of anodes 5. An additional electrode or series of electrodes 5 are provided, usually thin wires 5, in order to apply a voltage across the gas in the detector cavity. Neutrons interact in the neutron reactive fibrous or porous media and subsequently cause the ejection of ionizing radiation. The ionizing radiation enters the gas and excites electron-ion pairs. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the cathodes and outer perimeter and the current produced by their motion is measured and recorded as a neutron interaction event. The neutron reactive porous materials 25 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 25 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 31:
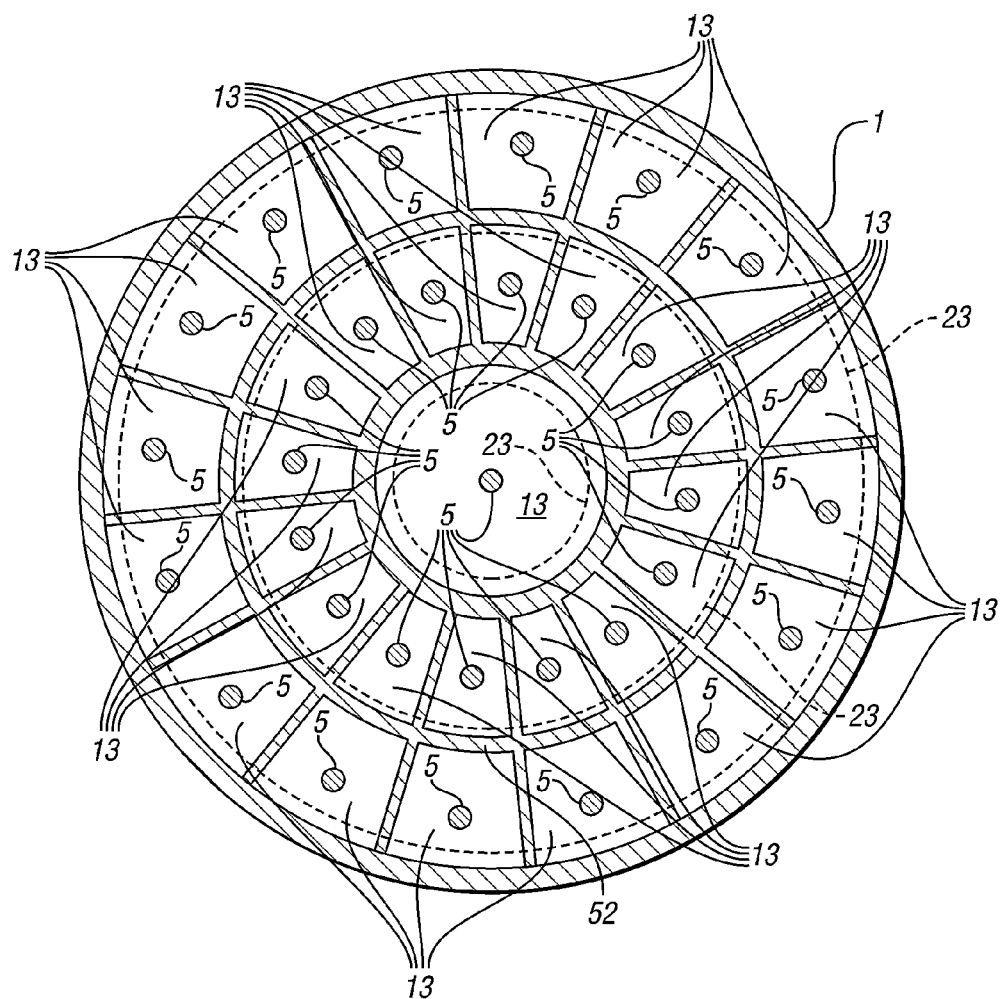
FIG. 31 is an end sectional view of a gas-filled detector constructed in accordance with at least one embodiment of the present invention; the detector has multiple compartments with a wire in each compartment.

Referring now to FIG. 31, there is shown another cross-section variation of the compartmentalized gas-filled neutron detector, in which a web of fibrous or porous media 52 is inserted into the gas-filled chamber. The web of material may be coated with neutron reactive material. The fibrous or porous media 52 divides the chamber 1 into compartments 13 that serve as avalanche regions. Electrode wires 5 are arranged in the compartments 13. Cathode grids 23 are arranged into the sections of the fibrous or porous material 52 to compartmentalize the electric field. The electrode wires 5 and grids 23 can serve as anodes and cathodes. The electrodes can be biased alternately such that electric fields are formed between the anode and cathode wires. The detector container 1 can serve as an electrode. Although the container can be composed of many shapes, in the present embodiment the container 1 is generally cylindrical in shape so as to take on a similar geometry as presently used helium-3 gas-filled detectors. Neutrons interact in the neutron reactive fibrous or porous media and subsequently cause the ejection of ionizing radiation. The ionizing radiation enters the gas and excites electron-ion pairs. These electron-ion pairs are separated by the applied detector voltage. Typically, a positive voltage is applied to the small wire electrodes 5, named the anodes. Electrons drift to the anodes, and upon reaching the anodes, create a Townsend avalanche, thus producing a much larger number of electron-ion pairs. The new positive ions drift toward the cathode grids 23 and the current produced by their motion is measured and recorded as a neutron interaction event. The neutron reactive porous materials 52 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive porous materials 52 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 32:
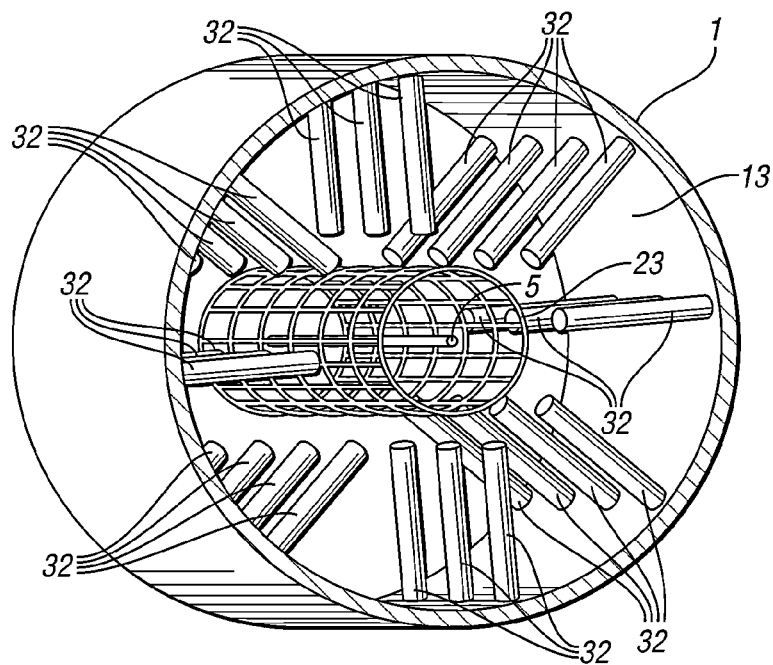
FIG. 32 is a perspective schematic view in cross-section of a gas-filled detector constructed in accordance with at least one embodiment of the present invention; the detector has cylindrical absorbers of fibrous or porous material disposed inside a tube; the fibrous or porous material is either coated with neutron reactive material or is composed, at least partially, of neutron reactive material; the porous material may be a foam, sponge or aerogel; the porous media has multiple holes formed and pointing inwards towards the anode.
Figure 33:
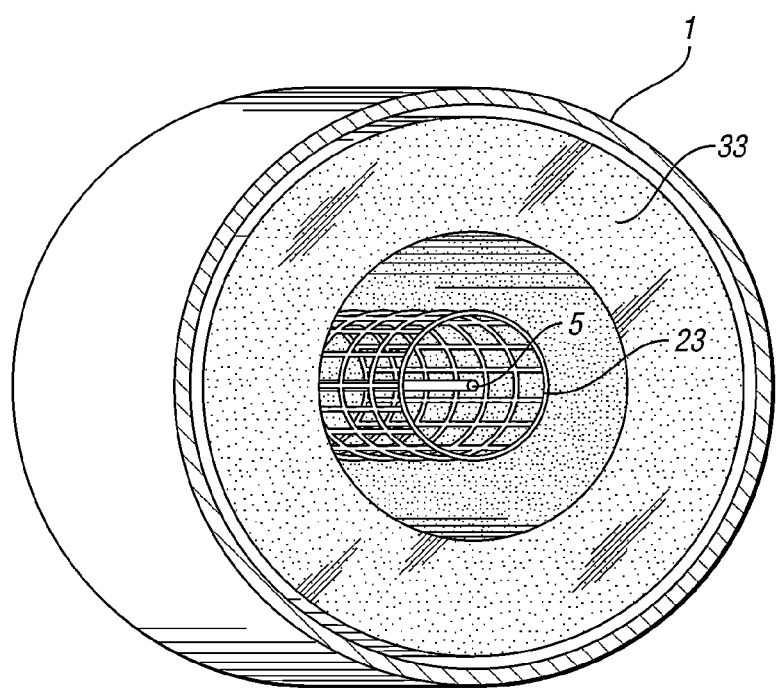
FIG. 33 is a perspective schematic view in cross-section of a gas-filled detector constructed in accordance with at least one embodiment of the present invention and which has a fibrous filamentary material inside a gas-filled container; the filamentary material is either coated with neutron reactive material or is composed, at least partially, of neutron reactive material.

Referring now to FIGS. 32 and 33, there are shown other variations of the compartmentalized gas-filled neutron detector, in which cylindrical absorbers 32 of a fibrous or porous media are inserted into the gas-filled chamber of FIG. 32. An outer electrode 1 serves as the cathode and the gas container in both Figures. The fibrous or porous media is sectioned into fine filaments 33 in FIG. 33 to allow for unimpeded motion of electrons to the avalanche region 24. The cylindrical absorbers 32 and the fibrous or porous fine filaments 33 are separated from their respective anodes 5 by a screen 23. The regions between the screen 23 and the anodes 5 serve as high electric field regions that promote Townsend avalanching. Each of the screens 23 may be a conductor, semiconductor or insulator. Each device may have a voltage applied to its screen 23 to promote electron drift to the avalanche region. The fibrous or porous fine filaments 33 and the cylindrical absorbers 32 are composed of neutron reactive material, and/or are coated with neutron reactive material. The neutron reactive fine filaments 33 and the absorbers 32 may include foam, sponge or aerogel or other porous media. Examples of the neutron reactive coating include boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232. Examples of neutron reactive fine filaments of porous materials 33 may include foam, sponge or aerogel and may be composed of, all are partially, are boron-10, lithium-6 fluoride, lithium-6, uranium-235, uranium-238, natural uranium, gadolinium, or thorium-232 or any compound or mixture containing boron-10, lithium-6 fluoride, lithium-6, uranium-235, uranium-238, natural uranium, gadolinium, or thorium-232.

Figure 34:
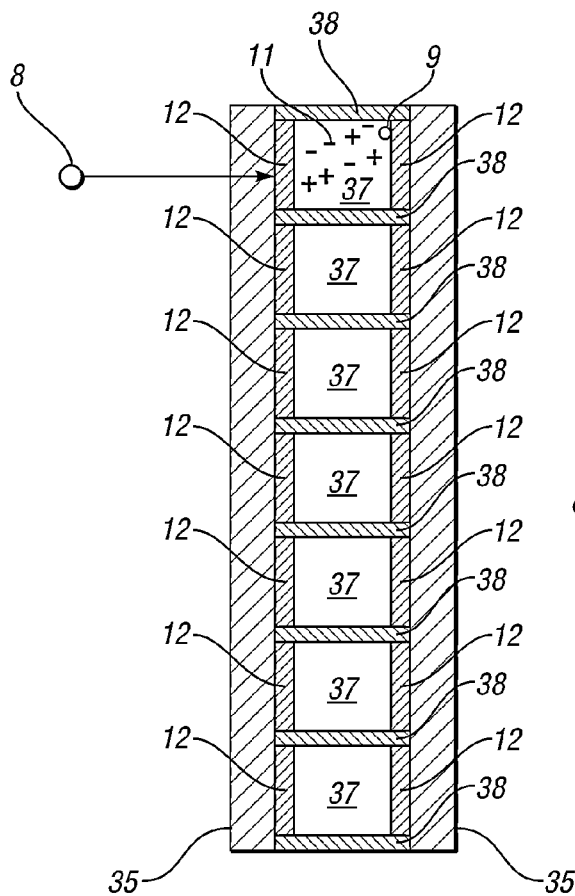
FIG. 34 is a side sectional view of a gas-filled detector constructed in accordance with at least one embodiment of the present invention and having multiple compartments; electrical contacts within the individual compartments are coated with neutron reactive material; the compartments are sized to be smaller than the reaction products ranges.

Referring now to FIG. 34, there is shown a cross-section of a preferred embodiment of the invention, showing outer electrodes 35 that also serve as the gas container. A voltage is placed across the outer electrodes 35. Small compartments 37 trap the detector gas. The compartments are formed from insulator dividers 38. The compartments are coated with neutron reactive material 12. The compartments are sized to be smaller than the reaction product 9 ranges. The small compartments are large enough to absorb measureable energy from reaction products 9, but too small to absorb measureable energy from background gamma rays and x-rays. The result is the elimination of background radiation signals.

Figure 35:
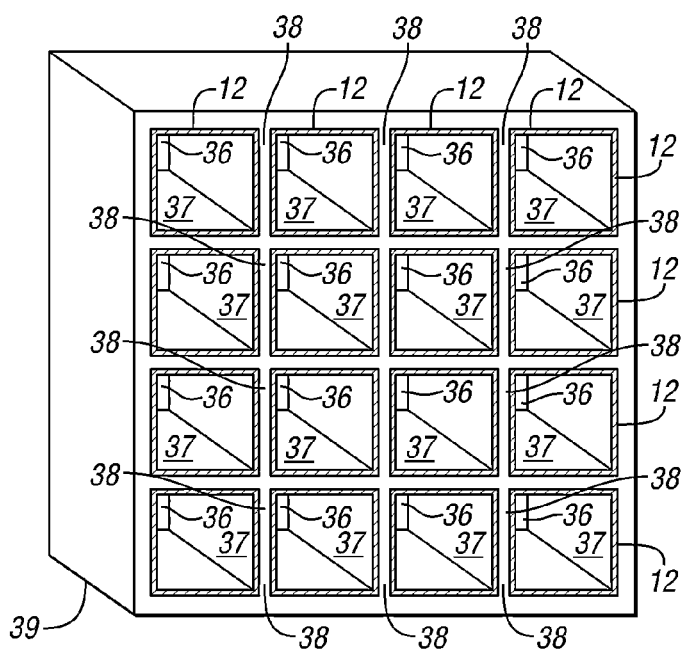
FIG. 35 is a side sectional view of a gas-filled detector constructed in accordance with at least one embodiment of the present invention and having multiple compartments; electrical contacts within the individual compartments are coated with neutron reactive material; the compartments are sized to be smaller than the reaction products ranges.

Referring now to FIG. 35, there is shown an alternative view of a preferred embodiment of the invention, showing a partial view, absent the top electrode, of a compartmentalized gas-filled detector 39. Shown are outer electrodes 36 that also serve as part of the container. A voltage is placed across the outer electrodes. Small compartments 37 trap the detector gas. The compartments are formed from insulator dividers 38. The compartments are coated with neutron reactive material 12. The compartments are sized to be smaller than the reaction product ranges. The small compartments are large enough to absorb measureable energy from reaction products, but too small to absorb measureable energy from background gamma rays and x-rays. The result is the elimination of background radiation signals.

Figure 36A:
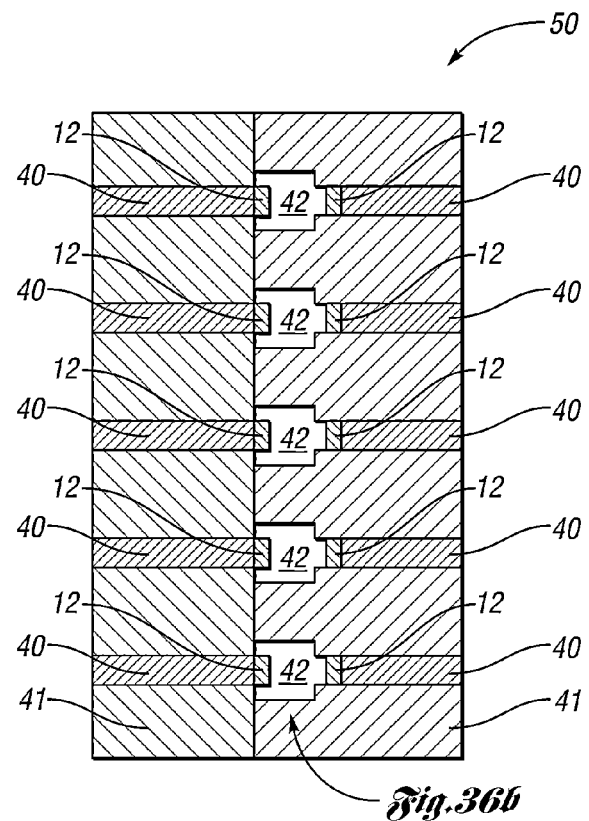
FIG. 36a is a side sectional view of a gas-filled detector constructed in accordance with at least one embodiment of the present invention and having multiple compartments designed as channels; electrical contacts within the individual compartments are coated with neutron reactive material, as best shown in FIG. 36b which is an enlarged view of the generally indicated portion of FIG. 36a; the compartments are sized to be smaller than the reaction products ranges.
Figure 36B:
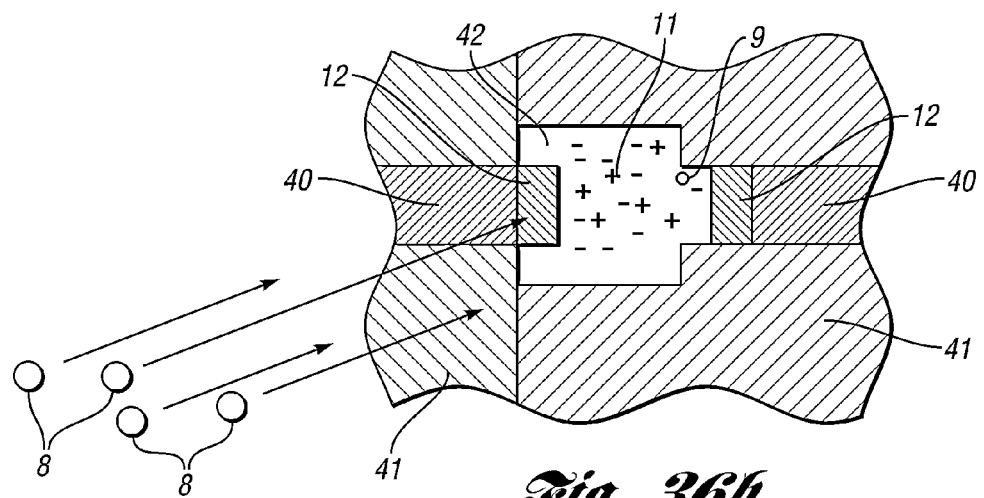

Referring now to FIGS. 36 and 36a, there is shown a preferred embodiment of the invention, showing a side view of a compartmentalized gas-filled detector 50. Shown are electrodes 40 that pass through compartment walls 41 to the gas filled channels 42. A voltage is placed across the electrodes. Small compartments 42 trap the detector gas. The compartments 42 and/or electrodes 40 are coated with neutron reactive material 12. The compartments are sized to be smaller than the reaction product 9 ranges. The small compartments are large enough to absorb measureable energy from reaction products, but too small to absorb measureable energy from background gamma rays and x-rays. The result is the elimination of background radiation signals.

Figure 37:
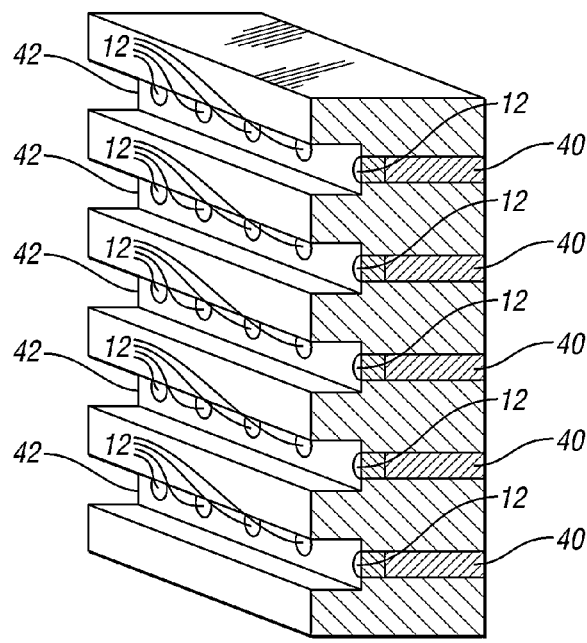
FIG. 37 is a perspective schematic view in cross-section of one side or half of a gas-filled detector constructed in accordance with at least one embodiment of the present invention and having multiple compartments designed as channels; electrical contacts or electrodes within the individual compartments are coated with neutron reactive material; the compartments are sized to be smaller than the reaction products ranges.

Referring now to FIG. 37, there is shown an alternative view of a preferred embodiment of the invention, showing a view of one side, absent the other side that completes the compartment, of a compartmentalized gas-filled detector. Shown are electrodes 40 that pass through compartment walls 41 to the gas filled channels 42. The small compartments 42 trap the detector gas. The compartments 42 and/or electrodes 40 are coated with neutron reactive material 12. The compartments are sized to be smaller than the reaction product ranges. The small compartments are large enough to absorb measureable energy from reaction products, but too small to absorb measureable energy from background gamma rays and x-rays. The result is the elimination of background radiation signals. The dot contact arrangement allows for interaction position information to be preserved.

Figure 38:
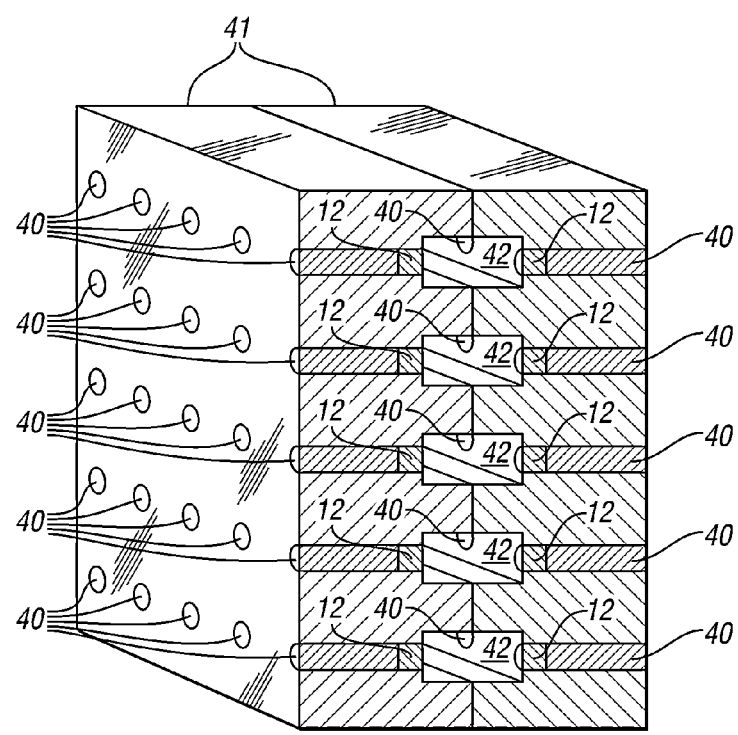
FIG. 38 is a perspective schematic view in cross-section of both sides or halves (including the side or half of FIG. 37) positioned together to form a gas-filled detector that has a multiple compartments designed as channels; electrical contacts within the individual compartments are coated with neutron reactive material; the compartments are sized to be smaller than the reaction products ranges.

Referring now to FIG. 38, there is shown an alternative view of a preferred embodiment of the invention, showing both sides of a compartmentalized gas-filled detector when connected together. Shown are electrodes 40 that pass through compartment walls 41 to the gas filled channels 42. The small compartments 42 trap the detector gas. The compartments 42 and/or electrodes 40 are coated with neutron reactive material 12. The compartments are sized to be smaller than the reaction product ranges. The small compartments are large enough to absorb measureable energy from reaction products, but too small to absorb measureable energy from background gamma rays and x-rays. The result is the elimination of background radiation signals. The dot contact arrangement allows for interaction position information to be preserved.

Figure 39:
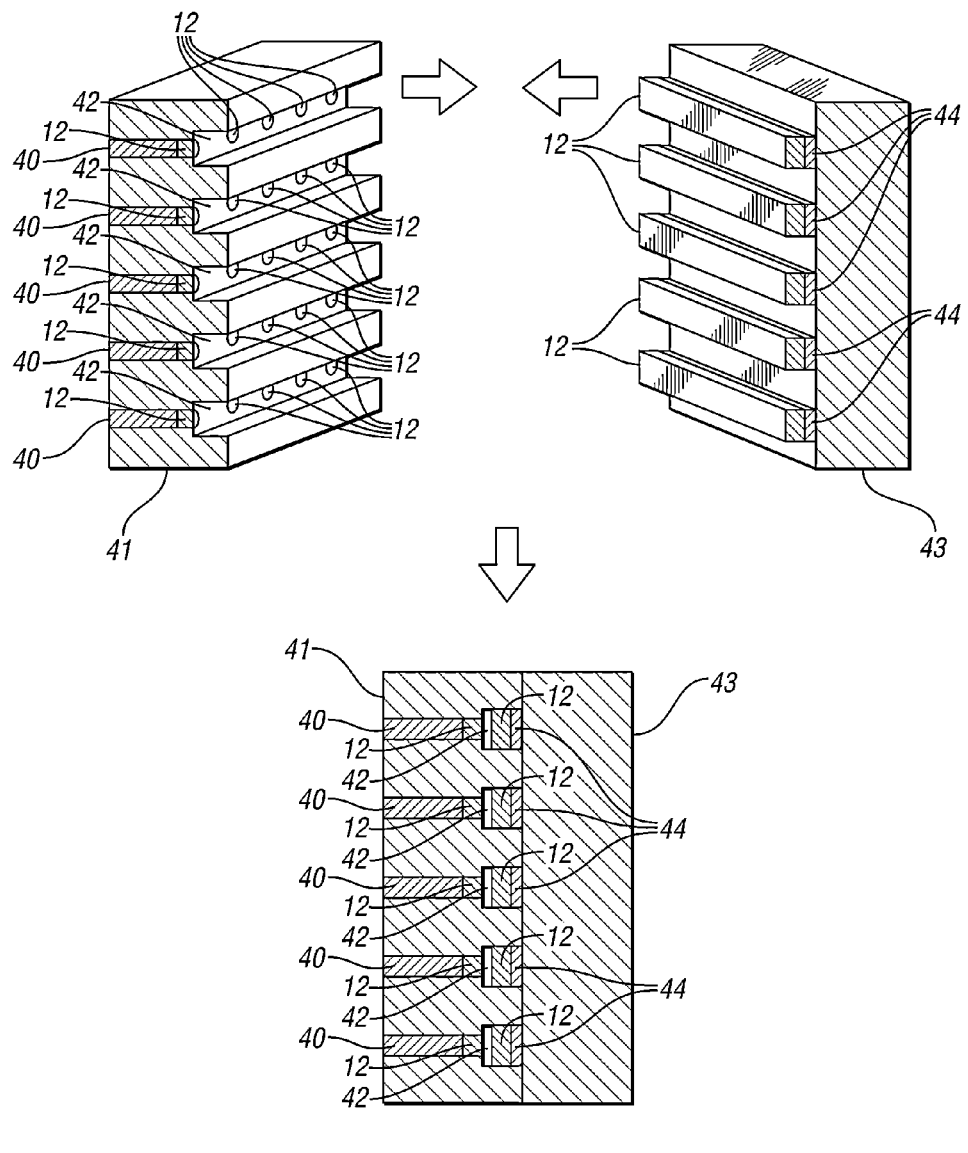
FIG. 39 (upper left) is a perspective schematic view of one side or half of a gas-filled detector.

Referring now to FIG. 39, there is shown a preferred embodiment of the invention, showing an alternative view of a compartmentalized gas-filled detector. Shown are electrodes 40 that pass through compartment walls 41 to the gas filled channels 42. On the opposite side 43 are shown conductive electrical contact strips 44 upon which neutron reactive material 12 has been placed. A voltage is placed across the electrodes. Small compartments 42 trap the detector gas. The compartments 42 and/or electrodes 40 are coated with neutron reactive material 12. The compartments are sized to be smaller than the reaction product ranges. The small compartments are large enough to absorb measureable energy from reaction products, but too small to absorb measureable energy from background gamma rays and x-rays. The result is the elimination of background radiation signals. The dot contact arrangement allows for interaction position information to be preserved.

Figure 40:
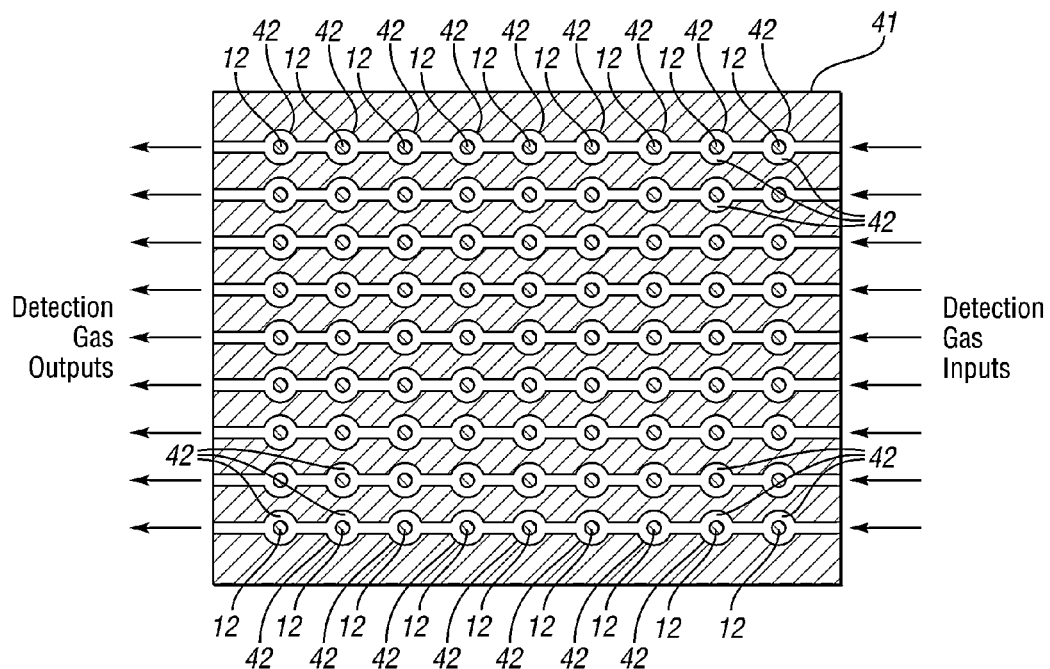
FIG. 40 is a side sectional view of a gas-filled detector constructed in accordance with at least one embodiment of the present invention and showing an alternative channel design; electrical contacts within the individual compartments are coated with neutron reactive material; the channel compartments are sized to be smaller than the reaction products ranges.

Referring now to FIG. 40, there is shown an alternative channel pattern for the gas filled cavities 42, showing large gas filled area by comparison to the gas-filled flow channels. The compartment 42 has a neutron reactive coating 12.

Figure 41:
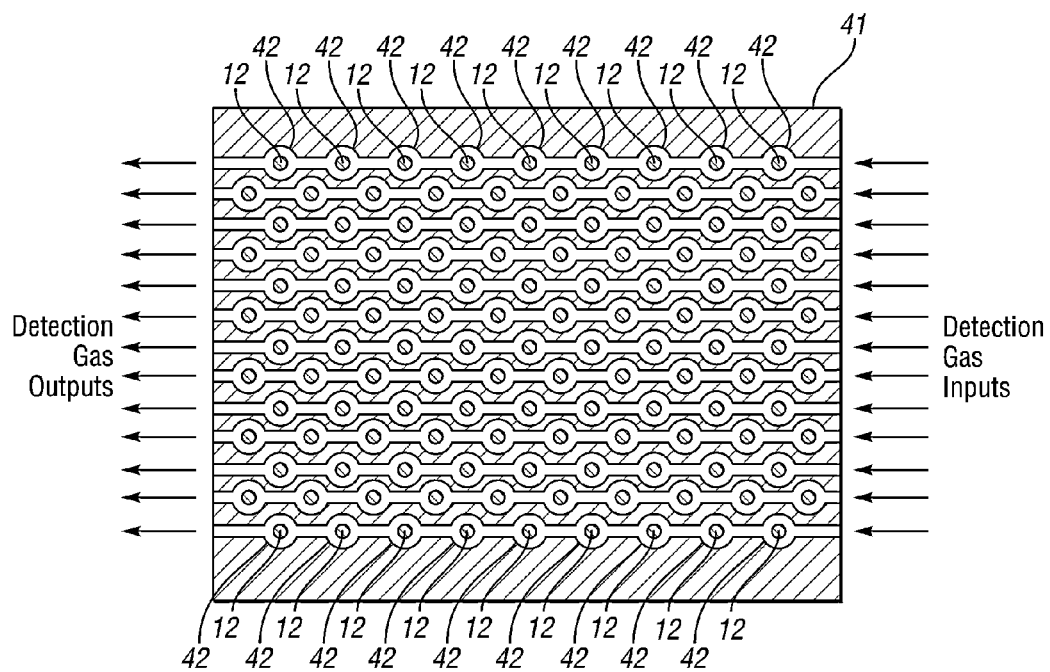
FIG. 41 is a view similar to the view of FIG. 40 but showing an alternative channel design; electrical contacts within the individual compartments are coated with neutron reactive material; the channel compartments are sized to be smaller than the reaction products ranges.

Referring now to FIG. 41, there is shown yet another alternative channel pattern for the gas filled cavities 42, showing large gas filled area by comparison to the gas-filled flow channels. The compartment 42 has a neutron reactive coating 12.

Figure 42:
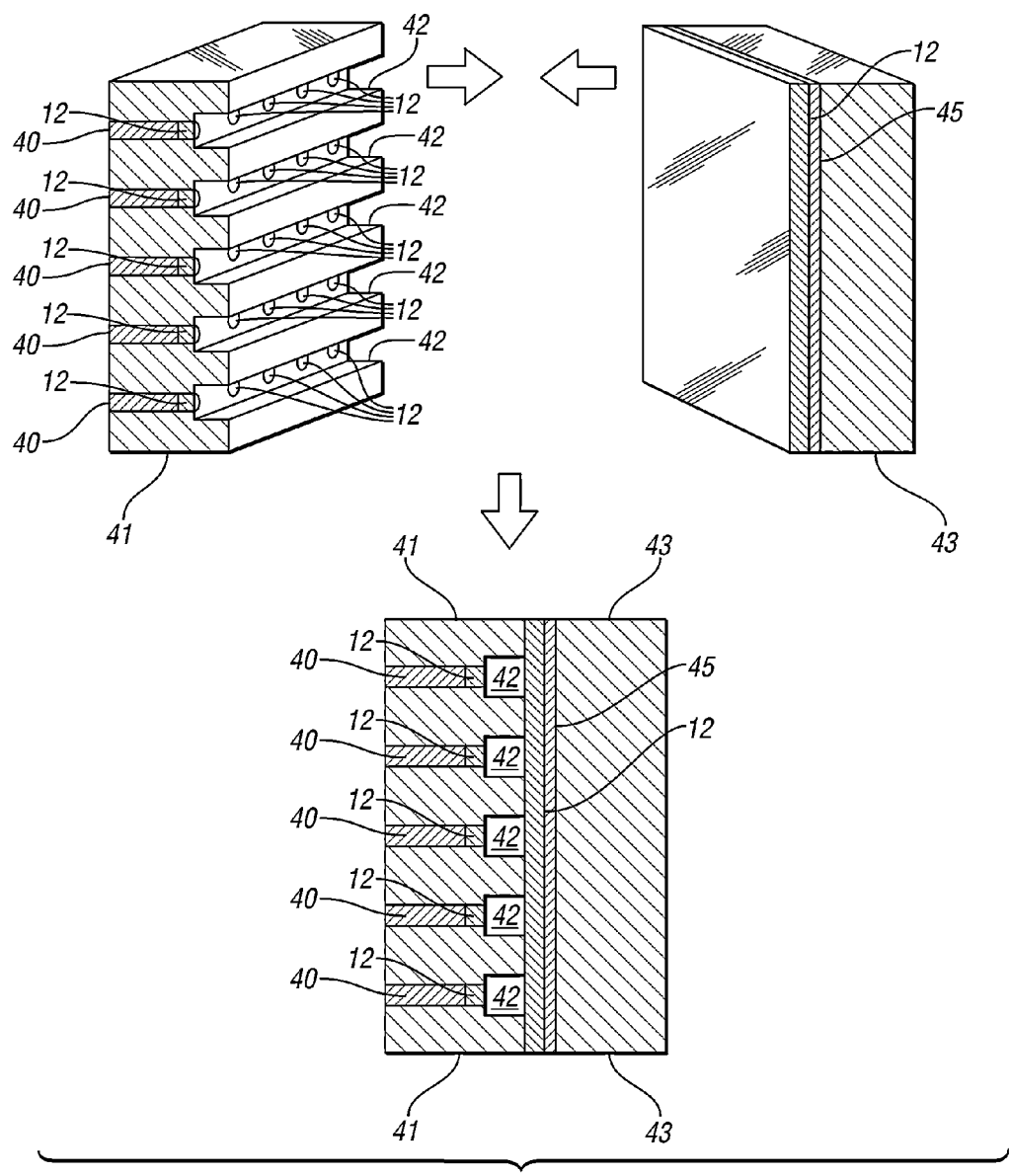
FIG. 42 (upper left) is a perspective schematic view of one side or half of a gas-filled detector.

Referring now to FIG. 42, there is shown a preferred embodiment of the invention, showing an alternative view of a compartmentalized gas-filled detector. Shown are electrodes 40 that pass through compartment walls 41 to the gas filled channels 42. On the opposite side 43 is shown a planar electrical contact 45 upon which neutron reactive material 12 has been placed. A voltage is placed across the electrodes. Small compartments 42 trap the detector gas. The compartments 42 and/or electrodes 40 are coated with neutron reactive material 12. The compartments are sized to be smaller than the reaction product ranges. The small compartments are large enough to absorb measureable energy from reaction products, but too small to absorb measureable energy from background gamma rays and x-rays. The result is the elimination of background radiation signals. The dot contact arrangement allows for interaction position information to be preserved.

Figure 43:
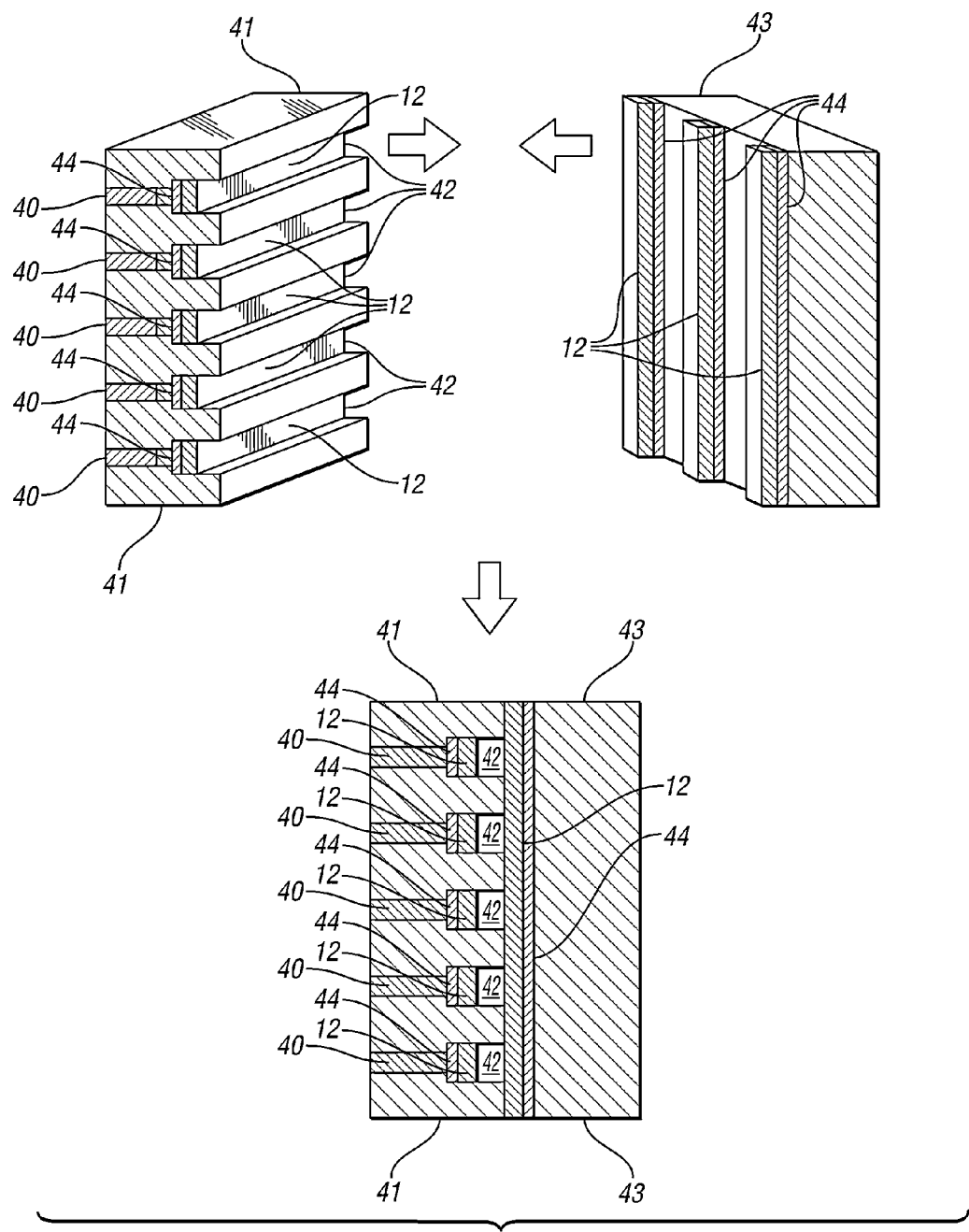
FIG. 43 (upper left) is a perspective schematic view of one half or side of a gas-filled detector.

Referring now to FIG. 43, there is shown a preferred embodiment of the invention, showing an alternative view of a compartmentalized gas-filled detector. Shown are electrodes 40 that pass through compartment walls 41 to the conductive strips 44 coated with neutron reactive materials 12 that pass through to the gas filled channels 42. On the opposite side 43 are shown conductive electrical contact strips 44, arranged cross-wise to the conductive strips on substrate 41, upon which neutron reactive material 12 has been placed. A voltage is placed across the electrodes. Small compartments 42 trap the detector gas. The compartments 42 and/or electrodes 40 are coated with neutron reactive material 12. The compartments are sized to be smaller than the reaction product ranges. The small compartments are large enough to absorb measureable energy from reaction products, but too small to absorb measureable energy from background gamma rays and x-rays. The result is the elimination of background radiation signals. The cross wise contact arrangement allows for interaction position information to be preserved.

In those embodiments disclosed in FIGS. 13-43 a common element taught is the incorporation of one or more objects or structure having large surface areas into a gas-filled detector, where these surfaces are coated with neutron reactive material, or the surfaces or surface portions are composed, at least partially, of neutron reactive material. The surfaces or surface portions are arranged in manner such that neutron streaming is minimal or eliminated when the detector is irradiated from a side of the detector. The surfaces may be flat or curved. The surface portions may be replaced with absorbers of porous or filamentary material or a semi-solid material or aerogel. The incorporation of the extended surfaces coated with or composed of neutron reactive material increases the neutron detection efficiency of the gas-filled detectors over conventional coated designs.

Method to Make the Devices Shown in FIG. 43.

The compartmentalized gas detectors depicted in FIGS. 34-43 can be manufactured by incorporating a variety of different etching and micro-machining methods. One method of creating the compartments is to ablate the channels and compartments into an alumina substrate with a laser, a process already commonly used to produce intricate features in alumina plates. Holes can be ablated through alumina substrates 1-2 mm thick, which will allow for the formation of the via-holes backfilled with contact materials 40 and neutron reactive materials 12 for the contact attachments. The channeled substrate can be aligned to a second substrate that has already been coated with a metal 40 and the neutron reactive material 12, and attached with any common epoxy. The ends are then sheared off to form the first half of the capillary device. The process is repeated for the second half. Afterwards, the different substrates are fastened together to form the devices depicted in FIGS. 34-43.

An alternative method to manufacture the detectors in FIGS. 34-43 is to build a mold defining the compartments, into which the foam, porous or aerogel material, while still a malleable solution, is injected. The solution is dried and removed from the mold. The material may then be coated with neutron reactive materials through physical vapor deposition, such as evaporation and sputtering, through chemical vapor deposition and/or through electroplating. Lids coated with conductive contacts can then be applied to complete the compartmentalized enclosure.

Method to Make the Devices Shown in FIGS. 13-15, 18-27, 32-33.

Although the present invention shown in FIGS. 13-15, 18-27, 32-33 is described as having a generally cylindrical shape, the design is of description and not limitation and other designs can be used, including rectangular cross section tubular, closed ended structures and other three-dimensional geometries that may well be utilized within the scope of the presently described invention.

The housing of the gas-filled tube can be fabricated by utilizing a polished metallic open ended tube or an internally metal-lined, preferably formed metal which is chemically deposited or electroplated, moderator encasement open ended tube, which may be made of polyethylene, polypropylene, or some high-density polyethylene compound, or any other suitable material that has a large hydrogen content. Insulating end caps are preferably made from the same moderator material and will be fitted within recesses in the encasement tube. The signal feedthrough end cap will have a feedthrough for electrical connection to the inner metal wall, which will be from here forth the cathode 1. A thin anode wire 5 will be strung between the two end cap plates and centered on the axis of the cylindrical housing tube 1. One end of the anode wire 5 will be connected to a standoff insulator which will be attached to the blank end cap; the insulator will include a ceramic portion and a soldiering terminal for the wire. This blank end cap will also have a small hole perforated through the cap to act as the ionizing detection gas backfill port, later to be sealed shut. The anode wire will be feedthrough a cylindrical aerogel 25 composed of neutron reactive material. The aerogel will have a center-hole bore through the axis of the aerogel cylinder, at least large enough for the anode wire to be feedthrough. The aerogel may also have holes bored perpendicular to the aerogel's cylindrical axis and intersecting the axis. The holes will be larger than the aerogel pore size and smaller than the diameter of the cylinder. The holes in the aerogel may be machined by classical bit drilling technology, LASER ablation technology, water jet drilling technology, or any other suitable drilling technology. The holes are to act as charge transport channels through the neutron reactive material aerogel. The other end of the anode wire 5 will be connected to a conductive spring, which will keep the anode wire taut, and will be integrated into a ceramic feedthrough fitted to the opposing end cap, which will be for electric signal out, and will be connected to a standard high voltage connection lug. The ground of the connection lug will be connected to the cathode to complete the charge sensitive circuit. The end cap and aerogel assembly will then be slid within the tube housing and solder-sealed in place. The tube will then be purged with detection gas and the gas-fill hole sealed.

An insulating cap is attached to a cylindrical metal tube acting as the cathode 1, such as aluminum or stainless steel, through which a hole is drilled for the anode wire 5. A set of inserts 19 is manufactured to fit inside the metal tube in the shape of fins or substrates. The inserts 19 are coated with neutron reactive materials 12 through physical vapor deposition, such as evaporation and sputtering, through chemical vapor deposition and/or through electroplating. Alternatively, a mold of neutron reactive porous material 25, such as foam, sponge, fibrous material or aerogel, is formed as an insert for the detector. For those designs utilizing a wire grid 23 can then have the grid inserted and attached to the inside of the insert structure. An additional grid 26 can then be attached to the outside of the insert structure. Spacers are attached to the outside of the insert structure to hold it symmetrically within the metal tube. The insert structure, with grids and spacers, is put inside the metal tube and fastened into place. An anode wire 5 is attached at a contact and fed through the hole drilled in the insulating cap and through the coaxially arranged insert. A second insulating cap is attached to the other end of the metal tube, through which the anode wire is also laced. Electrical connectors are attached to the tubes, along with a gas purge and refill connector. The air is evacuated and a proper detector gas is backfilled into the chamber.

This type of compartmentalized neutron detector is composed of a few main parts, those being the gas containing shell, the neutron reactive material, the multiplication signal wire (anode), and the transport medium (gas) in between the two. Common gas-type sensors utilize a metallic shell and unique anode wire for signal formation. Special techniques are employed to support the anode wire under tension between caps at either end of the metallic tubular shell. The techniques require the use of electrical insulators to maintain the high voltage between the wire and the shell with very little current-flow between the two. The shell and wire assembly may be implemented as-is with a porous transport medium within the detector gas as long as the porous medium is electrically insulating or of very high resistivity. High resistivity porous material is commonly available in the form of a ceramic foam. Open-celled and closed-cell foam materials may be implemented. Open-cell-foam offers the advantage of less restricted charge transport, whereas closed-cell foam may provide better charge multiplication for greater signal formation. There are a number of usual manufacturing methods for ceramic foam and any may be applicable here. The only requirement is that the material is very low density, very high resistivity or insulating, and contains neutron conversion material such as lithium, boron, uranium, thorium, gadolinium or cadmium. Porous ceramics may be made from compounds of the conversion material, or processes may be employed to coat or impregnate the porous material. This can range from depositing the conversion material in the foam to compounding the conversion material with the foam. Chemically working with the foam may involve etching the foam to obtain greater porosity or reacting a conversion material with the foam to replace foam material with the unique conversion material. Foams can be formed into a cylindrical or tubular shape via molding processes to fit the shell and wire geometry. The shell may even be used as the mold if it proves advantageous. These processes hold true for aerogels and other porous media.

Method to Make the Devices Shown in FIGS. 16, 17, 29, 30.

Although the present invention shown in FIGS. 16, 17, 29 and 30 is described as having a generally rectangular shape, the design is of description and not limitation and other designs can be used, including circular, square, and other three-dimensional geometries that may well be utilized within the scope of the presently described invention.

A metal box acting as the cathode 1, such as aluminum or stainless steel, through which a hole is drilled for the anode wire 5. A set of inserts 19 is manufactured to fit inside the metal box in the shape of fins or substrates. The inserts 19 are coated with neutron reactive materials 12 through physical vapor deposition, such as evaporation and sputtering, through chemical vapor deposition and/or through electroplating. Alternatively, a mold of neutron reactive porous material 25, such as foam, sponge, fibrous material or aerogel or ultra-thin Li foil, is formed to make inserts for the detector. Those designs utilizing many wires can have multiple wires fed into the metal box through multiple insulating feedthroughs, the wires acting as cathodes 1 and anodes 5. The insert structures are put inside the metal box and fastened into place. The anode wire(s) 5 and cathode 1 wires, where applicable, are fed insulators in a lid for the metal box. The lid is sealed on the box to complete the enclosure. Electrical connectors are attached to the anodes and cathodes, along with a gas purge and refill connector. The air is evacuated and a proper detector gas is backfilled into the chamber.

The detector of FIG. 31 can be manufactured using a combination of principles taught in for manufacturing the cylindrical and box-shaped detectors.

Detector Uses:

The compartmentalized neutron detectors can be used at numerous facilities where neutron measurements are important in the energy range usually characterized by cold to epi-thermal neutrons. High density polyethelene (HDPE) plates in front of sections of the detector can be used to thermalize fast neutrons and provide some energy information on the incident neutron field. Selectively chosen collimator holes in the HDPE can assist with directional sensitivity. The new devices can be fabricated because of the advances realized with aerogel technologies. Furthermore, the technology described is relatively inexpensive to fabricate and deploy.

The compartmentalized neutron detectors can be used in harsh environments, such as oil-well logging and nuclear reactor controls. The compartmentalized neutron detectors can be used for homeland security monitoring of special nuclear materials and nuclear weapons. The compartmentalized neutron detectors can also be used to neutron research and can be deployed as neutron scattering institutions such as the Spallation Neutron Source in Oak Ridge, Tenn.

The compartmentalized neutron detectors are unique and different from prior art for many reasons. Unlike common $^3$He and $^{10}$BF$_3$ gas-filled neutron detectors, the compartmentalized neutron detector does not need to be pressurized to increase neutron detection sensitivity. Unlike prior art coated neutron detectors, such as $^{10}$B-lined gas-filled detectors in which only one reaction product can enter the detection gas, one or more reaction products can enter the detector gas for compartmentalized neutron detectors. Unlike prior art neutron detectors with simple coated "washer" inserts that are only sensitive to neutrons from one direction, compartmentalized neutron detectors are designed to be sensitive to neutrons from multiple directions with a reduction or elimination of neutrons streaming through the device that do not intersect the neutron reactive materials. Unlike prior art coated neutron detectors, such as $^{10}$B-lined gas-filled detectors with coatings on the outer wall, compartmentalized neutron detectors have multiple neutron reactive surfaces and inserts that allow for a large increase in neutron detection efficiency. Unlike prior art coated neutron detectors, the compartmentalized neutron detectors can have the compartments built too small for background radiation to deposit enough energy to be measured, while the compartments are still large enough for the reaction products from the neutron reactive material to deposit enough energy to be measured, thereby reducing or eliminating background radiation interference.

Figure 44:
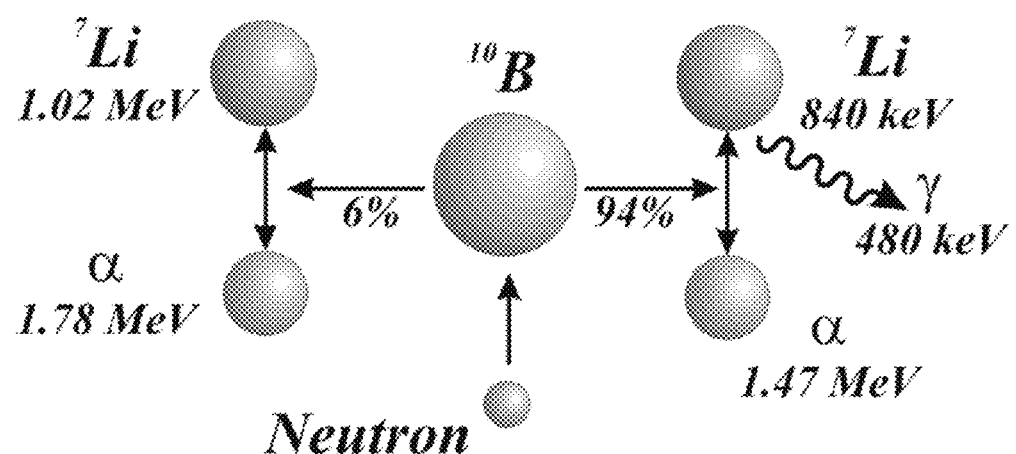
FIG. 44 is a schematic view of two branches of the reactions which occur when a neutron interacts with boron-10.

The two most used solid materials for neutron detection are boron-10 ($^{10}$B) and lithium-6 ($^6$Li). When a slow or epithermal neutron interacts in either of these materials, a nearly instantaneous reaction occurs (within $10^{-14}$ s) resulting in the emission of two charged particles in opposite directions. The neutron reaction with $^{10}$B is denoted $^{10}$B(n,a)$^7$Li, meaning that a neutron interacts in the $^{10}$B, and releases an alpha particle and a $^7$Li ion. The energy released for the reaction with $^{10}$B is 2.31 MeV for 94% of the reactions and 2.79 MeV for 6% of the reactions. The energy is divided between the particles unequally, inversely according to mass. Hence, for the 94% branch, the $^7$Li ion has 0.84 MeV and the alpha particle ($^4$He) has 1.47 MeV. For the 6% branch, the $^7$Li ion has 1.01 MeV and the alpha particle ($^4$He) has 1.78 MeV. The cases are depicted in FIG. 44.

Figure 45:
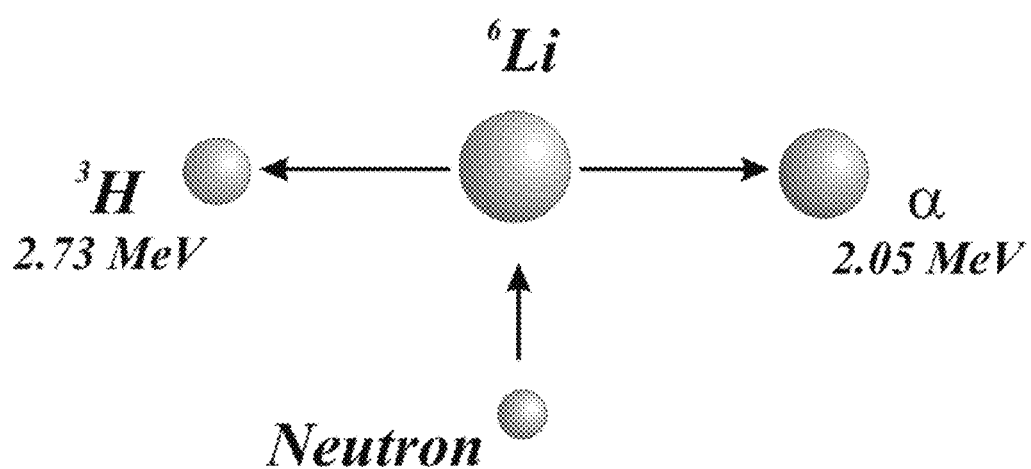
FIG. 45 is a schematic view of the reaction which occurs when a neutron interacts with lithium-6.

The neutron reaction with $^6$Li is denoted $^6$Li(n,t)$^4$He, meaning that a neutron interacts in the $^6$Li, and releases an triton ($^3$H) and a $^4$He ion. The energy released for the reaction with $^6$Li is 4.78 MeV for one or more reactions. The energy is divided between the particles unequally, inversely according to mass. Hence, the $^4$He ion has 2.05 MeV and the triton ($^3$H) has 2.73 MeV. The case is depicted in FIG. 45.

Note that these charged particle reaction products are ejected in opposite directions. Note also that the particle have different energies AND different ranges. The higher energy particle has a longer range in matter than the lower energy particle.

Figure 46:
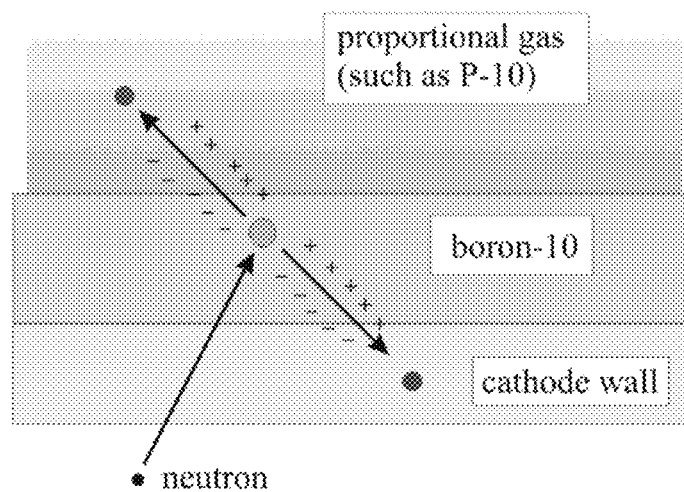
FIG. 46 is a schematic view of a proportional gas, a layer of boron-10 and a cathode wall.

It is common for a neutron detector to be coated with boron to produce a detector. The method requires a surface be coated with boron or a boron compound or mixture. This surface is placed in a gas-filled detector. Often, the surface is the inside shell of the gas-filled detector. If a charged particle ejected from the reaction reaches the detector gas, it can ionize the gas and cause, which can be measured. Typically, the ionization is measured by applying a voltage in the gas, which causes the electrons and ions to drift apart. They current induced by these charges is measured by sensitive electronics connected to the detector. The ranges of the reactions products of FIG. 44 in most solids are approximately 1-7 microns. If the coating is placed upon the inner shell wall of the detector, then only one of the products is ejected in the direction of the gas container. If a coating is applied to an insert, then the insert must be very thin (approximately 1 micron), or again only one of the products is ejected in the direction of the gas container. The situation is depicted in FIG. 46.

Figure 47:
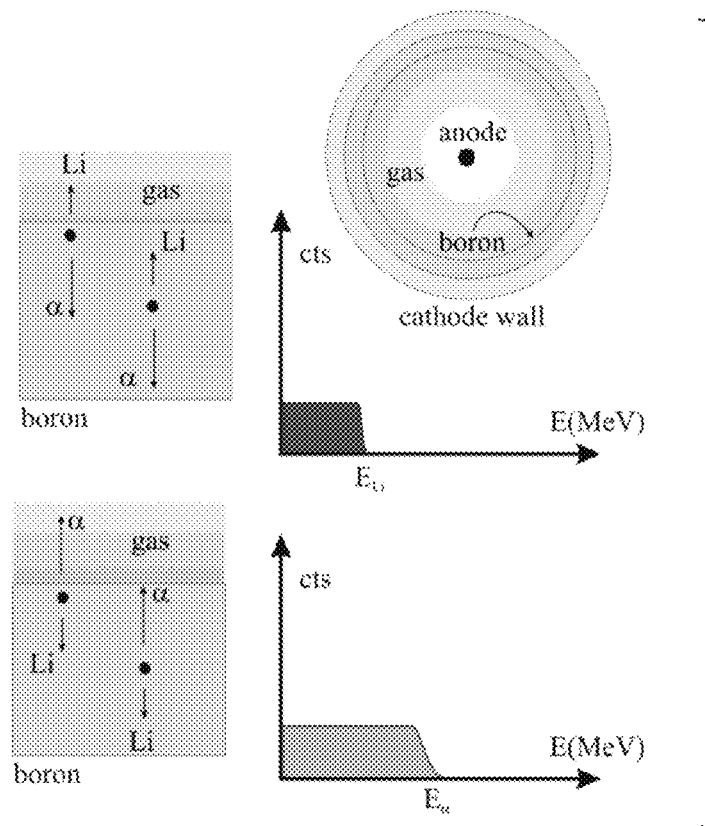
FIG. 47 shows a number of schematic views (and corresponding graphs) of a thick reactive film attached to an insert in a gas detector.

Suppose a thick reactive film is attached to an insert in a gas detector, as depicted in FIG. 47. If interactions occur such that the Li ion reaction product is directed in the general direction of the gas, then we have two limiting cases. If the interaction occurs at the film/gas interface, the Li ion will deposit almost all of its energy in the detector. However, if the interaction occurs deep in the coating, then the Li ion will lose most of its energy before reaching the gas, or may not even reach the gas, hence deposits little or no energy in the gas. As a result, the energy measured by the detector ranges from zero up to the reactive energy of the Li ion (0.84 MeV or 1.01 MeV).

If interactions occur such that the alpha particle ($^4$He) reaction product is directed in the general direction of the gas, then we have two other limiting cases. If the interaction occurs at the film/gas interface, the alpha particle will deposit almost all of its energy in the detector. However, if the interaction occurs deep in the coating, then the alpha particle will lose most of its energy before reaching the gas, or may not even reach the gas, hence deposits little or no energy in the gas. As a result, the energy measured by the detector ranges from zero up to the reactive energy of the Li ion (1.47 MeV or 1.78 MeV). We can now add these results to obtain the expected spectrum, as shown in FIG. 48, which produces a "stairstep" spectrum, a consequence of the "wall effect". In order to reduce background from competing radiations and electronic noise, it is a common practice to eliminate energy pulses in the low energy region of the spectrum by "discriminating" them out with an electronic discriminator. Consequently, eliminating low energy pulses also eliminates valid neutron counts in the portion of the region where most of them have accumulated. In other words, the discriminator is increased from zero to some set energy, 300 keV for instance, I will eliminate a large portion of the valid neutron counts, being approximately 20% of the pulses for this example. This problem is named the "wall effect".

Figure 50:
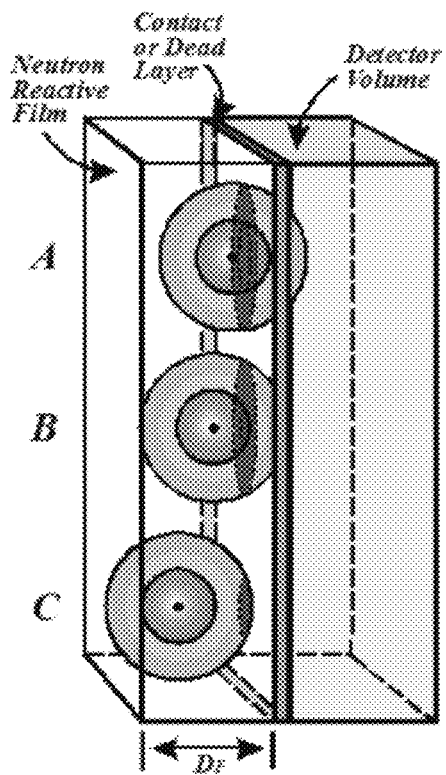
FIG. 50 is a schematic view which shows long and short range particles.

This issue is further complicated by the fact that the limiting thickness for a boron film, beyond which neither particle can reach the gas, is approximately 2.5 microns, thereby, causing a clear limitation in the total efficiency that the single insert can achieve. At 2.5 microns, approximately 10% of thermal neutrons intersecting the film will interact, but only 40% of those interactions result in a detectable count, hence we have (0.4)(0.1)=4% detection efficiency. This is due to the angular effect, as shown in FIG. 49 and FIG. 50. The further that the reaction takes place away from the film/gas interface, the lower the probability that a reaction product will enter the gas, as defined by the solid angle cone that intersects the gas volume, where L is the particle effective range.

Referring to FIG. 50, the long range particle is depicted as an outer circle and the short range particle depicted by an inner circle. For reactions at the interface, one or the other particle has a high probability of reaching the gas. For reactions near the short range particle range distance, only the long range particle still has appreciable probability of reaching the gas. Finally, at a further distance, the long range particle interaction probability diminishes to zero. Note, from this simple instruction, the maximum probability that a reaction product of a specific type will enter the gas is 50% only at the film/gas interface. This result is because 50% of the time, a reaction product trajectory is towards the wall.

Figure 51:
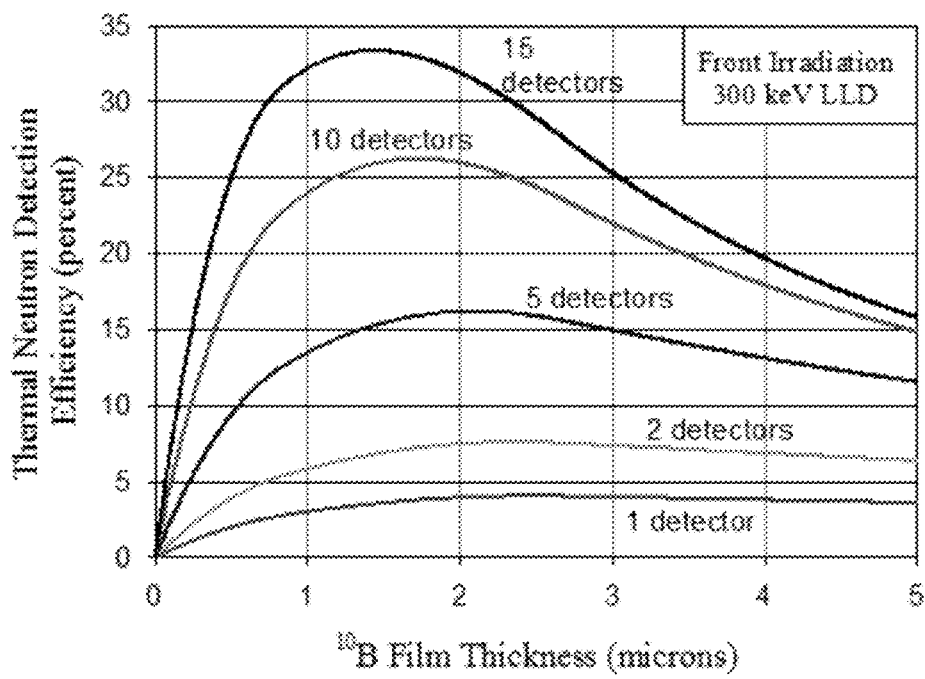
FIG. 51 shows a number of graphs of detection efficiency versus film thickness for different numbers of detectors.

These combined effects, the solid angle and self-attenuation, limit a thin film detector to 4% detection efficiency of thermal neutrons. One proposed solution is to put films on all walls of the detector. Because of attenuation we have the following situation. First, 10% of the neutrons are absorbed upon entering the cylinder, leaving 90% of the original amount to interact with the wall upon exiting, yielding (0.9)(0.1)=9% of the original beam interacts in the second wall. We then have 19% of the neutrons interacting, where only 40% of them produce a detectable count, yielding (0.19)(0.4)=7.6% detection efficiency (very poor). One idea is two put many surfaces in the gas container to increase the efficiency, but this has issues or diminishing returns. Boron films, at the optimum coating thickness, yield 32% thermal neutron detection efficiency for a detector with 14 coated surfaces (or 7 inserts coated on both sides), see FIG. 51. Further, the maximum energy observed is only 1.78 MeV for the 6% reaction branch, but more typical the high energy observed is 1.47 MeV for the 94% reaction branch. Hence, there is a diminishing return for additional inserts. Hence, to maximum effective range that still allows for at least 300 keV of energy to be deposited in the gas by the 1.47 MeV alpha particle is limited to 2.4 microns. If an alpha particle travels more that 2.4 micron in boron, if loses too much energy, and will have energy below 300 keV (not detectable).

Figure 52:
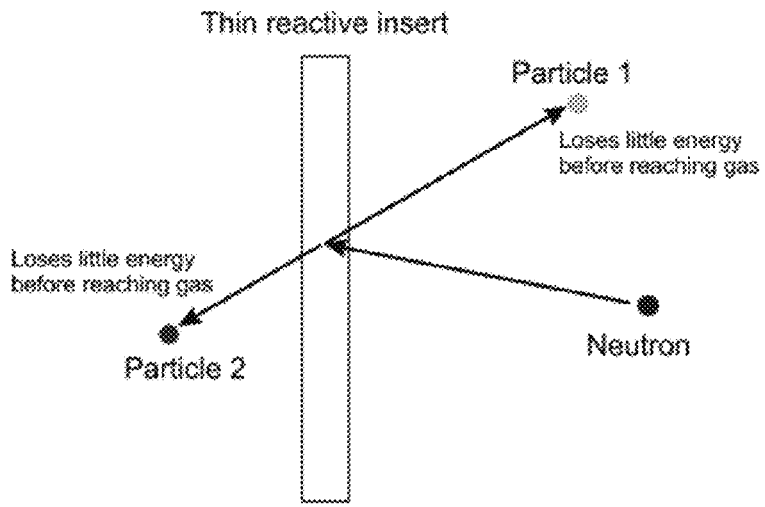
FIG. 52 is a schematic view of a thin reactive insert having two particles which have escaped from the insert.
Figure 53:
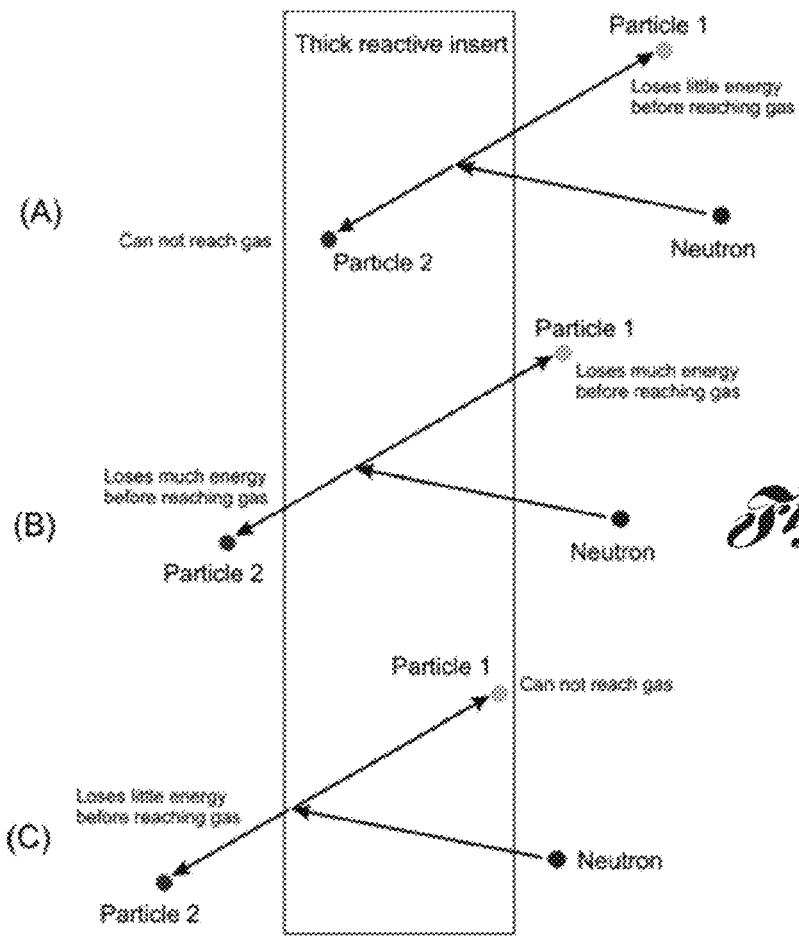
FIG. 53 is a schematic view of a thick reactive insert showing three cases (A), (B) and (C) of reactions.

Suppose, instead, the insert itself was made of $^{10}$B, but thin enough such that both particles can escape (i.e. FIG. 52). In other words, it is not a coating upon a substrate, but rather is the actual substrate. For a thin substrate, BOTH particles CAN escape. Note that oblique angles will cause some instances in which one or both particles are completely absorbed in the film. However, unlike the case in which a substrate is coated, there is a practical probability that both particles will escape that material into the gas. Also, as a result, the amount of energy deposited is higher than the coated-substrate case, where only one particle can deposit energy in the gas. For thicker substrates approaching the thickness of the long-range particle range, there is still a high probably of depositing energy in the detector well above the background noise. This occurs because, if one reaction products must travel far to get to the gas, the other does not, and has a high probability of escaping into the gas. From FIG. 53, case (A) shows the case in which the interaction occurs near an insert surface and the long range particle is ejected into the gas, while the short range particle goes the other direction, but still emerges from the opposite surface to ionize the gas. Case (B) shows the case in which the interaction occurs near the opposite insert surface and the short range particle is ejected into the gas, while the long range particle goes the other direction, but still emerges from the first surface to ionize the gas. Case (C) shows the case in which the interaction occurs near the middle of the insert, thereby, allowing for both particles to be emitted into the gas. Of course there are cases for oblique angles where only one or neither reaction product enters the gas, but there is a probably of leaving energy. As a result, the wall effect is suppressed. The limiting film thickness is that of the COMBINED particle ranges, and NOT the range of the long range product.

Hence, the maximum effective range that still allows for at least 300 keV of energy to be deposited in the gas by both the 0.84 MeV and 1.47 MeV alpha particle is combined such that a 3.6 micron film can be used (R-alpha=2.4 microns, R—Li ion=1.2 microns). The result is 14.7% absorption of neutrons and a corresponding thermal neutron detection efficiency of 8.1% for an optimized insert thickness (a optimized boron-coated insert has 20.6% absorption for an insert coated on both sides and only 7.8% thermal neutron detection efficiency). Hence, with exponential attenuation considered, seven inserts of pure boron-10 will absorb 67% of the neutrons intersecting the device, and can achieve >37% thermal neutron detection efficiency, significantly greater than the film-coated-insert case. If the insert thicknesses are optimized, the solid insert case can deliver >50% efficiency for seven inserts. By comparison, using the same conditions, a series of inserts coated on both sides with $^{10}$B, seven inserts will absorb 80% of the neutrons while delivering only 30.3% thermal neutron detection efficiency, and as already noted, an optimized case delivers only 32% efficiency.

Although interesting, this situation is nearly impractical to make, because the solid boron insert must be on the order of 2 microns thick and would be too fragile for practical applications. However, a low density material, such as aerogel, with a density similar to air, will allow for thicker inserts, thereby, increasing structural strength, while maintain the same amount of boron in the film. In other words, the density of boron at 2.31 g cm$^{-3}$ is reduced to less than 2 mg cm$^{-3}$. A neutron will intersect that same amount of boron in a 2 mm thick insert of boron aerogel as a 2 micron thick solid boron film. A 2 mm thick piece of aerogel is robust enough to act as a standalone substrate. For inserts thinner that the summed reaction product ranges, a valley appears between the noise and the pulse height spectrum, an important feature. For the low-density solid case, as this is called, the discriminator can now be set in that valley such that fewer neutron counts are lost. Hence, the low-density solid insert case allows for higher energy deposition, higher gamma ray and background discrimination, and higher neutron detection efficiency.

The case is even more salient for Li-based coatings and aerogels. Because of the higher energies and longer ranges of the reaction products, the separation between noise and the neutron counts can be made much larger, thereby, allowing for higher efficiency and higher background discrimination, than any of the boron-based insert cases.

Figure 54:
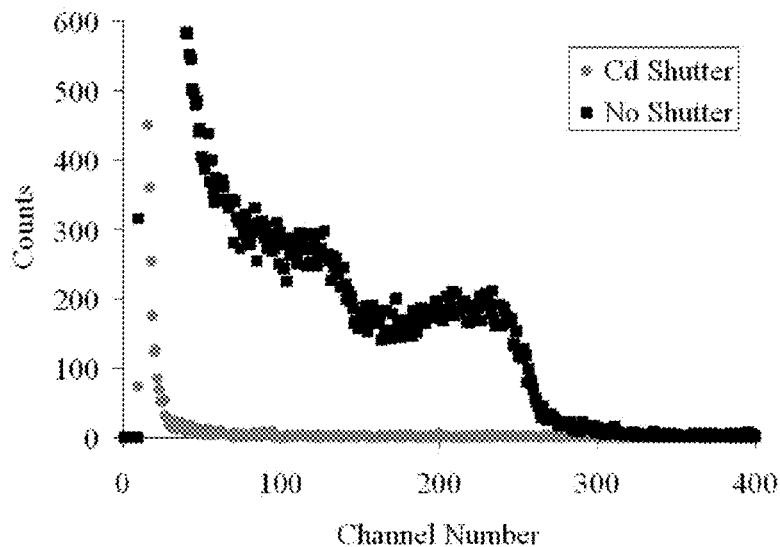
FIG. 54 is a neutron response pulse-height spectrum from a single 2 mm thick sheet of 20% saturated $B_2O_3$ polyurethane open-celled foam; the wall effect is prevalent because the struts composing the foam are too thick for both reaction products, the alpha particle and $^7Li$ ion, to escape the strut and entire absorber concurrently; in other words, only one reaction product escapes per neutron absorption.

For examples, please direct you attention to FIG. 54, showing the response of a foam insert partially composed of $B_2O_3$ placed in a gas detector chamber. Note that the spectrum extends from zero energy up to the maximum energy of a single reaction product. There is no clear distinction between the background and low energies. For reference, a Cd shutter is used to block neutrons for "on" and "off" experiments to distinguish between neutrons and background gamma rays.

Figure 55:
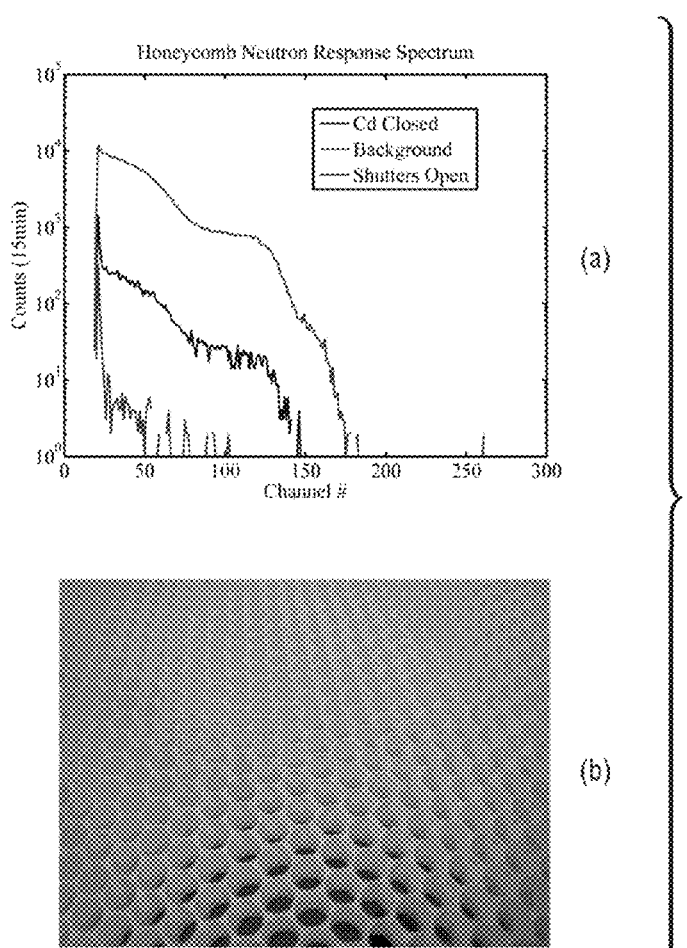
FIG. 55a is graphs of counts versus channel number.
FIG. 55b is a schematic view of a plastic honeycomb with channels that are 4 mm in diameter and 0.5 cm long; the honeycomb was coated with boron nitride and placed in a coaxial gas-filled detector; this is simply coated fins pointing inward towards the anode; the neutron response pulse-height spectrum is shown in FIG. 55a where the wall effect is prevalent.

As another example, note in FIG. 55 the concept of coating a series of honeycomb sections with a boron coating. Again, the wall effect is prevalent because only one particle can escape into the gas per neutron interaction event.

Figure 56:
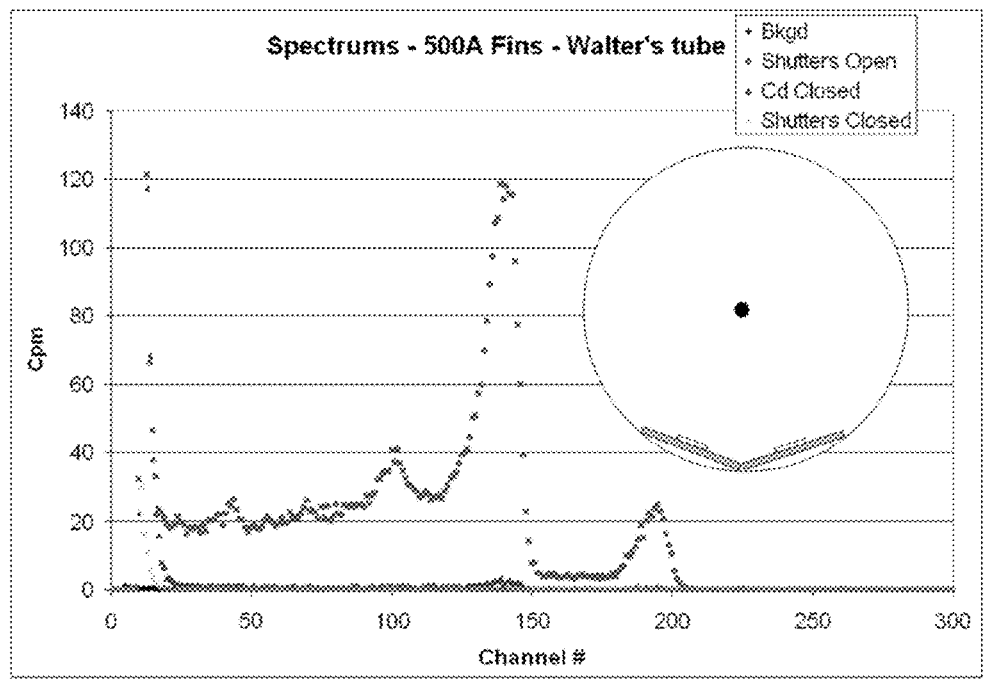
FIG. 56 is a neutron response pulse height spectrum for a coaxial gas-filled detector with a portion of the detector coated with 0.05 microns of LiF; the thickness of the LiF neutron absorber is much less than the range of the reaction products, which are greater than 1 micron.
Figure 57:
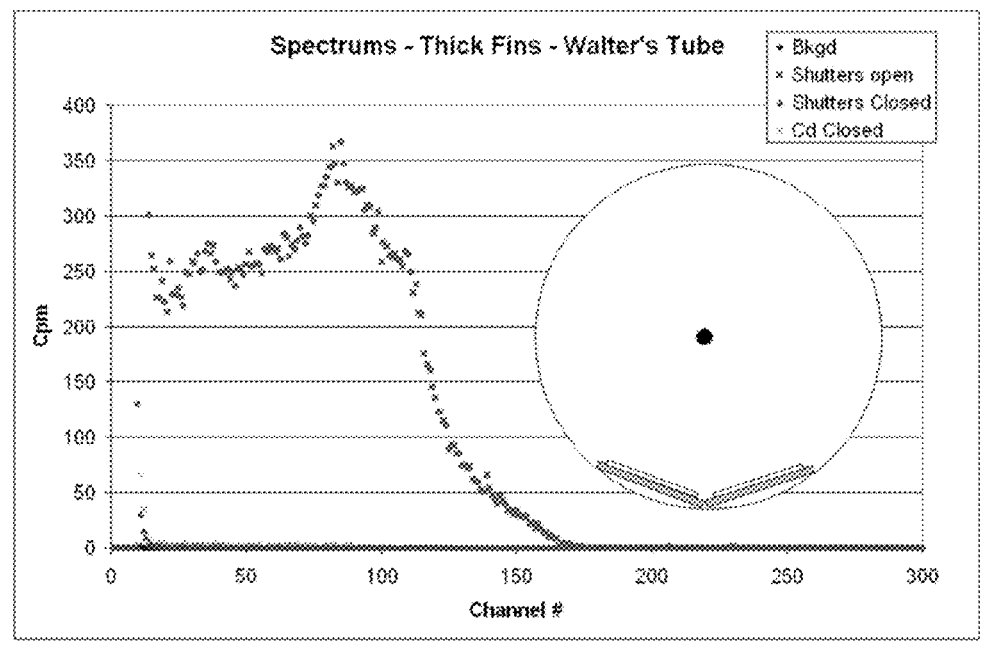
FIG. 57 is a neutron response pulse-height spectrum for a coaxial gas-filled detector with a portion of the detector coated with greater than 40 microns of LiF; the thickness of the LiF neutron absorber is greater than the range of the longest range reaction product, the triton (approximately 35 microns); at this thickness the wall effect is evident in the pulse-height spectrum.

Another experiment (FIG. 56) shows what happens if a slat coated with LiF is inserted into the chamber. If the coating is very thin (0.05 microns), there is distinction between noise and the neutron event, but the efficiency is extremely poor, below 0.01% counting efficiency. To increase the efficiency, the LiF coating was increased to 40 microns (FIG. 57), which increased the efficiency to approximately 4%, but the wall effect is still prevalent because only one particle can escape the LiF film per neutron interaction. The other reaction product particle is ejected into the wall.

Figure 58:
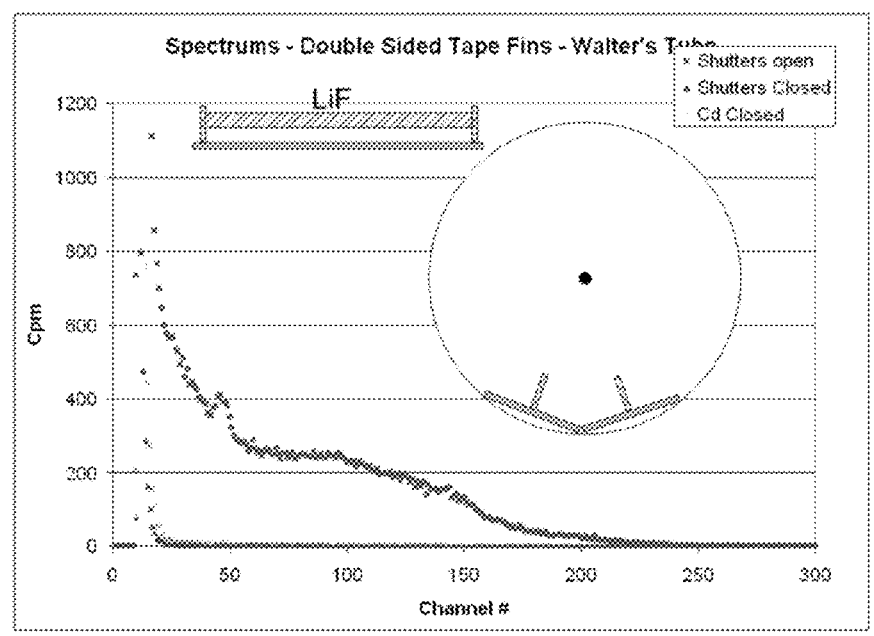
FIG. 58 is a neutron response pulse-height spectrum from a coaxial gas-filled detector with coated fins point towards the anode wire, similar to prior art; the total thickness of the neutron absorber coating and fin substrate is greater than the summed ranges of the $^6Li$ reaction products; consequently, the wall effect is evident and even more pronounced than in FIG. 47 because the distance between the fins is less than the range of the reaction products in the gas region, thus not all of the energy will be deposited in the gas from the reaction product; additionally, it is not possible to measure more than one reaction product per neutron interaction with this neutron absorber setup.

Another experiment was conducted to look at LiF coated fins that protrude into the detector, as shown in FIG. 58. The concept works, but again the wall effect is severe, because because only one particle can escape the LiF film per neutron interaction. The other reaction product particle is ejected into the fin and can not travel across the fin to get out the other side under any circumstance.

Figure 59:
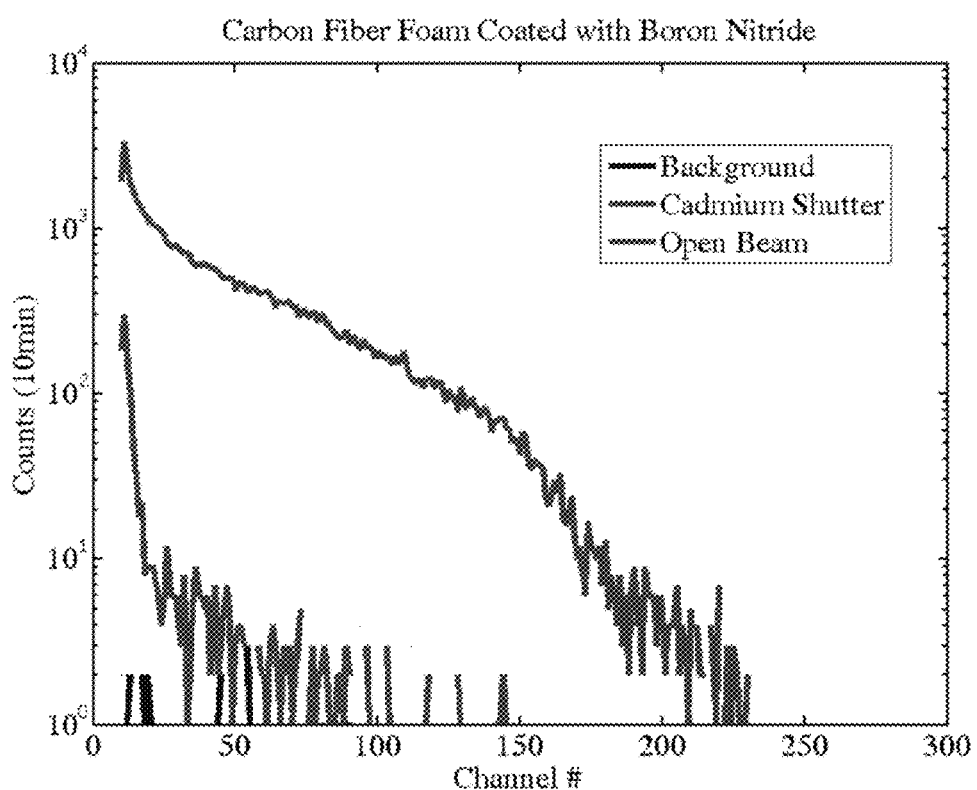
FIG. 59 is a neutron response pulse-height spectrum of carbon foam from ERG Aerospace corporation coated with a thin layer of boron nitride on the struts of the foam, similar to what is described in prior art; because of the thickness of the struts, approximately 3 mm, only one reaction product can escape the absorber and enter the gas region; further, the distance between adjacent struts of the foam is less than the range of the reaction products in gas and will result in only a fraction of the energy from reaction product to be deposited in the gas region; additionally, collecting the charge out of the foam can also prove to be difficult and prevent at least a portion of the charges from being collected.

Another experiment was conducted with ERG foam coated with boron nitride (FIG. 59), again showing the wall effect because only one particle can get out of the foam into the gas per neutron interaction. Although the boron nitride layer was thin, the foam was still too thick to allow for the reaction products to exit the foam backing into the surrounding gas.

Figure 60:
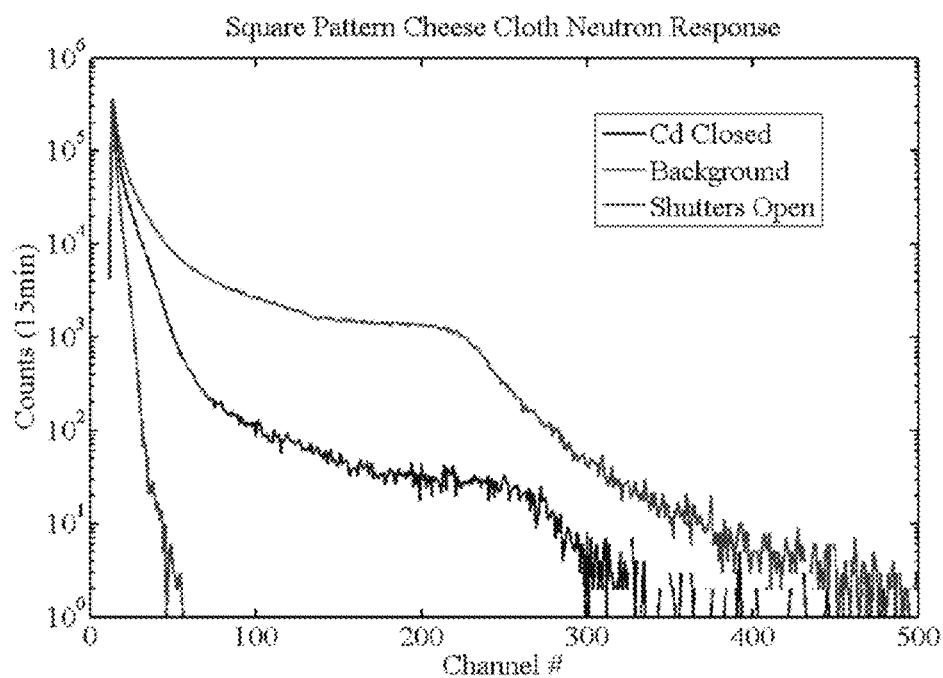
FIG. 60 is a neutron response pulse-height spectrum from cheese cloth coated with boron nitride; this absorber is similar to the absorber in FIG. 59, but the strut size is smaller and the distance between adjacent struts is larger; the wall effect is prevalent and even enhanced due to the distance between the struts causing only a portion of the reaction product energy to be deposited in the gas region.

Another experiment was conducted with cheese cloth coated with boron nitride (FIG. 60), again showing the wall effect because only one particle can get out of the cheese cloth into the gas per neutron interaction. Although the boron nitride layer was thin, the cheese cloth was still too thick to allow for the reaction products to exit the foam backing into the surrounding gas.

Figure 61:
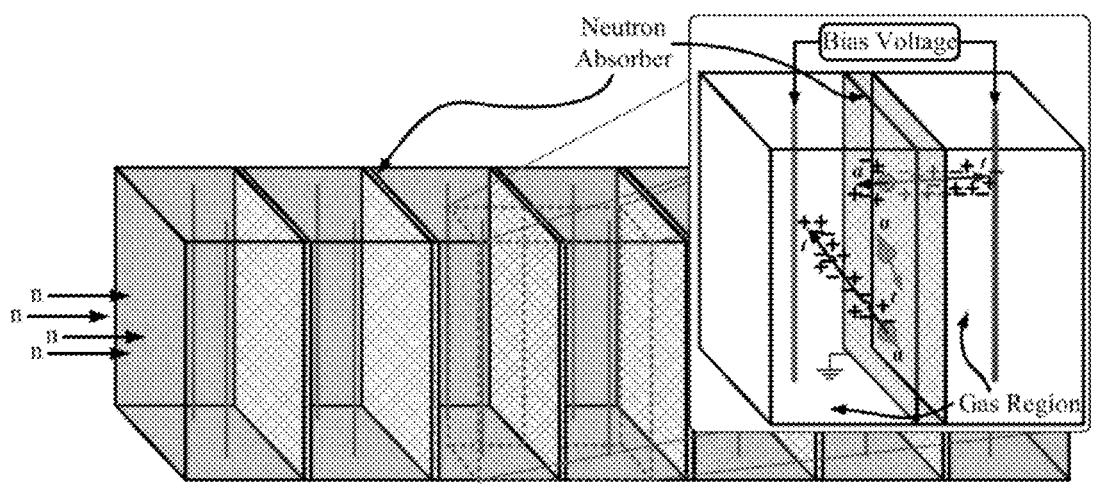
FIG. 61 is a cross-sectional schematic view of a series of neutron absorber layers which are thin enough that more than one reaction product is allowed to escape the absorber sheet concurrently and be measured in the gas region simultaneously; the inset is a depiction of a single absorber showing reaction products may escape both sides of the absorber concurrently.

FIG. 61 shows a series of neutron absorbers, in one of the preferred embodiments, that allows a respectable probably that both reaction products exit the absorber (see cut out view). There will be some instances when one particle may not exit the absorber, but overall, the amount of energy deposited in the detector is greater than for the conventional method of coating a wall or fin with neutron reactive material which results in the inferior result depicted in FIG. 59.

Figure 62:
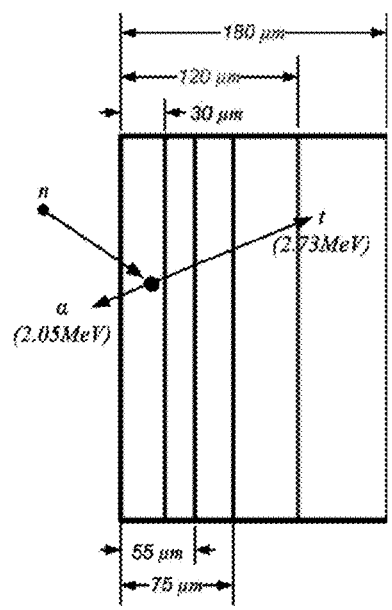
FIG. 62 is a cross sectional view of a Li foil absorber sheet; the different thicknesses are labeled and the corresponding simulated neutron response pulse-height spectra are shown in FIG. 63 where it can be seen as the thickness increase so does the self-absorption of the reaction products; however, there is a large valley between the electronic noise and the main features of the spectrum compared to conventional coated detectors.
Figure 63:
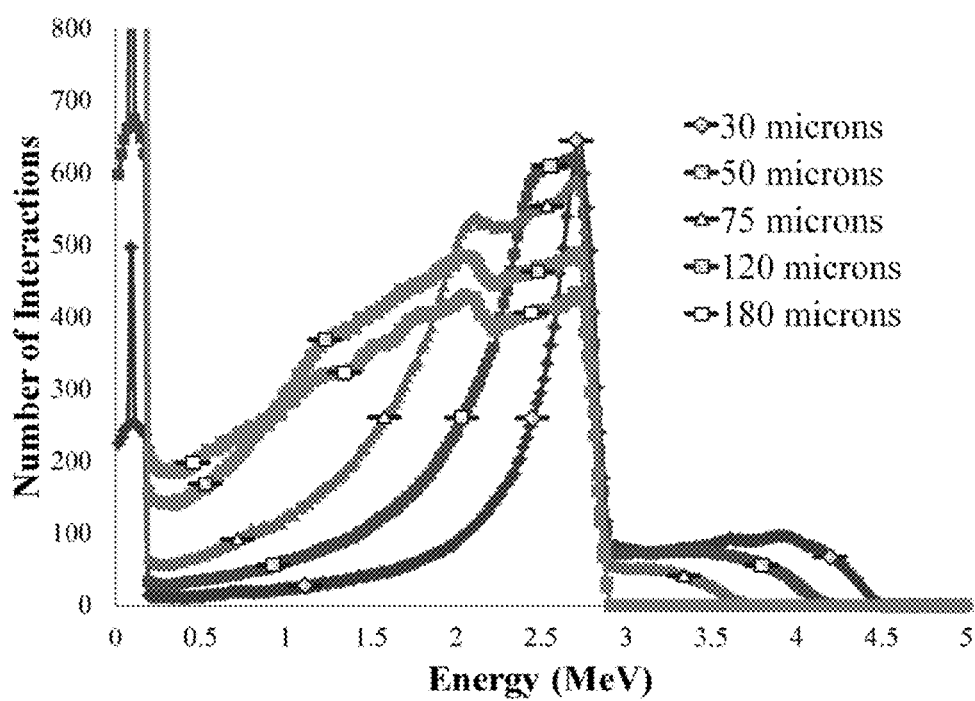
FIG. 63 are simulated neutron response pulse-height spectra from different thicknesses of Li foil; for thin absorbers there is a high probability both reaction products will escape concurrently; this escape probability decreases with increasing absorber thickness.

In a simulation, shown in FIGS. 62 and 63, a Li metal foil insert was investigated. Calculations were performed for 30, 50, 75, 120, and 180 microns thick foils. The combined ranges in Li metal of the alpha particle (30 microns) and triton (126 microns) ejected from the $^6Li(n,t)^4He$ reaction is approximately 156 microns. With a single foil of Li metal in the gas chamber, there is a probability that both particles can exit the foil for samples with thicknesses less than 156 microns. Further, for thicknesses greater than 156 microns, there is still a much greater escape probability for the reaction products than found for an insert coated with Li metal. The spectra are shown in FIG. 63. Note the clear separation between the low energy background and the neutron counts, event for the 180 micron thick case. This ability to discriminate out background makes our design superior.

Figure 64:
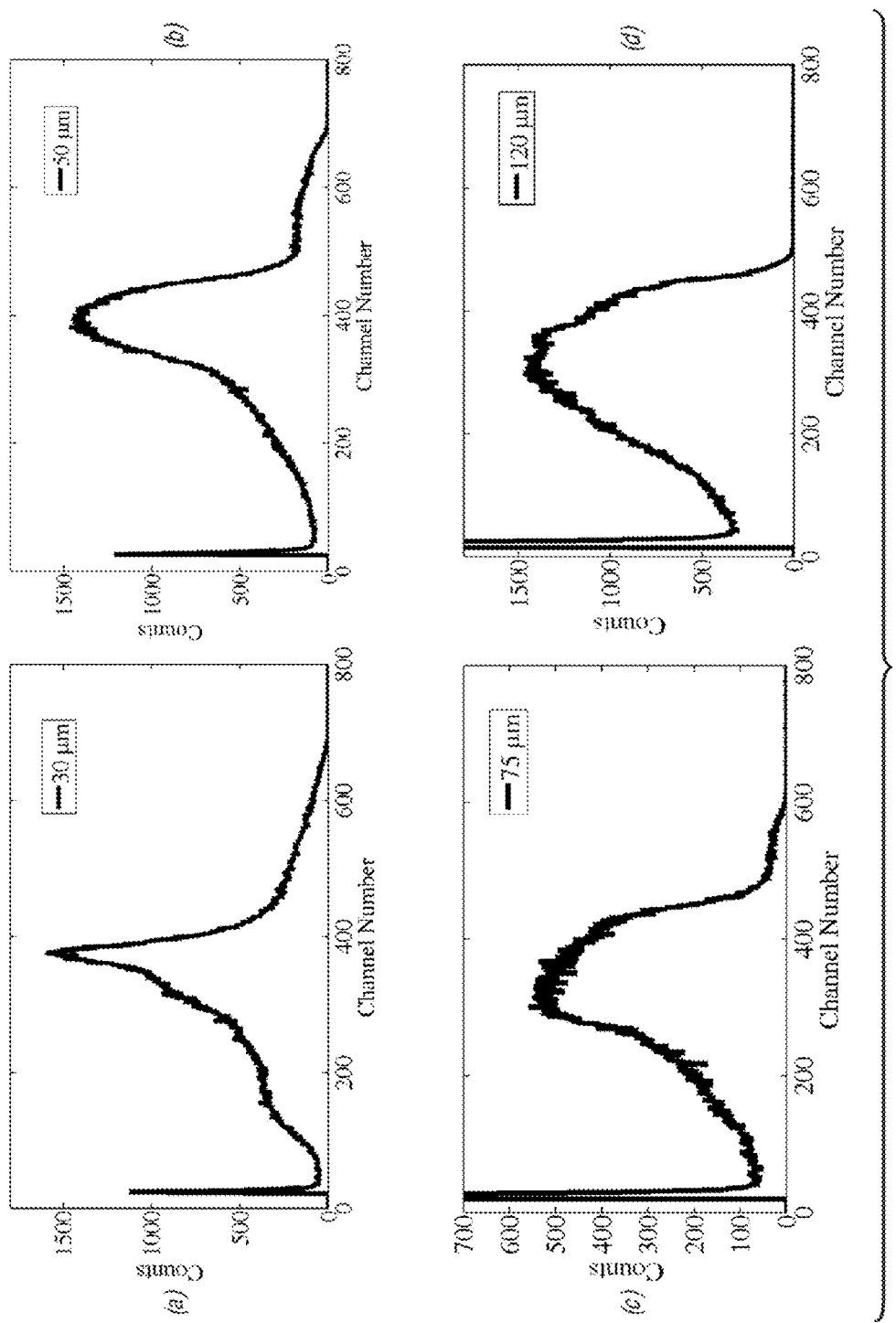
FIG. 64(a), (b), (c) and (d) are experimentally obtained neutron response pulse-height spectra from single layers of 30, 50, 75, & 120 micron thick natural lithium foils, respectively; an anode wire was positioned on each side of the single absorber as to measure reaction products simultaneously that are escaping the absorber concurrently; because both reaction products are being measured together, the wall effect is eliminated as there is now a large valley between the electronic noise in the lower channel number and the main features of the pulse-height spectrum; however, as the foil increases in thickness so does the self-absorption of the reaction products as seen in the spectra.

FIG. 64 shows experimentally obtained results and spectra. These results and spectra were published in a peer reviewed science journal as follows: K. A. Nelson, S. L. Bellinger, B. W. Montag, J. L. Neihart, T. A. Riedel, A. J. Schmidt, D. S. Mcgregor, *Investigation of lithium foil multi-wire proportional counter for potential $^3He$ replacement*, Nucl. Instrum. & Methods, A 669 (2012), pp. 79-84. Note the large separation between the background and the neutron count spectrum even for the 120 micron case.

Figure 65:
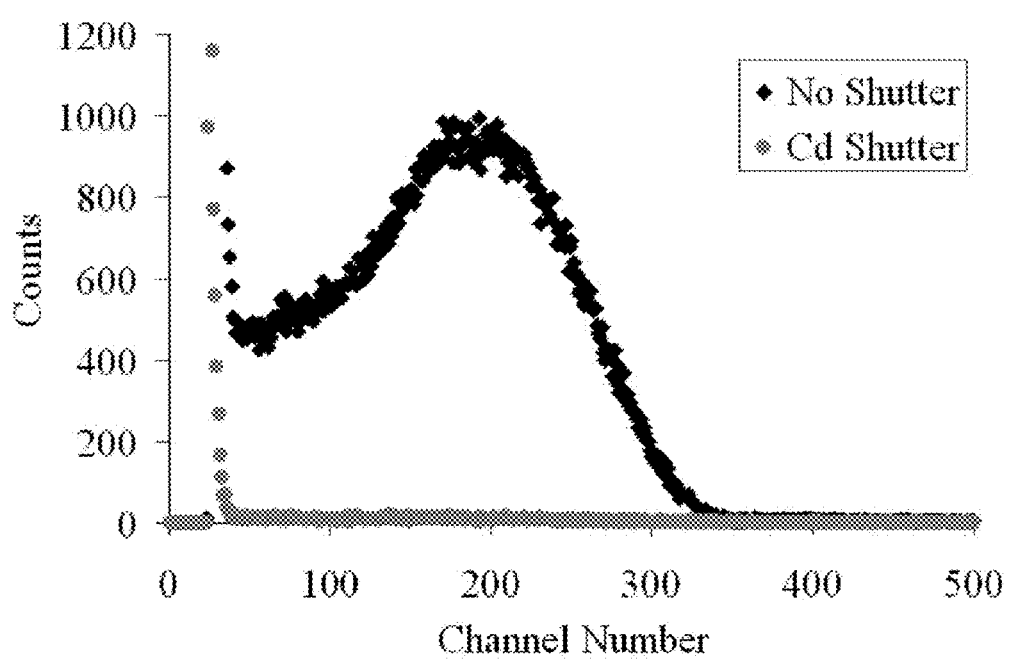
FIG. 65 is thermal neutron response pulse-height spectrum from a single 2 mm thick sheet of 10% LiF saturated polyurethane open-celled foam; a single anode wire was positioned on both sides of the foam absorber to measure reaction products simultaneously that escaped the absorber concurrently from a single neutron absorption; because a portion of the neutron absorption reactions released both reaction products into the gas region, the wall effect is eliminated which is evident in the pulse-height spectrum as there is a valley between the electronic noise in the lower channels (channel numbers 25-50) and the largest portion of the spectral feature in the higher channels (around number 200); the spectrum further shows the value of making the inserted absorber material thickness less than or equal to the combined reaction product ranges in the absorber material (not the gas); the thickness of the LiF foam should be less than the summed ranges of the alpha particle reaction product in the form and the triton reaction product in the foam to take advantage of the concept.

Another example of fibrous or porous neutron absorber material is shown in FIG. 65. A 2 mm thick sheet of open-celled polyurethane foam was saturated with 10% LiF. The LiF is incorporated into the struts of the foam and is not a coating on the foam. The strut diameter is less than the summed ranges of the reaction products. Thus, there is a probability that both reaction products can escape the absorber. This probability eliminates the wall-effect and is evident in the pulse-height spectrum because there is a valley between the electronic noise of the system and the neutron induced features.

To summarize, the importance of the invention includes the ability to use low-density, ultra-low density or ultra-thin materials that allow for both particles to escape at least some of the time. By doing so, we reduce the wall effect and allow for better discrimination of background radiations.

SUMMARY OF EXAMPLE EMBODIMENTS

The above-mentioned and other problems are solved by applying the principles and teachings associated with the hereinafter described different embodiments of compartmentalized gas-filled neutron detectors. Gas-filled detectors are designed such that one or more objects or structures having large surface areas of low-density, ultra-low-density, or are ultra-thin are incorporated into the gas-filled detectors, where these structures are either composed entirely, or partially, from neutron reactive materials. The low-density and ultra-low-density structures allow the reaction products to travel further than in typical solids, thus the reaction products may escape multiples sides of a neutron absorbing structure concurrently and be measured in the non-reactive gas volume simultaneously. As a result of using materials, which are usually solids, as low-density or ultra-low-density materials, they may become porous or filamentary and have large surface areas. The thickness of the ultra-thin structures is less than the summed ranges of the reaction products and also allow reaction products to escape multiple sides of a neutron absorber structure concurrently and be measured in a non-reactive gas volume simultaneously. Using absorber thicknesses less than the summed ranges of the reaction product ranges allows for the possibility of measuring more than one reaction product from a single neutron interaction, a feature not possible with current coated neutron detectors. Measuring both reaction products simultaneously increases the detection efficiency and neutron to gamma-ray rejection ratio over conventional coated neutron detectors. The structures may be flat or curved, fins or plates, porous or filamentary material, or semi-solid material or aerogel. The incorporation of the extended structures composed, at least partially, of neutron reactive material increases the neutron detection efficiency of the gas-filled detectors over conventional coated designs.

These structures increase the amount of neutron reactive material present in the detectors over conventional coated designs and resultantly increase the neutron detection efficiency. The one or more objects or structures can be made of conducting, semiconducting, semi-insulating, or insulating materials. The structures are arranged such that they do not detrimentally detract from the main function of a gas-filled detector with particular attention to gas-filled proportional detectors. The use of low-density, ultra-low-density, and ultra-thin materials allows for neutron reactive structures to be inserted into the detector that allow for one or more reaction products to be released into the non-reactive gas region of the detector chamber concurrently and be measured simultaneously, a feature not possible with prior art coated neutron detectors.

An object of at least one embodiment of the present invention is to provide neutron detectors that have detection efficiencies many times greater than present coated gas-filled neutron detectors while remaining relatively inexpensive to construct.

Another object of at least one embodiment of the present invention is to provide a neutron detector than does not need to use $^{10}BF_3$ or $^3He$ gases and operates on common proportional gases such as Ar and P-10.

Still another object of at least one embodiment of the present invention is to provide a method to construct gas-filled neutron detectors with solid source neutron absorbers instead of neutron reactive gases, where the solid source neutron absorbers allow for one or more reaction products to enter the non-reactive detector gas volume concurrently and be measured simultaneously. Because both reaction products are being measured together, a large pulse will be generated compared to conventional coated gas-filled detectors where only one reaction product is being measured. This will result in more pulses occurring with significantly more energy above background radiations and electronic system noise. Consequently, the neutron detection efficiency and the detectors ability to discriminate against gamma-ray pulses, referred to as the neutron to gamma-ray rejection ratio (n/γ), will both increase compared to conventional coated gas-filled detectors. Thermal neutron response pulse-height spectra from ultra-thin material, Li foil, and low-density material, impregnated LiF polyurethane open-cell foam, are shown in FIGS. 64 & 65 as examples of detectors where both reaction products are measured simultaneously. In FIGS. 64 & 65 there is a large valley between the gamma-ray induced pulses including the electronic system noise in the lower channels and the neutron induced spectral features in the higher channels. A neutron response pulse-height spectrum from a conventional coated gas-filled neutron detector is shown in FIG. 54.

Yet still another object of at least one embodiment of the present invention is to provide compartmentalized gas-filled detectors that can be used to reduce false counts from background radiations other than neutrons.

In carrying out of the above objects and other objects of the present invention, an apparatus for efficiently detecting neutrons is provided. The apparatus includes a detector cavity in which a detector gas is contained. The apparatus further includes at least one object, or structure, disposed within the cavity. The structure portions are sized and arranged in the cavity to reduce or prevent neutron streaming through the cavity. The structure absorbs neutrons and there is a chance for more than one reaction product to escape the absorber concurrently and be measured in the gas region simultaneously. The emitted ionizing radiation from the neutron absorption will ionize the non-reactive gas contained in the detector between the absorber structures and gas container housing. In the case of the low-density and ultra-low-density absorber structures, a portion of the gas within the voids created by the pores may be ionized and collected at the anode, but is minimal compared to the amount of charge collection from the regions solely harboring the gas that has become ionized from the reaction product(s). The apparatus may still further include a plurality of electrodes including at least one anode and at least one cathode for generating an electric field within the cavity upon the application of a voltage to the electrodes.

The apparatus may further include a structure which at least partially defines a cavity.

The neutron reactive low-density, ultra-low-density, and ultra-thin material may include at least one of elemental, enriched or compound forms of lithium, boron, gadolinium, cadmium, uranium, plutonium and thorium.

The structures may be arranged geometrically within the cavity to reduce or prevent neutron streaming through the cavity in at least one direction.

The low-density material is defined as a solid with density less than that of water, 1 $g/cm^3$, such as open celled polyurethane foam.

The ultra-low-density material is defined as a solid with density less than 0.1 $g/cm^3$, such as aerogels.

The pores created by the low-density or ultra-density material may create a channel for reaction products to escape an absorber structure than would not escape a typical solid of the same thickness.

The structures may be composed of low-density, ultra-low-density, or ultra-thin neutron reactive material that allows there to be a probability, even if small, that more than one reaction product may be released into the non-reactive gas volume of the detector.

The neutron reactive low-density, ultra-low density, or ultra-thin material may include at least one of elemental, enriched, or compound forms of lithium, boron, gadolinium, cadmium, uranium, plutonium, and thorium.

The structures or objects may be arranged geometrically within the cavity to reduce or prevent neutron streaming through the cavity.

The low-density or ultra-low-density material may be composed of at least one of foam, sponge, aerogel, fibrous and filamentary material.

The ultra-thin material may be composed of elemental, enriched or compound forms of lithium, boron, gadolinium, cadmium, uranium, plutonium, and thorium.

The ultra-thin material may include a conducting, semi-conducting, semi insulating, or insulting substrate which a neutron reactive material composed of at least one of elemental enriched, or compound forms of lithium boron, gadolinium, cadmium uranium, plutonium, and thorium deposited on at least one side or portion of the substrate. An example of this material may be $^6LiF$ deposited on Biaxially-oriented polyethylene terephthalate (BoPET) with an aluminum coating.

The low-density or ultra-low-density material may be a combination of foam, sponge, aerogel, fibrous or filamentary material.

The apparatus may still further include a plurality of subcompartments disposed within the cavity and which may restrict the ranges of the reaction products.

The neutrons may be thermal neutrons.

While these embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Apparatus for efficiently detecting neutrons, the apparatus comprising:
   a detector cavity in which a detector gas is contained;
   at least one object disposed within the cavity, wherein at least surface portions of the at least one object include neutron reactive material and wherein the surface portions are sized and arranged in the cavity to reduce or prevent neutron streaming through the cavity, the material absorbing neutrons and the at least one object releasing all ionizing radiation reaction products resulting from at least one absorbed neutron into the gas; and
   a plurality of electrodes including at least one anode and at least one cathode for generating an electric field within the cavity upon the application of a voltage to the electrodes.

2. The apparatus as claimed in claim 1, further comprising a surface which at least partially defines the cavity and a coating of neutron reactive material on the surface.

3. The apparatus as claimed in claim 1, wherein the at least one object includes fins having substrate portions and wherein the surface portions are coatings of neutron reactive material on the substrate portions.

4. The apparatus as claimed in claim 3, wherein the substrate portions of the fins are composed of one or more conductive materials.

5. The apparatus as claimed in claim 3, wherein the substrate portions of the fins are composed of at least one of insulating, semi-insulating and semiconducting materials to ensure that the fins do not disrupt the electric field within the cavity.

6. The apparatus as claimed in claim 3, wherein the fins are arranged geometrically within the cavity to reduce or prevent neutron streaming through the cavity.

7. The apparatus as claimed in claim 1, wherein the neutron reactive material includes at least one of elemental, enriched and compound forms of lithium, boron, gadolinium, cadmium, uranium, plutonium and thorium.

8. The apparatus as claimed in claim 1, wherein the at least one object has a substrate portion, wherein the surface portions are coatings of the material on the substrate portion and wherein the coatings release a charged particle, light or photon that interacts with the detector gas.

9. The apparatus as claimed in claim 1, wherein the surface portions are composed of neutron reactive porous material that allows one or more reaction products to be released into the gas.

10. The apparatus as claimed in claim 9, wherein the neutron reactive porous material includes at least one of elemental, enriched or compound forms of lithium, boron, gadolinium, cadmium, uranium, plutonium and thorium.

11. The apparatus as claimed in claim 9, wherein the surface portions are arranged geometrically within the cavity to reduce or prevent neutron streaming through the cavity.

12. The apparatus as claimed in claim 9, wherein the porous material is composed of at least one of a foam, sponge, aerogel, fibrous and filamentary material.

13. The apparatus as claimed in claim 9, wherein the porous material is a combination of a foam, sponge, aerogel, fibrous or filamentary material.

14. The apparatus as claimed in claim 1, wherein the at least one object has a substrate portion, wherein the surface portions are composed of a coating of neutron reactive porous material on the substrate portion and wherein the coating releases a charged particle, light or photon that interacts with the detector gas.

15. The apparatus as claimed in claim 1, further comprising a plurality of subcompartments disposed within the cavity and which restrict the ranges of the reaction products.

16. The apparatus as claimed in claim 1, wherein the neutrons are thermal neutrons.

17. The apparatus as claimed in claim 1, wherein the at least one object includes fins having substrate portions composed of neutron reactive porous material that allows one or more reaction products to be released into the gas.

18. Apparatus for efficiently detecting neutrons, the apparatus comprising:
    a plurality of walls at least partially defining a detector cavity which encloses a detector gas, the walls of the cavity being operable as an outer electrode;
    a thin conductive wire disposed within the cavity and operable as an inner electrode;
    a conductive grid surrounding the thin wire and operable as an intermediate electrode; and
    at least one object disposed within the cavity, wherein at least surface portions of the at least one object include neutron reactive material and wherein the surface portions are sized and arranged in the cavity to reduce or prevent neutron streaming through the cavity, the material absorbing neutrons and the at least one object releasing all ionizing radiation reaction products resulting from at least one absorbed neutron into the gas.

19. The apparatus as claimed in claim 18, further comprising a surface which at least partially defines the cavity and a coating of neutron reactive material on the surface.

20. The apparatus as claimed in claim 18, wherein the at least one object includes fins having substrate portions and wherein the surface portions are coatings of neutron reactive materials on the substrate portions.

21. The apparatus as claimed in claim 20, wherein the substrate portions of the fins are composed of one or more conductive materials.

22. The apparatus as claimed in claim 20, wherein the substrate portions of the fins are composed of at least one of insulating, semi-insulating and semiconducting materials to ensure that the fins do not disrupt the electric field within the cavity.

23. The apparatus as claimed in claim 20, wherein the fins are arranged geometrically within the cavity to reduce or prevent neutron streaming through the cavity.

24. The apparatus as claimed in claim 18, wherein the neutron reactive material includes at least one of elemental, enriched or compound forms of lithium, boron, gadolinium, cadmium, uranium, plutonium and thorium.

25. The apparatus as claimed in claim 18, wherein the at least one object has a substrate portion, wherein the surface portions are coatings of the material on the substrate portion and wherein the coatings release a charged particle, light or photon that interacts with the detector gas.

26. The apparatus as claimed in claim 18, wherein the surface portions are composed of neutron reactive porous material that allows one or more reaction products to be released into the gas.

27. The apparatus as claimed in claim 26, wherein the neutron reactive porous material includes at least one of elemental, enriched or compound forms of lithium, boron, gadolinium, cadmium, uranium, plutonium and thorium.

28. The apparatus as claimed in claim 26, wherein the surface portions are arranged geometrically within the cavity to reduce or prevent neutron streaming through the cavity.

29. The apparatus as claimed in claim 26, wherein the porous material is composed of at least one of a foam, sponge, aerogel, fibrous and filamentary material.

30. The apparatus as claimed in claim 26, wherein the porous material is a combination of a foam, sponge, aerogel, fibrous or filamentary material.

31. The apparatus as claimed in claim 18, wherein the at least one object has a substrate portion, wherein the surface portions are composed of a coating of neutron reactive porous material on the substrate portion and wherein the coating releases a charged particle, light or photon that interacts with the detector gas.

32. The apparatus as claimed in claim 18, further comprising a plurality of subcompartments disposed within the cavity and which restrict the ranges of the reaction products.

33. The apparatus as claimed in claim 18, wherein the neutrons are thermal neutrons.

34. The apparatus as claimed in claim 18, wherein the at least one object includes fins having substrate portions composed of neutron reactive porous material that allows one or more reaction products to be released into the gas.

35. Apparatus for efficiently detecting neutrons, the apparatus comprising:
a first surface which partially defines a detector cavity which encloses a detector gas, the first surface being operable as a first electrode;
a second surface which partially defines the cavity, the second surface being operable as a second electrode; and
a structure including a plurality of compartments filled with the gas and disposed within the cavity, wherein at least inner surface portions of the structure include neutron reactive material, wherein the surface portions are sized and arranged in the cavity to reduce or prevent neutron streaming through the cavity, the material absorbing neutrons and the structure releasing all ionizing radiation reaction products having ranges resulting from at least one absorbed neutron into the gas and wherein the compartments restrict the ranges of the reaction products and limit total energy deposited in the apparatus such that response signals from background radiation are reduced and substantially eliminated.

36. The apparatus as claimed in claim 35, wherein the electrodes are arranged and connected so that the apparatus operates as a single detector.

37. The apparatus as claimed in claim 36, wherein the structure includes substrate portions, wherein the surface portions are coatings of the neutron reactive material on the substrate portions.

38. The apparatus as claimed in claim 37, wherein the substrate portions are composed of one or more conductive materials.

39. The apparatus as claimed in claim 37, wherein the substrate portions are composed of at least one of insulating and semi-insulting materials to ensure that the structure does not disrupt the electric field within the cavity.

40. The apparatus as claimed in claim 37, wherein the surface portions of the structure are arranged geometrically within the cavity to reduce or prevent neutron streaming through the cavity.

41. The apparatus as claimed in claim 36, wherein the neutron reactive material includes at least one of elemental, enriched or compound forms of lithium, boron, gadolinium, cadmium, uranium, plutonium and thorium.

42. The apparatus as claimed in claim 36, wherein the structure includes substrate portions, wherein the surface portions are coatings of the neutron reactive material on the substrate portions and wherein the coatings release charged particles, light or photons that interact with the detector gas.

43. The apparatus as claimed in claim 36, wherein the surface portions of the structure are composed of neutron reactive porous material.

44. The apparatus as claimed in claim 43, wherein the neutron reactive porous material includes at least one of elemental, enriched or compound forms of lithium, boron, gadolinium, cadmium, uranium, plutonium and thorium.

45. The apparatus as claimed in claim 43, wherein the surface portions are arranged geometrically within the cavity to reduce or prevent neutron streaming through the cavity.

46. The apparatus as claimed in claim 43, wherein the porous material is at least one of a foam, sponge, aerogel, fibrous and filamentary material.

47. The apparatus as claimed in claim 43, wherein the porous material is a combination of a foam, sponge, aerogel, fibrous or filamentary material.

48. The apparatus as claimed in claim 36, wherein the structure includes substrate portions, wherein the surface portions are coatings of neutron reactive porous material and wherein the coatings release charged particles, light or photons that interact with the detector gas.

49. The apparatus as claimed in claim 36, wherein the neutrons are thermal neutrons.

50. The apparatus as claimed in claim 35, wherein the electrodes are arranged and separated so that the apparatus operates as a detector array having a plurality of individual detectors.

51. The apparatus as claimed in claim 50, wherein inner surface portions of neighboring compartments include different neutron reactive material.

52. The apparatus as claimed in claim 50, wherein the structure includes substrate portions, wherein the surface portions are coatings of the at least one neutron reactive material on the substrate portions.

53. The apparatus as claimed in claim 52, wherein the substrate portions are composed of one or more conductive materials.

54. The apparatus as claimed in claim 52, wherein the substrate portions are composed of at least one of insulating and semi-insulting material to ensure that the structure does not disrupt the electric field within the detector cavity.

55. The apparatus as claimed in claim 52, wherein the surface portions of the structure are arranged geometrically within the cavity to reduce or prevent neutron streaming through the cavity.

56. The apparatus as claimed in claim 50, wherein the neutron reactive material includes at least one of elemental, enriched or compound forms of lithium, boron, gadolinium, cadmium, uranium, plutonium and thorium.

57. The apparatus as claimed in claim 50, wherein the structure includes substrate portions, wherein the surface portions are coatings of the neutron reactive material on the substrate portions and wherein the coatings release charged particles, light or photons that interact with the detector gas.

58. The apparatus as claimed in claim 50, wherein the surface portions of the structure are composed of neutron reactive porous material.

59. The apparatus as claimed in claim 58, wherein the neutron reactive porous material includes at least one of elemental, enriched or compound forms of lithium, boron, gadolinium, cadmium, uranium, plutonium and thorium.

60. The apparatus as claimed in claim 58, wherein the surface portions are arranged geometrically within the cavity to reduce or prevent neutron streaming through the cavity.

61. The apparatus as claimed in claim 58, wherein the porous material is at least one of a foam, sponge, aerogel, fibrous and filamentary material.

62. The apparatus as claimed in claim 58, wherein the porous material is a combination of a foam, sponge, aerogel, fibrous or filamentary material.

63. The apparatus as claimed in claim 58, wherein inner surface portions of neighboring compartments include different neutron reactive porous material.

64. The apparatus as claimed in claim 50, wherein the structure includes substrate portions, wherein the surface portions are coatings of neutron reactive porous material and wherein the coatings release charged particles, light or photons that interact with the detector gas.

65. The apparatus as claimed in claim 50, wherein the neutrons are thermal neutrons.

66. The apparatus as claimed in claim 35, wherein the structure includes substrate portions composed of neutron reactive porous material that allows one or more reaction products to be released into the gas.

* * * * *